US006623791B2

(12) United States Patent
Sadvary et al.

(10) Patent No.: US 6,623,791 B2
(45) Date of Patent: Sep. 23, 2003

(54) COATING COMPOSITIONS HAVING IMPROVED ADHESION, COATED SUBSTRATES AND METHODS RELATED THERETO

(75) Inventors: Richard J. Sadvary, Pittsburgh, PA (US); Lawrence G. Anderson, Pittsburgh, PA (US); Shiryn Tyebjee, Allison Park, PA (US); Thomas R. Hockswender, Gibsonia, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/919,198

(22) Filed: Jul. 31, 2001

(65) Prior Publication Data

US 2002/0086168 A1 Jul. 4, 2002

Related U.S. Application Data

(63) Continuation-in-part of application No. 09/629,423, filed on Jul. 31, 2000, now Pat. No. 6,387,519, which is a continuation-in-part of application No. 09/489,043, filed on Jan. 21, 2000, now abandoned, which is a continuation-in-part of application No. 09/365,069, filed on Jul. 30, 1999, now abandoned, application No. 09/919,198, which is a continuation-in-part of application No. 09/629,443, filed on Jul. 31, 2000, which is a continuation-in-part of application No. 09/489,132, filed on Jan. 21, 2000, now abandoned, application No. 09/365,069.

(60) Provisional application No. 60/171,899, filed on Dec. 23, 1999, and provisional application No. 60/171,898, filed on Dec. 23, 1999.

(51) Int. Cl.$^7$ .............................................. B32B 35/00
(52) U.S. Cl. ...................... 427/140; 524/405; 524/497; 524/588; 524/493; 524/430; 106/287.1; 525/474; 525/477; 528/75; 528/28; 528/29; 528/34; 528/27; 528/26; 528/38; 528/39
(58) Field of Search ..................... 524/405, 497, 524/588, 493, 430; 106/287.1; 525/474, 477; 528/25, 28, 29, 34, 27, 26, 38, 39; 427/140

(56) References Cited

U.S. PATENT DOCUMENTS

| 1,873,945 | A |   | 8/1932  | Kraenzlein et al. |
| 2,584,340 | A |   | 2/1952  | Goodwin et al. |
| 2,587,295 | A |   | 2/1952  | Doyle et al. |
| 2,860,074 | A |   | 11/1958 | Hedlund et al. |
| 2,901,449 | A |   | 8/1959  | Schwarz et al. |
| 2,978,437 | A |   | 4/1961  | Christenson |
| 3,127,363 | A | * | 3/1964  | Nitzsche et al. |
| 3,203,919 | A |   | 8/1965  | Brachman |
| 3,317,460 | A |   | 5/1967  | Clark |
| 3,398,174 | A |   | 8/1968  | Barnes, Jr. |
| 3,450,791 | A |   | 6/1969  | Sekmakas et al. |
| 3,479,328 | A |   | 11/1969 | Nordstrom |
| 3,539,658 | A |   | 11/1970 | Sekmakas et al. |
| 3,577,263 | A |   | 5/1971  | Nordstrom |
| 3,577,265 | A |   | 5/1971  | Nordstrom |
| 3,627,836 | A |   | 12/1971 | Getson |
| 3,642,936 | A |   | 2/1972  | Hodge et al. |
| 3,644,566 | A |   | 2/1972  | Kincheloe et al. |
| 3,655,602 | A |   | 4/1972  | Sekmakas |
| 3,668,183 | A |   | 6/1972  | Hoy et al. |
| 3,687,872 | A |   | 8/1972  | Markovitz ............... 260/2 EC |
| 3,719,634 | A | * | 3/1973  | Clairk et al. |
| 3,772,240 | A |   | 11/1973 | Greenlee .................... 260/37 |
| 3,799,854 | A |   | 3/1974  | Jerabek et al. |
| 3,832,183 | A | * | 8/1974  | Rogers et al. |
| 3,857,817 | A |   | 12/1974 | Henshaw et al. |
| 3,919,315 | A |   | 11/1975 | Wollweber et al. |
| 3,964,936 | A |   | 6/1976  | Das .......................... 148/6.27 |
| 3,986,997 | A |   | 10/1976 | Clark |
| 4,001,156 | A |   | 1/1977  | Bosso et al. |
| 4,025,407 | A |   | 5/1977  | Chang et al. |
| 4,025,456 | A |   | 5/1977  | Litteral et al. |
| 4,027,073 | A |   | 5/1977  | Clark |
| 4,046,729 | A |   | 9/1977  | Scriven et al. |
| 4,089,763 | A |   | 5/1978  | Dart et al. |

(List continued on next page.)

FOREIGN PATENT DOCUMENTS

| DE | 1193504 | 5/1965 |
| DE | 1545040 | 7/1970 |
| DE | 2205570 | 12/1988 |

(List continued on next page.)

OTHER PUBLICATIONS

Encyclopedia of Chemical Technology, vol. 8, 4$^{th}$ Ed., edited by Kroschwitz et al., Wiley–Interscience, 1993, pp. 108–118.*

Iler, Ralph K., "The Chemistry of Silica", Colloidal Silica–Concentrated Sols, 1979, pp. 412–414.

Verboom et al., "N, N'–Bis[trismethylsilyl]–urea: A Useful Silylating Agent for Alcohols and Carboxylic Acids", Laboratory of Organic Chemistry, Twente University of Technology, Enschede, The Netherlands, Communications, pp. 807–809, Oct. 1981.

(List continued on next page.)

*Primary Examiner*—Robert Dawson
*Assistant Examiner*—Kuo-Liang Peng
(74) *Attorney, Agent, or Firm*—Deborah M. Altman

(57) ABSTRACT

Coating compositions are provided which include a polysiloxane comprising at least one reactive functional group, at least one material comprising at least one reactive functional group, and at least one boron-containing compound. Also provided are multi-layer composite coatings formed from a basecoat deposited from a pigmented coating composition and a topcoat applied over the basecoat, the topcoat deposited from the aforementioned coating composition. Methods for repairing a multi-layer composite coating and coated substrates are also provided. The compositions of the invention provide highly scratch resistant coatings, particularly highly scratch resistant color-plus-clear coatings, which have excellent intercoat adhesion to subsequently applied coating layers.

64 Claims, No Drawings

U.S. PATENT DOCUMENTS

| | | |
|---|---|---|
| 4,093,673 A | 6/1978 | Chang et al. |
| 4,104,240 A | 8/1978 | Buter |
| 4,121,011 A | 10/1978 | Glover et al. ............... 428/347 |
| 4,147,679 A | 4/1979 | Scriven et al. |
| 4,177,315 A | 12/1979 | Ubersax |
| 4,211,823 A | 7/1980 | Suzuki et al. |
| 4,212,901 A | 7/1980 | van Neerbos et al. |
| 4,220,679 A | 9/1980 | Blackhouse |
| 4,221,697 A | 9/1980 | Osborn et al. |
| 4,239,798 A | 12/1980 | Schroeter et al. |
| 4,254,185 A | 3/1981 | Buter |
| 4,271,062 A | 6/1981 | Boomgaard et al. |
| 4,278,574 A | 7/1981 | Dworak et al. |
| 4,279,800 A | 7/1981 | Boomgaard et al. |
| 4,308,060 A | 12/1981 | Talbot |
| 4,310,600 A | 1/1982 | Cross |
| 4,311,622 A | 1/1982 | Buter |
| 4,345,057 A | 8/1982 | Yamabe et al. |
| 4,348,462 A | 9/1982 | Chung |
| 4,368,294 A | 1/1983 | Deubzer et al. |
| 4,369,300 A | 1/1983 | Carter et al. |
| 4,395,461 A | 7/1983 | Ching |
| 4,403,003 A | 9/1983 | Backhouse |
| 4,403,093 A | 9/1983 | Hartman et al. |
| 4,408,018 A | 10/1983 | Bartman et al. |
| 4,410,594 A | 10/1983 | Olson |
| 4,413,086 A | 11/1983 | Chang et al. |
| 4,418,182 A | 11/1983 | Chattha |
| 4,427,820 A | 1/1984 | Backhouse et al. |
| 4,431,789 A | 2/1984 | Okazaki et al. |
| 4,456,647 A | 6/1984 | Schoenfelder et al. |
| 4,465,815 A | 8/1984 | Chattha |
| 4,477,536 A | 10/1984 | Wright et al. |
| 4,478,876 A | 10/1984 | Chung |
| 4,481,126 A | 11/1984 | Trinh et al. |
| 4,491,508 A | 1/1985 | Olson et al. |
| 4,499,150 A | 2/1985 | Dowbenko et al. |
| 4,499,151 A | 2/1985 | Dowbenko et al. |
| 4,512,677 A | 4/1985 | Trinh |
| 4,518,522 A | 5/1985 | Markusch et al. |
| 4,520,144 A | 5/1985 | Noren et al. |
| 4,522,958 A | 6/1985 | Das et al. |
| 4,526,910 A | 7/1985 | Das et al. |
| 4,563,372 A | 1/1986 | Kurauchi et al. |
| 4,569,966 A | 2/1986 | Piccirilli et al. |
| 4,592,816 A | 6/1986 | Emmons et al. |
| 4,598,111 A | 7/1986 | Wright et al. |
| 4,618,657 A | 10/1986 | Katchko et al. |
| 4,640,940 A | 2/1987 | Jacobine et al. |
| 4,652,470 A | 3/1987 | Das et al. |
| 4,663,377 A | 5/1987 | Hombach et al. |
| 4,665,116 A | 5/1987 | Kornhaber et al. |
| 4,673,718 A | 6/1987 | Ryntz et al. |
| 4,677,004 A | 6/1987 | Das et al. |
| 4,680,204 A | 7/1987 | Das et al. |
| 4,681,811 A | 7/1987 | Simpson et al. |
| 4,689,383 A | 8/1987 | Riffle et al. |
| 4,702,860 A | 10/1987 | Kinderov et al. ........... 252/511 |
| 4,713,410 A | 12/1987 | Katchko et al. |
| 4,728,543 A | 3/1988 | Kurauchi et al. |
| 4,728,545 A | 3/1988 | Kurauchi et al. |
| 4,728,690 A | 3/1988 | Lammerting et al. |
| 4,732,790 A | 3/1988 | Blackburn et al. |
| 4,754,014 A | 6/1988 | Ryntz et al. |
| 4,764,569 A | 8/1988 | Umemoto et al. |
| 4,766,185 A | 8/1988 | Ryntz et al. |
| 4,798,746 A | 1/1989 | Claar et al. |
| 4,804,732 A | 2/1989 | Ryntz et al. |
| 4,808,649 A | 2/1989 | Gay et al. |
| 4,816,333 A | 3/1989 | Lange et al. |
| 4,822,828 A | 4/1989 | Swofford |
| 4,832,990 A | 5/1989 | Boccalon et al. ........ 427/388.1 |
| 4,835,023 A | 5/1989 | Taniguchi et al. |
| 4,851,294 A | 7/1989 | Buter et al. |
| 4,870,140 A | 9/1989 | Ryntz et al. |
| 4,873,298 A | 10/1989 | Ryntz et al. |
| 4,892,906 A | 1/1990 | Pham et al. |
| 4,910,097 A | 3/1990 | Nomura et al. |
| 4,925,659 A | 5/1990 | Grollier et al. |
| 4,927,868 A | 5/1990 | Schimmel et al. |
| 5,025,054 A | 6/1991 | Yoshida et al. |
| 5,035,748 A | 7/1991 | Burow et al. |
| 5,049,245 A | 9/1991 | Nomura et al. ................ 204/27 |
| 5,059,707 A | 10/1991 | Motegi et al. |
| 5,066,698 A | 11/1991 | Hazan et al. |
| 5,066,720 A | 11/1991 | Ohsugi et al. |
| 5,071,904 A | 12/1991 | Martin et al. |
| 5,073,455 A | 12/1991 | Nose et al. ............... 428/411.1 |
| 5,075,165 A | 12/1991 | Kishi et al. |
| 5,075,370 A | 12/1991 | Kubitza et al. |
| 5,084,541 A | 1/1992 | Jacobs, III et al. |
| 5,085,694 A | 2/1992 | Cifuentes |
| 5,086,087 A | 2/1992 | Misev |
| 5,098,947 A | 3/1992 | Metzger et al. |
| 5,098,983 A | 3/1992 | Mosbach et al. |
| 5,102,746 A | 4/1992 | Shindou et al. |
| 5,104,922 A | 4/1992 | Chang |
| 5,104,929 A | 4/1992 | Bilkadi |
| 5,108,832 A | 4/1992 | Nugent, Jr. et al. ...... 428/304.4 |
| 5,110,891 A | 5/1992 | Cifuentes et al. |
| 5,112,403 A | 5/1992 | Okura et al. |
| 5,114,756 A | 5/1992 | Mirabeau et al. |
| 5,116,418 A | 5/1992 | Kaliski |
| 5,141,555 A | 8/1992 | Elepano |
| 5,147,730 A | 9/1992 | Ogishi et al. |
| 5,154,759 A | 10/1992 | Cifuentes et al. |
| 5,162,420 A | 11/1992 | Chang et al. |
| 5,174,813 A | 12/1992 | Cifuentes et al. |
| 5,194,487 A | 3/1993 | Jacobs |
| 5,196,485 A | 3/1993 | McMonigal et al. |
| 5,212,216 A | 5/1993 | Hattori et al. |
| 5,212,273 A | 5/1993 | Das et al. |
| 5,213,846 A | 5/1993 | Tsuneta et al. |
| 5,235,018 A | 8/1993 | Potter et al. |
| 5,248,789 A | 9/1993 | Wolff |
| 5,256,452 A | 10/1993 | McMonigal et al. |
| 5,258,063 A | 11/1993 | Cifuentes et al. |
| 5,258,225 A | 11/1993 | Katsamberis |
| 5,258,424 A | 11/1993 | Yagi et al. |
| 5,258,437 A | 11/1993 | Takeuchi et al. ............. 524/405 |
| 5,260,350 A | 11/1993 | Wright |
| 5,260,469 A | 11/1993 | Swiatek |
| 5,268,256 A | 12/1993 | Goetz et al. |
| 5,286,835 A | 2/1994 | Green et al. |
| 5,304,400 A | 4/1994 | Dhein et al. |
| 5,308,494 A | 5/1994 | Brandon et al. |
| 5,314,947 A | 5/1994 | Sawaragi |
| 5,322,873 A | 6/1994 | Pohl et al. |
| 5,322,890 A | 6/1994 | Ando et al. |
| 5,328,975 A | 7/1994 | Hanson et al. |
| 5,346,958 A | 9/1994 | Yukawa et al. |
| 5,356,669 A | 10/1994 | Rehfuss et al. |
| 5,359,005 A | 10/1994 | Kania et al. |
| 5,367,019 A | 11/1994 | Sawaragi |
| 5,378,735 A | 1/1995 | Hosokawa et al. |
| 5,387,642 A | 2/1995 | Blum et al. |
| 5,389,705 A | 2/1995 | Huemke et al. |
| 5,389,718 A | 2/1995 | Potter et al. |
| 5,393,823 A | 2/1995 | Konno et al. |
| 5,395,955 A | 3/1995 | Okawa et al. |
| 5,397,638 A | 3/1995 | Miki et al. |

| | | | | | |
|---|---|---|---|---|---|
| 5,426,131 A | 6/1995 | Katsamberis | EP | 0372124 | 6/1990 |
| 5,430,083 A | 7/1995 | Klier et al. | EP | 0571187 | 11/1993 |
| 5,432,007 A | 7/1995 | Naito .................... 428/447 | EP | 0 584 978 | 3/1994 |
| 5,432,233 A | 7/1995 | Miyazoe et al. | EP | 0586048 | 3/1994 |
| 5,438,083 A | 8/1995 | Takimoto et al. | EP | 0607710 | 7/1994 |
| 5,439,957 A | 8/1995 | Takimoto et al. | EP | 0665252 | 8/1995 |
| 5,444,104 A | 8/1995 | Waknine | EP | 0735118 | 10/1996 |
| 5,445,871 A | 8/1995 | Murase et al. | EP | 0767232 | 4/1997 |
| 5,461,102 A | 10/1995 | Masuda et al. | EP | 0 774 499 | 5/1997 |
| 5,468,461 A | 11/1995 | Hosoda et al. | EP | 0819719 | 1/1998 |
| 5,468,802 A | 11/1995 | Wilt et al. | EP | 0832947 | 4/1998 |
| 5,470,504 A | 11/1995 | Kiehn et al. | EP | 0897962 | 2/1999 |
| 5,571,297 A | 11/1996 | Swei et al. | EP | 0 900 832 | 3/1999 |
| 5,587,428 A | 12/1996 | Jones et al. | EP | 0928800 | 7/1999 |
| 5,589,129 A | 12/1996 | Kato et al. | EP | 0940422 | 9/1999 |
| 5,593,733 A | 1/1997 | Mayo | EP | 0995778 | 4/2000 |
| 5,602,204 A | 2/1997 | Harimoto et al. | GB | 1080549 | 8/1967 |
| 5,614,640 A | 3/1997 | Okawa | GB | 1293331 | 10/1972 |
| 5,641,854 A | 6/1997 | Jones et al. | GB | 1409741 | 10/1975 |
| 5,663,240 A | 9/1997 | Simeone et al. | GB | 2140018 | 11/1984 |
| 5,663,244 A | 9/1997 | Barancyk et al. | GB | 2174400 | 11/1986 |
| 5,686,012 A | 11/1997 | Hayashi et al. | JP | 54-1335 | 1/1979 |
| 5,693,723 A | 12/1997 | Green | JP | 55-17073 | 5/1980 |
| 5,693,724 A | 12/1997 | Green | JP | 56-157461 | 12/1981 |
| 5,709,950 A | 1/1998 | Burgman et al. | JP | 58-58123 | 12/1983 |
| 5,719,234 A | 2/1998 | Yabuta et al. | JP | 58-217515 | 12/1983 |
| 5,756,221 A | 5/1998 | Horibe et al. | JP | 59-092948 | 5/1984 |
| 5,780,530 A | 7/1998 | Mizutani et al. | JP | 60-168770 | 9/1985 |
| 5,786,435 A | 7/1998 | Marutani et al. | JP | 60-250069 | 12/1985 |
| 5,798,409 A | 8/1998 | Ho | JP | 61-141684 | 6/1986 |
| 5,800,910 A | 9/1998 | Harke et al. | JP | 62-252480 | 11/1987 |
| 5,814,410 A | 9/1998 | Singer et al. | JP | 64-004663 | 1/1989 |
| 5,840,806 A | 11/1998 | Komazaki et al. | JP | 1-141952 | 6/1989 |
| 5,853,809 A | 12/1998 | Campbell et al. | JP | 3258866 | 11/1991 |
| 5,876,806 A | 3/1999 | Ogawa | JP | 03296567 | 12/1991 |
| 5,886,082 A | 3/1999 | Numa et al. | JP | 5043696 | 2/1993 |
| 5,914,162 A | 6/1999 | Bilkadi | JP | 5-51533 | 3/1993 |
| 5,922,475 A | 7/1999 | Barancyk et al. | JP | 5065416 | 3/1993 |
| 5,939,491 A | 8/1999 | Wilt et al. | JP | 06100799 | 4/1994 |
| 5,942,556 A | 8/1999 | Friedlander et al. | JP | 7070509 | 3/1995 |
| 5,948,541 A | 9/1999 | Inspektor .................... 428/469 | JP | 7-62214 | 7/1995 |
| 5,951,747 A | 9/1999 | Lewis et al. ............. 106/14.44 | JP | 9-165450 | 6/1997 |
| 5,976,701 A | 11/1999 | Barancyk et al. | JP | 09227688 | 9/1997 |
| 5,976,716 A | 11/1999 | Inspektor .................... 428/698 | JP | 10017670 | 1/1998 |
| 5,998,504 A | 12/1999 | Groth et al. | WO | WO 95/28452 | 10/1995 |
| 5,998,543 A | 12/1999 | Collins et al. | WO | WO 96/01864 | 1/1996 |
| 6,005,045 A | 12/1999 | Klanica | WO | WO 97/13741 | 4/1997 |
| 6,013,724 A | 1/2000 | Mizutani et al. | WO | WO 97/26304 | 7/1997 |
| 6,013,733 A | 1/2000 | Singer et al. | WO | WO 97/29854 | 8/1997 |
| 6,022,919 A | 2/2000 | Komoto et al. | WO | WO 97/44402 | 11/1997 |
| 6,045,870 A | 4/2000 | Noura et al. | WO | WO 98/38251 | 9/1998 |
| 6,048,934 A | 4/2000 | Wilt et al. | WO | WO 98/40170 | 9/1998 |
| 6,059,867 A | 5/2000 | Lewis et al. ............. 106/14.44 | WO | WO-99/06487 | 2/1999 |
| 6,063,438 A | 5/2000 | Ogawa | WO | WO 99/58589 | 11/1999 |
| 6,080,816 A | 6/2000 | Gregorovich et al. | WO | WO 00/39183 | 7/2000 |
| 6,117,533 A | 9/2000 | Inspektor .................... 428/216 | | | |
| 6,136,902 A | 10/2000 | Fukasawa et al. .......... 524/128 | | | |
| 6,174,949 B1 | 1/2001 | Ninomiya et al. .......... 524/404 | | | |
| 6,207,235 B1 | 3/2001 | Ohsawa et al. | | | |
| 6,225,434 B1 | 5/2001 | Sadvary et al. ............... 528/29 | | | |
| 6,235,858 B1 | 5/2001 | Swarup et al. ............... 526/301 | | | |

FOREIGN PATENT DOCUMENTS

| | | |
|---|---|---|
| DE | 44 32 260 | 6/1995 |
| DE | 196 12 746 | 10/1996 |
| DE | 197 09 467 | 3/1997 |
| EP | 0010555 | 5/1980 |
| EP | 0088193 | 9/1983 |
| EP | 0139187 | 5/1985 |
| EP | 0277816 | 8/1988 |
| EP | 0356963 | 3/1990 |

OTHER PUBLICATIONS

"Surface Coatings—vol. 1: Raw Materials and Their Usage," $2^{nd}$ Ed., Tafe Educational Books, New South Wales University Press Limited, New South Wales, Australia 1983.

Chattha et al., "High Solids Coatings from New Oligomers", Journal of Coatings Technology, vol. 55, No. 700, pp. 39–46, May 1983.

Degussa, No. 6, Technical Bulletin Pigments, Hydrophobic Aerosil® Manufacture, Properties, and Applications, $4^{th}$ Edition, Aug. 1986.

Williams et al., "Polyester Oligomers of Narrowed Molecular Weight Distribution", Water–Borne & Higher–Solids Coatings Symposium, pp. 478–512, Feb. 3–5, 1988, New Orleans, LA, USA.

"Siloxanes With Aliphatic Isocyanate Groups, A Tetrafunctional Cross–Linking Agent", Guangbin Zhou and Richard Fragnito, Johannes Smid, Polymer Bulletin 22, pp. 85–88 (1989), Springer–Verlag.

Odian, G., "Principles of Polymerization, 3rd Edition", John Wiley & Sons; Inc. ISBN: 0471610208, pp. 19–24, Published Oct. 18, 1991.

Greene, T. W. et al., "Protective Groups in Organic Synthesis", Second Edition, John Wiley & Sons, Inc., pp. 68–86; & 261–263.

"Regioselective Rhodium–Containing Catalysts for Ring–Opening Polymerizations and Hydrosilylations", J.V. Crivello and M. Fan, Journal of Polymer Science: Part A: Polymer Chemistry, vol. 30, pp. 1–11 (1992), John Wiley & Sons, Inc.

"Synthesis of Novel Organic Oligomers Containing Si–H Bonds", T. Iwahara, M. Jusakabe, M. Chiba and K. Yonezawa, Journal of Polymer Science: Part A: Polymer Chemistry, vol. 31, pp. 2617–2631 (1993), John Wiley & Sons, Inc.

Schmidt, C., et al., "Inorganic–organic Hybrid Coatings For Metal And Glass Surfaces", PMSE, Spring 1994, pp. 347–348.

Etranian, A. et al., "Les Silices Greffees Ameliorent Les Revetements", Peintures & Encres, Informations Chimie, n 371—Sep. 1995, pp. 85–88.

Espiard et al, "Poly(ethyl acrylate) latexes Encapsulating Nanoparticles of Silica: 3. Morphology and Mechanical Properties of Reinforced Films", Polymer, vol. 36, No. 23, pp. 4397–4403, Elsevier Science Ltd., 1995.

Jones, F., "Toward Solventless Liquid Coatings", Journal of Coating Technology, vol. 68, No. 852, pp. 25–36, Jan. 1996.

"Highlink® OG Silica Organosols," Clariant, Societe Francais Hoechst, BL Chimie Fine, AE/MS.22/96.

Varerkar M.P., "Formulating High Solids Coatings: The Solution to VOC Problem", Paintindia, Sep. 1996, pp. 19–30.

Misra, M., et al., "Hybrid Inorganic–Organic UV–Curable Abrasion–Resistant Coatings", Surface Coatings International, (12) 1998, pp. 594–595.

Chandra et al., "Telechelic Oligomers for High Solids Coatings", Paintindia, Feb. 1997, pp. 35–44.

Jones, F., "New Technology Holds Key", Paint & Coatings Industry, May 1997, pp. 62–64.

Chemical Abstracts 128:62925a, Noboru et al., "Coating Pocess Using Siloxy–Containing Vinyl Polymer Clear Coatings", Jpn. Kokai Tokkyo Joho JP 09, 314,040, Sep. 12, 1997(abstract).

Azuma et al, "Acrylic Oligomer for High Solids Automotive Top Coating System Having Excellent Acid Resistance", Progress In Organic Coatings, vol. 32, Sep.–Dec. 1997, pp. 1–7.

Gettwert, G., et al., "One–Component Silicate Binder Systems for Coatings", Surface Coatings International, (12) 1998, pp. 596–603.

Wu, Shobing, et al, "Effect of Siloxane Functionalized Caprolactone Polyols on Photocurable Epoxy Coatings", Journal of Coatings Technology, vol. 70, No. 887, Dec. 1998, pp. 53–62.

Perry, R. J., "Applications for Cross–linked Siloxane Particles", Chemtech, Feb. 1999, pp. 39–44.

Frings, S., et al., "Morphology of Hybrid Coatings Based on Polyester, Melamine Resin, and Silica and the Relation with Hardness and Scratch Resistance", Journal of Coatings Technology, vol. 72, No. 901, Feb. 2000, pp. 83–89.

Straehle, Dr. Wolfgang, Head of the Corporate Division, Research and Purchasing, and the Operating Division, Industrial Coating, BASF Coatings AG, Münster, Germany, "Scratchproof Clearcoat: High Gloss for the Long Term", www.pcimag.com, posted Jul. 25, 2000.

Organo Silicasol, Nissan Chemical Industries, Ltd., Nissan Chemical America Corporation webpage, http://www.snowtex.com/organo_types.html.

Wicks, Zeno W., et al., "Organic Coatings: Science And Technology," second edition, Chapter 23, pp. 433–439 (Wiley–Interscience, c1999).

Smetankina, N.P., et al., "Investigation of the Interrelationship Between the Compositions, Production processes, and Properties of Polyurethanes With Reticular Structures. XV. Introduction of Organosilicon Carbofunctional Glycols Into Polyurethane Lacquer Compounds", Institute of High–Molecular Compound Chemistry of the Academy of Sciences (AS) of the Ukrainian Soviet Socialist Republic (UkrSSR) (with translation).

Kotomkin, V. Ya, et al., "Resistance of Polysiloxane Urethanes to the Action of Solvents and Corrosive Media", UDS 618.(664+64):619.34 (with translation).

Frings, S., et al., "Preparation and Characterization of Organic–Inorganic Hybrid Coatings Based on Crosslinked Polyester Systems and Silica, Formed Via the Sol–Gel Process", Presented at the International Waterborne, High–Solids, and Powder Coatings Symposium, Feb. 10–12, 1999, New Orleans, L.A. USA, pp. 35–43.

09/629,420, Anderson et al., "Flexible Coating Compositions Having Improved Scratch Resistance, Coated Substrates and Methods Related Thereto," filed Jul. 31, 2000.

09/629,421, Barancyk et al., "Coating Compositions Comprising Silyl Blocked Components, Coatings, Coated Substrates and Methods Related Thereto," filed Jul. 31, 2000.

09/629,422, Anderson et al., "Scratch Resistance Dual Cure Coatings, Coated Substrates and Methods Related Thereto," filed Jul. 31, 2000.

09/629,443, Anderson et al., "Coating Compositions Having Improved Scratch Resistance, Coated Substrates and Methods Related Thereto," filed Jul. 31, 2000.

09/629,444, Anderson et al. "Coating Compositions Having Improved Scratch Resistance, Coated Substrates, and Methods Related Thereto," filed Jul. 31, 2000.

Chemical Abstracts AN 1996:710179, Ohsawa et al, "One–Component thermosetting coating compositions", Ger. Offen., 44 pp., 1996, abstract of German Patent DE 196 12 746.

"Encyclopedia of Chemical Technology", Kirk–Othmer, Fourth Edition, vol. 4, pp. 413–423.

"Organoboron Chemistry", Howard Steinberg, Interscience Publisher, vol. 1, pp. 840–867.

* cited by examiner

COATING COMPOSITIONS HAVING IMPROVED ADHESION, COATED SUBSTRATES AND METHODS RELATED THERETO

CROSS-REFERENCE TO RELATED APPLICATIONS

This application is a continuation-in-part application of U.S. patent application Ser. No. 09/629,423, filed Jul. 31, 2000, now U.S. Pat. No. 6,387,519, which is a continuation-in-part of U.S. patent application Ser. No. 09/489,043, filed Jan. 21, 2000, now abandoned which is a continuation-in-part of U.S. patent application Ser. No. 09/365,069, filed Jul. 30, 1999, now abandoned. U.S. patent application Ser. No. 09/489,043 claims the benefit of priority from Provisional Patent Application Ser. No. 60/171,899, filed Dec. 23, 1999.

This application is also a continuation-in-part application of U.S. patent application Ser. No. 09/629,443, filed Jul. 31, 2000, which is a continuation-in-part of U.S. patent application Ser. No. 09/489,132, filed Jan. 21, 2000 now abandoned, which is a continuation-in-part of U.S. patent application Ser. No. 09/365,069, filed Jul. 30, 1999, now abandoned. U.S. Patent Application No. 09/489,132 claims the benefit of priority from Provisional Patent Application Serial No. 60/171,898, filed Dec. 23, 1999.

FIELD OF THE INVENTION

Certain embodiments of the present invention are directed to coating compositions comprising at least one reactive functional group-containing polysiloxane, at least one reactant comprising at least one functional group that is reactive with the functional group(s) of the polysiloxane, and at least one boron-containing compound selected from boric acid, boric acid equivalents and mixtures thereof. Other embodiments of the present invention are directed to cured coatings formed from the foregoing coating compositions. Further embodiments are directed to substrates coated with the aforementioned compositions.

BACKGROUND OF THE INVENTION

Color-plus-clearcoating systems involving the application of a colored or pigmented basecoat to a substrate followed by application of a transparent or clearcoat over the basecoat have become increasingly popular as original finishes for a number of consumer products including, for example, automotive vehicles. The color-plus-clearcoating systems have outstanding appearance properties such as gloss and distinctness of image, due in large part to the clearcoat. Such color-plus-clearcoating systems have become popular for use with automotive vehicles, aerospace applications, floor coverings such as ceramic tiles and wood flooring, packaging coatings and the like.

Topcoat coating compositions, particularly those used to form the transparent clearcoat in color-plus-clear coating systems for automotive applications, are subject to defects that occur during the assembly process as well as damage from numerous environmental elements. Such defects during the assembly process include paint defects in the application or curing of the basecoat or the clearcoat. Damaging environmental elements include acidic precipitation, exposure to ultraviolet radiation from sunlight, high relative humidity and high temperatures, defects due to contact with objects causing scratching of the coated surface, and defects due to impact with small, hard objects resulting in chipping of the coating surface.

Further, elastomeric automotive parts and accessories, for example, elastomeric bumpers and body side moldings, are typically coated "off site" and shipped to automobile assembly plants. The coating compositions applied to such elastomeric substrates are typically formulated to be very flexible so the coating can bend or flex with the substrate without cracking. To achieve the requisite flexibility, coating compositions for use on elastomeric substrates often are formulated to produce coatings with lower crosslink densities or to include flexibilizing adjuvants which act to lower the overall film glass transition temperature (Tg). While acceptable flexibility properties can be achieved with these formulating techniques, they also can result in softer films that are susceptible to scratching. Consequently, great expense and care must be taken to package the coated parts to prevent scratching of the coated surfaces during shipping to automobile assembly plants.

U.S. Pat. No. 6,235,858 B1 discloses carbamate and/or urea functional polymers for use in coating compositions, especially clear coating compositions for color-plus-clear coating systems. Such polymers provide coatings with good resistance to damage caused by acidic precipitation.

U.S. Pat. No. 5,853,809 discloses clearcoats in color-plus-clear systems which have improved scratch resistance due to the inclusion in the coating composition of inorganic particles such as colloidal silicas which have been surface modified with a reactive coupling agent via covalent bonding.

A number of patents disclose the use of a surface active material, for example, a polysiloxane, in coating compositions to improve mar resistance of the cured coatings. U.S. Pat. Nos. 5,939,491 and 6,225,434B1 disclose coating compositions comprising organic polysiloxanes having reactive functional groups. These polysiloxanes provide coatings with improved mar and scratch resistance.

A number of patents disclose the use of boric acid in polymeric compositions. For example, U.S. Pat. Nos. 5,951,747 and 6,059,867 discloses the use of boric acid and borates in conjunction with a succinate in non-chromate, corrosion-inhibiting coating compositions for improved adhesion to metallic surfaces. Such compositions further include inhibitors such as phosphates, phosphosilicates, silicates, titanates, and zinc salts. U.S. Pat. No. 4,832,990 discloses a process for improving adhesion of polyolefins to metal substrates comprising mechanical cleaning of the metal surface, treating the metal surface with a water-alcohol solution containing an alkoxysilane and boric acid, thermally treating the acid treated substrate, and subsequently treating the substrate with a polyolefin-based composition comprising zeolites and carbon black pigment. U.S. Pat. No. 5,073,455 discloses a thermoplastic laminated film which has improved adhesion to hydrophilic polymers, hydrophobic polymers and inorganic substances. The film comprise a base film of thermoplastic resin and a layer formed on the base film comprising a composition of one or more of water-soluble resins, water emulsified resins and water-dispersible resins, and an organic boron polymer or a mixture composed of an organic boron polymer and vinyl alcohol.

Multi-layer composite coatings are commonplace in modern coating lines. For example, a typical automotive coating system can include the sequential application of an electrodeposition primer, a primer-surfacer, a color enhancing base coat, and a transparent top coat. In some instances, the electrodeposition primer is applied over a mill-applied weldable, thermosetting coating which has been applied to the coiled steel metal substrate from which the automobile body (or body parts, such as fenders, doors and hoods) has been formed. Also, adhesive coatings, for example, windshield adhesives, trim and molding adhesives and structural adhesives are sometimes applied to the cured top coats where necessary. Due to these multi-layer composite coating processes, it is necessary that the previously applied coating layer have excellent intercoat or interlayer adhesion to the subsequently applied coating layer(s).

Although the aforementioned coating compositions exhibit improvements for acid etch resistance and mar and scratch resistance, such compositions may not be readily recoatable. That is, when a subsequent coating is applied to the cured mar and scratch resistant coating composition, the intercoat adhesion between the cured coating and the subsequently applied coating can be quite poor.

For example, as mentioned above, on most vehicle coating lines the vehicle body is first given a corrosion inhibitive electrodepositable primer coating commonly formed from a cationic electrodepositable coating composition. This electrodeposition primer is fully cured and, a primer-surfacer is typically applied to the cured electrodeposition primer. The primer-surfacer serves to enhance chip resistance of subsequently applied top coatings as well as to ensure good appearance of the top coatings. The top coats, either a monocoat or a color-plus-clear system, are then applied to the cured primer-surfacer coating. While most top coats have excellent intercoat adhesion to the primer-surfacer coating, some top coating compositions inherently can exhibit intercoat adhesion problems with some primer-surfacer coatings.

Also, due to the interest in cost-savings, there is recent interest in the automotive coatings market in eliminating the primer-surfacer step altogether. That is, the top coats can be directly applied to the cured electrodeposition primer. In such modified coating processes, the electrodeposition primer is required to meet stringent durability and appearance specifications. Moreover, the cured electrodepositable primer must have excellent intercoat adhesion to the subsequently applied top coats (either monocoats or color coats of a color-plus-clear system).

On commercial automobile coating lines during application of the coating system, certain portions of the line can experience occasional process problems, for example, clearcoat applicator malfunctions, or curing oven faults where temperatures are out of specification. While the color coat typically is "flash cured" to drive off solvent, but not fully cure the coating, once the clear coating has been applied, the color-plus-clear coating system typically is given a full cure (e.g., 250° F. for 20 minutes) to simultaneously cure both the base coat and the top coat. In instances where the clear coat application system is malfunctioning, the auto body with the applied color coat will continue through the clear coat applicator station and into the clear coat curing oven, thereby fully curing the color coat. If this occurs, some automobile manufacturers elect to reapply the color coat over the fully cured color coat prior to application of the clearcoat. In such situations, the fully cured color coat can have poor intercoat adhesion with the subsequently applied color coat, even though the compositions may be the same.

Also, windshields and other items such as trim moldings typically are affixed to the body of a vehicle with an adhesive material, typically a moisture-cured material containing isocyanate group-containing polymers. Motor Vehicle Safety Standards (MVSS) require that these adhesives have complete adhesion to both the windshield and the coated substrate to which they are applied. Similar adhesive compositions can be used as structural adhesives as well. Such adhesives, for example, are commercially available from Essex Specialty Products, Inc. of Auburn Hills, Mich. These adhesive products adhere well to many cured top coating compositions used to coat vehicles such as automobiles. It is known, however, that these adhesive materials often do not completely adhere to some top coats, for example, those formed from coating compositions based on carbamate and/or urea containing polymers. This necessitates the application of a primer coating to the cured carbamate and/or urea-based top coatings prior to application of the windshield adhesive to ensure compliance with the aforementioned Motor Vehicle Safety Standards. Such primer coatings are typically based on moisture-curable polymers similar to those comprising the adhesive. Use of such primer coatings has proven to be effective, but primer coating application adds an additional and expensive step to the windshield or trim installation process.

Moreover, as discussed previously, during the assembly process, the applied color-plus-clear coating can include surface defects in the clear coat surface which requires repair. Some automobile manufacturers elect to remove the defect and recoat the repair area with the same clear coat composition. In this instance, the cured clear coat must have excellent intercoat adhesion to the subsequently applied clear coat. It is known, however, that some clear coats when cured have poor intercoat adhesion with the subsequently applied repair clear coat.

In view of the foregoing, there obviously remains a need in the coating industry for coating compositions which have improved properties such as acid etch resistance and mar and scratch resistance while maintaining excellent intercoat or interlayer adhesion to subsequently applied coatings and/or adhesives.

SUMMARY OF THE INVENTION

In one embodiment a coating composition formed from components comprising (a) at least one polysiloxane comprising at least one reactive functional group, the polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2 \leq (m+n) < 4$; (b) at least one reactant comprising at least one functional group that is reactive with the reactive functional group of the polysiloxane (a); and (c) at least one compound selected from borates, aluminates, titanates, zirconates, silicates, siloxanes, silanes and mixtures thereof, wherein each component is different.

In one embodiment, the present invention provides a coating composition formed from components comprising (a) at least one polysiloxane comprising at least one reactive functional group, the polysiloxane comprising at least one of the structural units (I) as described above, wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; (b) at least one reactant comprising at least one functional group that is reactive with the reactive functional group of the polysiloxane (a); and (c) at least one boron-containing compound selected from boric acid, boric acid equivalents and mixtures thereof, wherein each component is different.

In another embodiment, the present invention provides a coating composition formed from components comprising (a) at least one polysiloxane comprising at least one reactive functional group, the polysiloxane comprising at least one of the structural units (1), wherein each $R^1$, which may be identical or different, represents H, OH, a monovalent hydrocarbon group or a monovalent siloxane group; each $R^2$, which may be identical or different, represents a group comprising at least one reactive functional group selected from a hydroxyl group and a carbamate group, wherein m and n fulfill the requirements of $0<n<4$, $0<m<4$ and $2\leq(m+n)<4$; (b) at least one reactant comprising at least one curing agent having at least one functional group reactive with the functional group of the polysiloxane (a), the curing agent selected from at least one of a polyisocyanate, a blocked isocyanate, and an aminoplast resin; (c) at least one boron-containing compound selected from boric acid, boric acid equivalents, and mixtures thereof; and (d) a plurality of particles selected from inorganic particles, composite particles, and mixtures thereof, wherein each component is different.

The present invention also provides a coating composition formed from components comprising (a) at least one polysiloxane comprising at least one reactive functional group, the polysiloxane comprising at least one of the structural units (I), wherein each $R^1$, which may be identical or different, represents H, OH, a monovalent hydrocarbon group or a monovalent siloxane group; each $R^2$, which may be identical or different, represents a group comprising at least one reactive functional group selected from a hydroxyl group, and a carbamate group, wherein m and n fulfill the requirements of $0<n<4$, $0<m<4$ and $2\leq(m+n)<4$; (b) at least one reactant comprising at least one curing agent having at least one functional group reactive with the functional group of the polysiloxane (a), the curing agent selected from at least one of a polyisocyanate, a blocked isocyanate, and an aminoplast resin; (c) at least one boron-containing compound selected from boric acid and organic derivatives thereof; (d) a plurality of particles selected from inorganic particles, composite particles, and mixtures thereof; and (e) at least one film-forming polymer selected from polyether polymers, polyester polymers, acrylic polymers and polyurethane polymers, said film-forming polymer having functional groups reactive with the functional groups of (a) and/or (b), wherein each component is different.

A further embodiment of the present invention provides a coating composition formed from components comprising (a) at least one polysiloxane having the following structure (II) or (III):

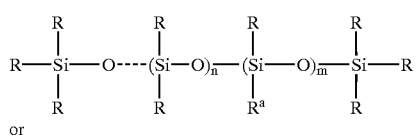

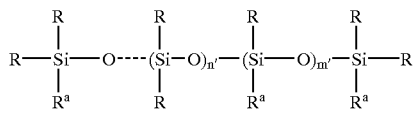

wherein m has a value of at least 1; m' ranges from 0 to 75; n ranges from 0 to 5; n' ranges from 0 to 75; each R, which may be identical or different, is selected from H, OH, monovalent hydrocarbon groups, monovalent siloxane groups, and mixtures of any of the foregoing; and $R^a$ comprises the following structure (IV):

$$—R^3—X \qquad (IV)$$

wherein $—R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group and a carbamate group; (b) at least one reactant comprising at least one curing agent having at least one functional group reactive with the at least one functional group of the polysiloxane (a), the curing agent selected from at least one of a polyisocyanate, a blocked isocyanate, and an aminoplast resin; (c) at least one boron-containing compound selected from boric acid, boric acid equivalents, and mixtures thereof; (d) a plurality of inorganic particles selected from fumed silica, amorphous silica, colloidal silica, alumina, colloidal alumina, titanium dioxide, cesium oxide, yttrium oxide, colloidal yttria, zirconia, colloidal zirconia and mixtures of any of the foregoing, and mixtures thereof; and (e) at least one film-forming acrylic polymer having reactive functional groups selected from hydroxyl groups and carbamate groups, wherein each component is different.

Additionally, multi-component composite coatings formed from a basecoat deposited from a film-forming base coating composition and a top coat which is applied over at least a portion of the basecoat and which is formed from any of the foregoing coating compositions is provided.

Another aspect of the present invention is a method of repairing a multi-layer composite coating comprising a base coat formed on a substrate from a film-forming base coating composition and a first top coat deposited over at least a portion of the base coat, the first top coat formed from a first film-forming top coating composition comprising any of the foregoing coating compositions, the method comprising: locating an area of the composite coating which is flawed, applying a repair top coat film-forming composition to the flawed area after the flawed area has been prepared for repairing, wherein the repair top coat film-forming composition comprises a film-forming composition which is the same or different from the first top coat film-forming composition.

Coated substrates comprising a substrate and having any of the foregoing coating compositions coated over at least a portion of the substrate also are provided by the present invention.

DETAILED DESCRIPTION OF THE PREFERRED EMBODIMENTS

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As mentioned above, in one embodiment, the present invention is directed to a coating composition formed from components comprising (a) at least one polysiloxane comprising at least one reactive functional group, the polysiloxane comprising at least one of the following structural units (I):

$$R^1{}_n R^2{}_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; (b) at least one reactant comprising at least one functional group that is reactive with the reactive functional group of the polysiloxane (a); and (c) at least one compound selected from borates, aluminates, titanates, zirconates, silicates, siloxanes, silanes and mixtures thereof, wherein each component is different. Typically, the at least one compound (c) is selected from at least one of a borate and an aluminate. Examples of suitable borates are those discussed in detail below. Examples of titanates suitable for use in the compositions of the present invention include titanium isopropoxide, isopropyl triostearoyl titanate, dicyclo(dioct)pyrophosphato titanate, tetraisopropyl di(dioctyl)phosphito titanate. Suitable aluminates include aluminum alkoxides such as aluminum isoproxide, which is typically employed, and aluminum acetylacetonate, Exemplary of a suitable silicate is tetraethyl orthosilicate. Suitable siloxanes include tetraisopropyldisiloxanes and tetramethylsiloxane. Suitable silanes include tetramethyl silyl ethers.

In one embodiment of the present invention, a polysiloxane (a) comprising one or more hydroxyl functional groups is reacted with an aluminum alkoxide such as aluminum triisopropoxide.

In one embodiment, the present invention provides a coating composition formed from components comprising: (a) at least one polysiloxane comprising at least one reactive functional group, the polysiloxane comprising at least one of the following structural units (I):

$$R^1{}_n R^2{}_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2\leq(m+n)<4$; (b) at least one reactant comprising at least one functional group that is reactive with the reactive functional group of the polysiloxane (a); and (c) at least one boron-containing compound selected from boric acid, boric acid equivalents, organic derivatives thereof, and mixtures thereof, wherein each component is different.

The at least one boron-containing compound (c) can be selected from boric acid, boric acid equivalents, organic derivatives thereof, and mixtures thereof. As used herein, in the specification and in the claims, by "boric acid equivalents" is meant any of the numerous boron-containing compounds which can hydrolyze in aqueous media to form boric acid. Specific, but non-limiting examples of boric acid equivalents include boron oxides, for example, $B_2O_3$; boric acid esters such as those obtained by the reaction of boric acid with an alcohol or phenol.

Suitable boron-containing compounds include those selected from boric acid, boric acid equivalents, and mixtures thereof. As used herein and in the claims, by "boric acid equivalents" is meant any of the numerous boron-containing compounds which can hydrolyze in aqueous media to form boric acid. Specific, but non-limiting examples of boric acid equivalents include boron oxides, for example, $B_2O_3$; boric acid esters such as those obtained by the reaction of boric acid with an alcohol or phenol, for example, trimethyl borate, triethyl borate, tri-n-propyl borate, tri-n-butyl borate, triphenyl borate, triisopropyl borate, tri-t-amyl borate, tri-2-cyclohexylcyclohexyl borate, triethanolamine borate, triisopropylamine borate, and triisopropanolamine borate.

Additionally, other amino-containing borates and tertiary amine salts of boric acid may be useful. Such boron-containing compounds include, but are not limited to, 2-(beta-dimethylaminoisopropoxy)-4,5-dimethyl-1,3,2-dioxaborolane, 2-(beta-diethylaminoethoxy)-4,4,6-trimethyl-1,3,2-dioxaborinane, 2-(beta-dimethylaminoethoxy)-4,4,6-trimethyl-1,3,2-dioxaborinane, 2-(betha-diisopropylaminoethoxy-1,3,2-dioxaborinane, 2-(beta-dibutylaminoethoxy)-4-methyl-1,3,2-dioxaborinane, 2-(gamma-dimethylaminopropoxy)-1,3,6,9-tetrapxa-2-boracycloundecane, and 2-(beta-dimethylaminoethoxy)-4,4-(4-hydorxybutyl)-1,3,2-dioxaborolane.

Boric acid equivalents can also include metal salts of boric acid (i.e., metal borates) provided that such metal borates can readily dissociate in aqueous media to form boric acid. Suitable examples of metal borates include, for example, calcium borate, potassium borates such as potassium metaborate, potassium tetraborate, potassium pentaborate, potassium hexaborate, and potassium octaborate, sodium borates such as sodium perborate, sodium metaborate, sodium diborate, sodium tetraborate, sodium pentaborate, sodium perborate, sodium hexaborate, and sodium octaborate, Likewise, ammonium borates can be useful.

Suitable boric acid equivalents can also include organic oligomeric and polymeric compounds comprising boron-containing moieties. Suitable examples include polymeric borate esters, such as those formed by reacting an active hydrogen-containing polymer, for example, a hydroxyl functional group-containing acrylic polymer or polysiloxane polymer, with boric acid and/or a borate ester to form a polymer having borate ester groups.

Polymers suitable for this purpose can include any of a variety of active hydrogen-containing polymers such as those selected from at least one of acrylic polymers, polyester polymers, polyurethane polymers, polyether polymers and silicon-based polymers. By "silicon-based polymers" is meant a polymer comprising one or more —SiO— units in the backbone. Such silicon-based polymers can include hybrid polymers, such as those comprising organic polymeric blocks with one or more —SiO— units in the backbone.

Examples of active hydrogen-containing polymers suitable for this purpose include polymers comprising functional groups selected from at least one of a hydroxyl group, an amine group an epoxy group, a carbamate group, a urea group, and a carboxylic acid group. In a particular embodiment of the present invention, the boron-containing compound is formed by reacting boric acid and/or a borate ester with at least one polymer selected from an acrylic polyol, a polyester polyol, a polyurethane polyol, a polyether polyol, a polysiloxane polyol and mixtures thereof.

In one embodiment of the present invention, the boron-containing compound (c) comprises a polysiloxane borate ester formed from the following reactants: (A) at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of $0<n<4$, $0<m<4$ and $2 \leq (m+n)<4$; and (B) at least one boron-containing compound selected from at least one of boric acid, a boric acid equivalent, and mixtures thereof.

It should be understood that the "at least one polysiloxane comprising at least one structural unit (I)" above is a polymer that contains at least two Si atoms per molecule. As used herein, the term "polymer" is meant to encompass oligomer, and includes without limitation both homopolymers and copolymers. It should also be understood that the at least one polysiloxane can include linear, branched, dendritic or cyclic polysiloxanes.

Moreover, as used herein, "formed from" denotes open, e.g., "comprising," claim language. As such, it is intended that a composition "formed from" a list of recited components be a composition comprising at least these recited components, and can further comprise other, nonrecited components, during the composition's formation.

Also, as used herein, the term "reactive" refers to a functional group that forms a covalent bond with another functional group under conditions sufficient to cure the composition.

As used herein, the phrase "each component is different" refers to components which do not have the same chemical structure as other components in the composition.

Each of m and n depicted in the at least one structural unit (I) above fulfill the requirements of $0<n<4$, $0<m<4$ and $2 \leq (m+n)<4$. When (m+n) is 3, the value represented by n can be 2 and the value represented by m is 1. Likewise, when (m+n) is 2, the value represented by each of n and m is 1.

As used herein, the term "cure" as used in connection with a composition, e.g., "composition when cured," shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

As used herein, a "monovalent hydrocarbon group" means a monovalent group having a backbone repeat unit based exclusively on carbon. As used herein, "monovalent" refers to a substituent group that, as a substituent group, forms only one single, covalent bond. For example, a monovalent group on the at least one polysiloxane will form one single covalent bond to a silicon atom in the backbone of the at least one polysiloxane polymer. As used herein, "hydrocarbon groups" are intended to encompass both branched and unbranched hydrocarbon groups.

Thus, when referring to a "monovalent hydrocarbon group," the hydrocarbon group can be branched or unbranched, acyclic or cyclic, saturated or unsaturated, or aromatic, and can contain from 1 to 24 (or in the case of an aromatic group from 3 to 24) carbon atoms. Nonlimiting examples of such hydrocarbon groups include alkyl, alkoxy, aryl, alkaryl, and alkoxyaryl groups. Nonlimiting examples of lower alkyl groups include, for example, methyl, ethyl, propyl, and butyl groups. As used herein, "lower alkyl" refers to alkyl groups having from 1 to 6 carbon atoms. One or more of the hydrogen atoms of the hydrocarbon can be substituted with heteroatoms. As used herein, "heteroatoms" means elements other than carbon, for example, oxygen, nitrogen, and halogen atoms.

As used herein, "siloxane" means a group comprising a backbone comprising two or more —SiO— groups. For example, the siloxane groups represented by $R^1$, which is discussed above, and R, which is discussed below, can be branched or unbranched, and linear or cyclic. The siloxane groups can be substituted with pendant organic substituent groups, for example, alkyl, aryl, and alkaryl groups. The organic substituent groups can be substituted with heteroatoms, for example, oxygen, nitrogen, and halogen atoms, reactive functional groups, for example, those reactive functional groups discussed above with reference to $R^2$, and mixtures of any of the foregoing.

In one embodiment, the present invention is directed to any composition as previously described, wherein the at least one polysiloxane (A), which is used to form the polysiloxane borate ester, comprises at least two reactive functional groups. The at least one polysiloxane can have a reactive group equivalent weight ranging from 50 to 1000 mg per gram of the at least one polysiloxane. In one embodiment, the at least one polysiloxane has a hydroxyl group equivalent weight ranging from 50 to 1000 mg KOH per gram of the at least one polysiloxane. In another embodiment, the at least one polysiloxane has a hydroxyl group equivalent weight ranging from 100 to 300 mg KOH per gram of the at least one polysiloxane, while in another embodiment, the hydroxyl group equivalent weight ranges from 100 to 500 mg KOH per gram.

In another embodiment, the present invention is directed to any compositions as described above, wherein $R^2$ (see structural unit I above), which may be identical or different, represents a group comprising at least one reactive functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

In another embodiment, the present invention is directed to any composition as previously described, wherein at least one $R^2$ group represents a group comprising at least one reactive functional group selected from a hydroxyl group and a carbamate group. In yet another embodiment, the present invention is directed to any composition as previously described, wherein at least one $R^2$ group represents a group comprising at least two reactive functional groups selected from a hydroxyl group and a carbamate group. In another embodiment, the present invention is directed to any composition as previously described, wherein at least one $R^2$ group represents a group comprising an oxyalkylene group and at least two hydroxyl groups.

In one embodiment, the present invention is directed to any composition as previously described, wherein the at least one polysiloxane (A), which is used to form the polysiloxane borate ester, has the following structure (II) or (III):

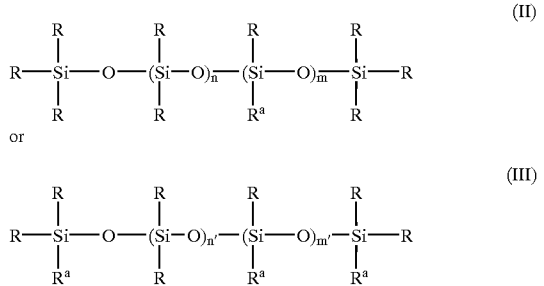

wherein: m has a value of at least 1; m' ranges from 0 to 75; n ranges from 0 to 75; n' ranges from 0 to 75; each R, which may be identical or different, is selected from H, OH, a monovalent hydrocarbon group, a monovalent siloxane group, and mixtures of any of the foregoing; and —$R^a$ comprises the following structure (IV):

wherein —$R^3$ is selected from an alkylene group, an oxyalkylene group, an alkylene aryl group, an alkenylene group, an oxyalkenylene group, and an alkenylene aryl group; and X represents a group which comprises at least one reactive functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group.

In one embodiment of the present invention, X represents a group which comprises at least one reactive functional group selected from a hydroxyl group, a carboxyl group, a primary amine group, a secondary amine group, an amide group, a carbamate group, a urea group, an anhydride group, a hydroxy alkylamide group, and an epoxy group.

As used herein, "alkylene" refers to an acyclic or cyclic, saturated hydrocarbon group having a carbon chain length of from $C_2$ to $C_{25}$. Nonlimiting examples of suitable alkylene groups include, but are not limited to, those derived from propenyl, 1-butenyl, 1-pentenyl, 1-decenyl, and 1-heneicosenyl, such as, for example $(CH_2)_3$, $(CH_2)_4$, $(CH_2)_5$, $(CH_2)_{10}$, and $(CH_2)_{23}$, respectively, as well as isoprene and myrcene.

As used herein, "oxyalkylene" refers to an alkylene group containing at least one oxygen atom bonded to, and interposed between, two carbon atoms and having an alkylene carbon chain length of from $C_2$ to $C_{25}$. Nonlimiting examples of suitable oxyalkylene groups include those derived from trimethylolpropane monoallyl ether, trimethylolpropane diallyl ether, pentaerythritol monoallyl ether, polyethoxylated allyl alcohol, and polypropoxylated allyl alcohol, such as —$(CH_2)_3OCH_2C(CH_2OH)_2(CH_2CH_2—)$.

As used herein, "alkylene aryl" refers to an acyclic alkylene group substituted with at least one aryl group, for example, phenyl, and having an alkylene carbon chain length of $C_2$ to $C_{25}$. The aryl group can be further substituted, if desired. Nonlimiting examples of suitable substituent groups for the aryl group include, but are not limited to, hydroxyl groups, benzyl groups, carboxylic acid groups, and aliphatic hydrocarbon groups. Nonlimiting examples of suitable alkylene aryl groups include, but are not limited to, those derived from styrene and 3-isopropenyl-, -dimethylbenzyl isocyanate, such as —$(CH_2)_2C_6H_4$— and —$CH_2CH(CH_3)C_6H_3(C(CH_3)_2$ (NCO). As used herein, "alkenylene" refers to an acyclic or cyclic hydrocarbon group having one or more double bonds and having an alkenylene carbon chain length of $C_2$ to $C_{25}$. Nonlimiting examples of suitable alkenylene groups include those derived from propargyl alcohol and acetylenic diols, for example, 2,4,7,9-tetramethyl-5-decyne-4,7-diol which is commercially available from Air Products and Chemicals, Inc. of Allentown, Pa. as SURFYNOL 104.

Formulae (II) and (III) are diagrammatic, and are not intended to imply that the parenthetical portions are necessarily blocks, although blocks may be used where desired. In some cases the polysiloxane may comprise a variety of siloxane units. This is increasingly true as the number of siloxane units employed increases and especially true when mixtures of a number of different siloxane units are used. In those instances where a plurality of siloxane units are used and it is desired to form blocks, oligomers can be formed which can be joined to form the block compound. By judicious choice of reactants, compounds having an alternating structure or blocks of alternating structure may be used.

In one embodiment of the present invention the substituent group $R^3$ represents an oxyalkylene group. In another embodiment, $R^3$ represents an oxyalkylene group, and X represents a group which comprises at least two reactive functional groups.

In another embodiment of the present invention where the at least one polysiloxane (A) has the structure (II) or (III) described above, (n+m) ranges from 2 to 9. In yet another embodiment where the at least one polysiloxane have the structure (II) or (III) described above, (n+m) ranges from 2 to 3. In another embodiment, where the at least one polysiloxane have the structure (II) or (III) described above, (n'+m') ranges from 2 to 9. In another embodiment where the at least one polysiloxane has the structure (II) or (III) described above, (n'+m') ranges from 2 to 3.

In yet another embodiment of the present invention, the substituent X represents a group comprising at least one reactive functional group selected from a hydroxyl group and a carbamate group. In another embodiment, the substituent X represents a group which comprises at least two hydroxyl groups. In yet another embodiment, X represents a group which comprises at least one group selected from H, a monohydroxy-substituted organic group, and a group having the following structure (V):

wherein the substituent group $R^4$ represents —$CH_2$—C—$R^3$
when p is 2 and the substituent group $R^3$ represents a $C_1$ to $C_4$ alkylene group, or the substituent group $R^4$ represents —$CH_2$—C — when p is 3, wherein at least a portion of X represents a group having the structure (V).

In another embodiment, where the polysiloxane (A) has the structure (I) or (11) described above, m is 2 and p is 2.

In another embodiment of the present invention, the polysiloxane (A) is formed from at least the following reactants: (i) at least one polysiloxane of the formula (VI):

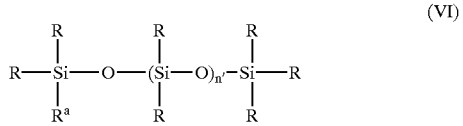

wherein each substituent group R, which may be identical or different, represents a group selected from H, OH, a monovalent hydrocarbon group, a monovalent siloxane group, and mixtures of any of the foregoing; at least one of the groups represented by R is H, and n' ranges from 0 to 100, also can range from 0 to 10, and can further range from 0 to 5, such that the percent of SiH content of the polysiloxane ranges from 2 to 50 percent, and can range from 5 to 25 percent; and (ii) at least one molecule which comprises at least one functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group such as an acrylate group and a methacrylate group, a maleimide group, a fumarate group, an onium salt group such as a sulfonium group and an ammonium group, an anhydride group, a hydroxy alkylamide group, and an epoxy group and at least one unsaturated bond capable of undergoing a hydrosilylation reaction. In another embodiment, the at least one functional group comprises hydroxyl groups.

It should be appreciated that the various R groups can be the same or different, and, in certain embodiments, the R groups will be entirely monovalent hydrocarbon groups or will be a mixture of different groups such as, for example, monovalent hydrocarbon groups and hydroxyl groups.

In another embodiment, this reaction product is ungelled. As used herein, "ungelled" refers to a reaction product that is substantially free of crosslinking and has an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of an extremely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000.

It also should be noted that the level of unsaturation contained in reactant (ii) above, can be selected to obtain an ungelled reaction product. In other words, when a polysiloxane containing silicon hydride (i) having a higher average value of Si—H functionality is used, reactant (ii) can have a lower level of unsaturation. For example, the polysiloxane containing silicon hydride (i) can be a low molecular weight material where n' ranges from 0 to 5 and the average value of Si—H functionality is two or less. In this case, reactant (ii) can contain two or more unsaturated bonds capable of undergoing hydrosilylation reaction without the occurrence of gelation.

Nonlimiting examples of polysiloxanes containing silicon hydride (i) include 1,1,3,3-tetramethyl disiloxane where n' is 0 and the average Si—H functionality is two; and polymethyl polysiloxane containing silicon hydride, where n' ranges from 4 to 5 and the average Si—H functionality is approximately two, such as is commercially available from BASF Corporation as MASILWAX BASE®.

Materials for use as reactant (ii) above can include hydroxyl functional group-containing allyl ethers such as those selected from trimethylolpropane monoallyl ether, pentaerythritol monoallyl ether, trimethylolpropane diallyl ether, polyoxyalkylene alcohols such as polyethoxylated alcohol, polypropoxylated alcohol, and polybutoxylated alcohol, undecylenic acid-epoxy adducts, allyl glycidyl ether-carboxylic acid adducts, and mixtures of any of the foregoing. Mixtures of hydroxyl functional polyallyl ethers with hydroxyl functional monoallyl ethers or allyl alcohols are suitable as well. In certain instances, reactant (ii) can contain at least one unsaturated bond in a terminal position. Reaction conditions and the ratio of reactants (i) and (ii) are selected so as to form the desired functional group.

The hydroxyl functional group-containing polysiloxane (A) can be prepared by reacting a polysiloxane containing hydroxyl functional groups with an anhydride to form the half-ester acid group under reaction conditions that favor only the reaction of the an hydride and the hydroxyl functional groups, and avoid further esterification from occurring. Nonlimiting examples of suitable anhydrides include hexahydrophthalic anhydride, methyl hexahydrophthalic anhydride, phthalic anhydride, trimellitic anhydride, succinic anhydride, chlorendic anhydride, alkenyl succinic anhydride, and substituted alkenyl anhydrides such as octenyl succinic anhydride, and mixtures of any of the foregoing.

The half-ester group-containing reaction product thus prepared can be further reacted with a monoepoxide to form a polysiloxane containing secondary hydroxyl group(s). Nonlimiting examples of suitable monoepoxides are phenyl glycidyl ether, n-butyl glycidyl ether, cresyl glycidyl ether, isopropyl glycidyl ether, glycidyl versatate, for example, CARDURA E available from Shell Chemical Co., and mixtures of any of the foregoing.

In another embodiment of the present invention, the at least one polysiloxane (A) is a carbamate functional group-containing polysiloxane which comprises the reaction product of at least the following reactants:
(i) at least one polysiloxane containing silicon hydride of structure (VI) above where R and n' are as described above for that structure;
(ii) at least one hydroxyl functional group-containing material having one or more unsaturated bonds capable of undergoing hydrosilylation reaction as described above; and (iii) at least one low molecular weight carbamate functional material, comprising the reaction product of an alcohol or glycol ether and a urea.

Examples of such "low molecular weight carbamate functional material" include, but are not limited to, alkyl carbamate and hexyl carbamates, and glycol ether carbamates described in U.S. Pat. Nos. 5,922,475 and 5,976,701, which is incorporated herein by reference.

The carbamate functional groups can be incorporated into the polysiloxane by reacting the hydroxyl functional group-containing polysiloxane with the low molecular weight carbamate functional material via a "transcarbamoylation" process. The low molecular weight carbamate functional material, which can be derived from an alcohol or glycol ether, can react with free hydroxyl groups of a polysiloxane polyol, that is, material having an average of two or more hydroxyl groups per molecule, yielding a carbamate functional polysiloxane (A) and the original alcohol or glycol ether. Reaction conditions and the ratio of reactants (i), (ii) and (iii) are selected so as to form the desired groups.

The low molecular weight carbamate functional material can be prepared by reacting the alcohol or glycol ether with urea in the presence of a catalyst such as butyl stannoic acid. Nonlimiting examples of suitable alcohols include lower molecular weight aliphatic, cycloaliphatic and aromatic alcohols, for example, methanol, ethanol, propanol, butanol, cyclohexanol, 2-ethylhexanol, and 3-methylbutanol. Nonlimiting examples of suitable glycol ethers include ethylene glycol methyl ether, and propylene glycol methyl ether. The incorporation of carbamate functional groups into the polysiloxane also can be achieved by reacting isocyanic acid with free hydroxyl groups of the polysiloxane.

As aforementioned, in addition to or in lieu of hydroxyl or carbamate functional groups, the at least one polysiloxane (A) can contain one or more other reactive functional groups such as carboxyl groups, isocyanate groups, blocked isocyanate groups, carboxylate groups, primary or secondary amine groups, amide groups, urea groups, urethane groups, an anhydride group, a hydroxy alkylamide group, epoxy groups, and mixtures of any of the foregoing.

When the at least one polysiloxane (A) contains carboxyl functional groups, the at least one polysiloxane (A) can be prepared by reacting at least one polysiloxane containing hydroxyl functional groups as described above with a polycarboxylic acid or anhydride. Nonlimiting examples of polycarboxylic acids suitable for use include adipic acid, succinic acid, and dodecanedioic acid. Nonlimiting examples of suitable anhydrides include those described above. Reaction conditions and the ratio of reactants are selected so as to form the desired functional groups.

In the case where at least one polysiloxane (A) contains one or more isocyanate functional groups, the at least one polysiloxane can be prepared by reacting at least one polysiloxane containing hydroxyl functional groups, as described above, with a polyisocyanate, such as a diisocyanate. Nonlimiting examples of suitable polyisocyanates include aliphatic polyisocyanates, such as, for example, aliphatic diisocyanates, for example, 1,4-tetramethylene diisocyanate and 1,6-hexamethylene diisocyanate; cycloaliphatic polyisocyanates, for example, 1,4-cyclohexyl diisocyanate, isophorone diisocyanate, and α,α-xylylene diisocyanate; and aromatic polyisocyanates, for example, 4,4'-diphenylmethane diisocyanate, 1,3-phenylene diisocyanate, and tolylene diisocyanate. These and other suitable polyisocyanates are described in more detail in U.S. Pat. No. 4,046,729, at column 5, line 26 to column 6, line 28, incorporated herein by reference. Reaction conditions and the ratio of reactants are selected so as to form the desired functional groups. The substituent X in structure (IV) can comprise an oligomeric or polymeric urethane or urea-containing material which is terminated with isocyanate, hydroxyl, primary or secondary amine functional groups, or mixtures of any of the foregoing. When the substituent X comprises such functional groups, the at least one polysiloxane can be the reaction product of at least one polysiloxane polyol as described above, one or more polyisocyanates and, optionally, one or more compounds having at least two active hydrogen atoms per molecule selected from hydroxyl groups, primary amine groups, and secondary amine groups.

Nonlimiting examples of suitable polyisocyanates are those described above. Nonlimiting examples of compounds having at least two active hydrogen atoms per molecule include polyols and polyamines containing primary or secondary amine groups.

Nonlimiting examples of suitable polyols include polyalkylene ether polyols, including thio ethers; polyester polyols, including polyhydroxy polyesteramides; and hydroxyl-containing polycaprolactones and hydroxy-containing acrylic interpolymers. Also useful are polyether polyols formed from the oxyalkylation of various polyols, for example, glycols such as ethylene glycol, 1,6-hexanediol, Bisphenol A, and the like, or higher polyols such as trimethylolpropane, pentaerythritol and the like. Polyester polyols also can be used. These and other suitable polyols are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both incorporated herein by reference.

Nonlimiting examples of suitable polyamines include primary or secondary diamines or polyamines in which the groups attached to the nitrogen atoms can be saturated or unsaturated, aliphatic, alicyclic, aromatic, aromatic-substituted-aliphatic, aliphatic-substituted-aromatic and heterocyclic. Exemplary suitable aliphatic and alicyclic diamines include 1,2-ethylene diamine, 1,2-porphylene diamine, 1,8-octane diamine, isophorone diamine, propane-2,2-cyclohexyl amine, and the like. Suitable aromatic diamines include phenylene diamines and the toluene diamines, for example, o-phenylene diamine and p-tolylene diamine. These and other suitable polyamines are described in detail in U.S. Pat. No. 4,046,729 at column 6, line 61 to column 7, line 26, incorporated herein by reference.

In one embodiment, the substituent group X of the structure (IV) can comprise a polymeric ester-containing group which is terminated with hydroxyl or carboxylic acid functional groups. When X is such a group, at least one polysiloxane can be the reaction product of one or more polysiloxane polyols as described above, one or more materials comprising at least one carboxylic acid functional group, and one or more organic polyols. Nonlimiting suitable examples of materials comprising at least one carboxylic acid functional group include carboxylic acid group-containing polymers well-known in the art, for example, carboxylic acid group-containing acrylic polymers, polyester polymers, and polyurethane polymers, such as those described in U.S. Pat. No. 4,681,811. Nonlimiting examples of suitable organic polyols include those described above.

To form the at least one polysiloxane (A) containing epoxy groups, at least one polysiloxane containing hydroxyl functional groups as described above can be further reacted with a polyepoxide. The polyepoxide can be an aliphatic or cycloaliphatic polyepoxide or mixtures of any of the foregoing. Nonlimiting examples of polyepoxides suitable for use include epoxy functional acrylic copolymers prepared from at least one ethylenically unsaturated monomer comprising at least one epoxy group, for example glycidyl (meth)acrylate and allyl glycidyl ether, and one or more ethylenically unsaturated monomers which have no epoxy functionality. The preparation of such epoxy functional acrylic copolymers is described in detail in U.S. Pat. No. 4,681,811 at column 4, line 52 to column 5, line 50, incorporated herein by reference. Reaction conditions and the ratio of reactants are selected so as to form the desired functional groups.

In the embodiment of the present invention where the boron-containing compound (c) is formed from the at least one functional group-containing polysiloxane (A) and the boron-containing compound (B), the at least one polysiloxane (A) can be reacted with the boron-containing compound (B) under condensation reaction conditions well known in the art. For example, mixing boric acid or a boric acid equivalent with a polyol and removing water by distillation either directly or in combination with a solvent. Other methods for preparing boric acid esters can be found in "Kirk-Othmer Encyclopedia of Chemical Technology" 4th edition, Vol 4, p 416; John Wiley and sons; 1992 Also, it should be understood, that the boron-containing compound (c) can be formed in situ. That is, the coating composition can comprise boric acid and/or a borate ester and an active hydrogen-containing reactant, such as a polymer or polysiloxane comprising hydroxyl functional groups, as separate components. The boron-containing compound (c) can then be formed, for example, by forming the condensate, i.e., the borate ester, within the composition at ambient temperature, or as the coating composition undergoes a curing reaction. When the boron-containing compound is formed in situ such as described immediately above, the coating composition can comprise the condensate reaction product (i.e., the borate ester), as well as the individual reactants used to form the borate ester, that is the boric acid and/or borate ester and the active hydrogen-containing reactant, as three separate ingredients.

The boron-containing compound (c), when added to the other components that form the coating composition, can be present in the coating composition in an amount sufficient to provide an amount of boron present in the composition of at least 0.001 weight percent, often at least 0.025 weight percent, usually at least 0.05 weight percent, and typically at least 0.10 weight percent, based on total weight of the resin solids present in the composition. Also, the boron-containing compound (c), when added to the other components that form the coating composition, can be present in the coating composition in an amount sufficient to provide an amount of boron present in the composition of less than 5 weight percent, often less than 3 weight percent, usually less than 2.5 weight percent, and typically less than 2 weight percent, based on total weight of the resin solids present in the composition. The amount of boron-containing compound (c) is present in the composition in an amount sufficient to provide an amount of boron present in the composition that can range between any combination of these values inclusive of the recited values.

As previously mentioned, the present invention is directed to coating compositions comprising, in addition to the boron-containing compound (c) discussed in detail above, at least one functional group-containing polysiloxane (a) and at least one reactant (b) comprising at least one functional group that is reactive with the functional group(s) of the polysiloxane (a) (and, if desired, the boron-containing compound (c)).

The polysiloxane (a) can be any of the polysiloxanes described above with reference to polysiloxane (A) used to form the polysiloxane borate ester. In one embodiment of the present invention, the polysiloxane (a) comprises at least one of the structural units (1), wherein $R^1$, $R^2$, m and n are as described above for that structural unit. In a further embodiment of the present invention, the polysiloxane (a) comprises at least one polysiloxane having the structure (I) or (II), where R, $R^3$, $R^a$, m, m', n, n', and X are as described above for these structures.

In one embodiment, the present invention is directed to coating compositions as previously described wherein the at least one polysiloxane (a), when added to the other components that form the composition, is present in the composition such that the polysiloxane (a) is present in an amount ranging from 0.01 to 90 weight percent based on total weight of resin solids present in the composition. In another embodiment, the present invention is directed to coating compositions as previously described wherein the at least one polysiloxane (a), when added to the other components that form the composition, is present in the composition in an amount such that the polysiloxane (a) is present in the composition in an amount from at least 2 weight percent based on total weight of resin solids present in the composition.

In another embodiment, the present invention is directed to coating compositions as previously described wherein the at least one polysiloxane (a), when added to the other components that form the composition, is present in the composition in an amount such that the polysiloxane (a) is present in an amount from at least 5 weight percent based on total weight of resin solids present in the composition. In yet another embodiment, the present invention is directed to coating compositions as previously described wherein the at least one polysiloxane (a), when added to the other components that form the composition, is present in the composition such that the polysiloxane (a) is present in the composition in an amount from at least 10 weight percent based on total weight of resin solids present in the composition.

In one embodiment, the present invention is directed to coating compositions as previously described wherein the at least one polysiloxane (a), when added to the other components that form the composition, is present in the composition in an amount such that the amount of the polysiloxane (a) present in the composition is less than 90 weight percent based on total weight of resin solids present in the composition. In another embodiment, the present invention is directed to coating compositions as previously described wherein the at least one polysiloxane (a), when added to the other components that form the composition, is present in the composition in an amount such that the amount of the polysiloxane (a) present in the composition is less than 80 weight percent based on total weight of resin solids present in the composition.

In another embodiment, the present invention is directed to coating compositions as previously described wherein the at least one polysiloxane (a), when added to the other components that form the composition, is present in the composition in an amount such that the amount of the polysiloxane (a) present in the composition is less than 65 weight percent based on total weight of resin solids present in the composition. In yet another embodiment, the present invention is directed to coating compositions as previously described wherein the at least one polysiloxane (a), when added to the other components that form the composition, is present in the composition in an amount such that the amount of the polysiloxane (a) is less than 30 weight percent based on total weight of resin solids present in the composition.

As used herein "based on total weight of the resin solids" of the composition means that the amount of the component added during the formation of the composition is based upon the total weight of the resin solids (non-volatiles) of the polysiloxane (a), any film-forming component and any curing agent present during the formation of the coating composition, but not including the particles, any solvent, or any additive solids such as hindered amine stabilizers, UV light absorbers, catalysts, pigments including pigment extenders and fillers, and flow modifiers.

As aforementioned, in addition to the components (a) and (c) described in detail above, the components from which the coating composition of the present invention is formed can further comprise (b) at least one reactant comprising at least one functional group that is reactive with at least one functional group of the at least one polysiloxane (a), wherein each component is different. As used herein, the "at least one reactant" refers to any material comprising a functional group that is reactive with at least one functional group selected from at least one functional group of the at least one polysiloxane (a) and, optionally, the at least one functional group-containing film-forming polymer discussed in detail below. If applicable the at least one reactant (b) may also be reactive with the reactive functional groups, if any, comprising the boron-containing compound (c) discussed above.

In one embodiment, the at least one reactant (b) is selected from at least one curing agent. Dependent upon the reactive functional groups of component (a)(and/or component (c) if desired), this curing agent can be selected from an aminoplast resin, a polyisocyanate, a blocked isocyanate compound, a polyepoxide, a polyacid, an anhydride, an amine, a polyol, and mixtures of any of the foregoing. In one embodiment, the at least one reactant (b) is selected from an aminoplast resin and a polyisocyanate.

In another embodiment, the present invention is directed to any composition as previously described wherein the curing agent is an aminoplast. Aminoplast resins, which comprise phenoplasts, as curing agents for hydroxyl, carboxylic acid, and carbamate functional group-containing materials are well known in the art. Suitable aminoplasts, such as, for example, those discussed above, are known to those of ordinary skill in the art. Aminoplasts can be obtained from the condensation reaction of formaldehyde with an amine or amide. Nonlimiting examples of amines or amides include melamine, urea, or benzoguanamine. Condensates with other amines or amides can be used; for example, aldehyde condensates of glycoluril, which give a high melting crystalline product useful in powder coatings. While the aldehyde used is most often formaldehyde, other aldehydes such as acetaldehyde, crotonaldehyde, and benzaldehyde can be used.

The aminoplast contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol.

Nonlimiting examples of aminoplasts include melamine-, urea-, or benzoguanamine-formaldehyde condensates, in certain instances monomeric and at least partially etherified with one or more alcohols containing from one to four carbon atoms. Nonlimiting examples of suitable aminoplast resins are commercially available, for example, from Cytec Industries, Inc. under the trademark CYMEL® and from Solutia, Inc. under the trademark RESIMENE®.

In another embodiment, the present invention is directed to coating compositions as previously described wherein the curing agent comprises an aminoplast resin which, when added to the other components that form the composition, is generally present in an amount ranging from 2 weight percent to 65 weight percent, can be present in an amount ranging from 5 weight percent to 50 weight percent, and typically is present in an amount ranging from 5 weight percent to 40 weight percent based on total weight of resin solids present in the composition.

In yet another embodiment, the present invention is directed to coating compositions as previously described wherein the at least one reactant (b) comprises a polyisocyanate curing agent. As used herein, unless otherwise indicated, the term "polyisocyanate" is intended to include blocked (or capped) polyisocyanates as well as unblocked isocyanates. The polyisocyanate can be an aliphatic or an aromatic polyisocyanate, or a mixture of the foregoing two. Diisocyanates can be used, although higher polyisocyanates such as isocyanurates of diisocyanates are often used. Higher polyisocyanates also can be used in combination with diisocyanates. Isocyanate prepolymers, for example, reaction products of polyisocyanates with polyols also can be used. Mixtures of polyisocyanate curing agents can be used.

If the polyisocyanate is blocked or capped, any suitable aliphatic, cycloaliphatic, or aromatic alkyl monoalcohol known to those skilled in the art can be used as a capping agent for the polyisocyanate. Other suitable capping agents include oximes and lactams. When used, the polyisocyanate curing agent is typically present, when added to the other components which form the coating composition, in an amount ranging from 5 to 65 weight percent, can be present in an amount ranging from 10 to 45 weight percent, and often are present in an amount ranging from 15 to 40 percent by weight based on the total weight of resin solids present in the composition.

Other useful curing agents comprise blocked isocyanate compounds such as, for example, the tricarbamoyl triazine compounds described in detail in U.S. Pat. No. 5,084,541, which is incorporated by reference herein. When used, the blocked polyisocyante curing agent can be present, when added to the other components in the composition, in an amount ranging up to 20 weight percent, and can be present in an amount ranging from 1 to 20 weight percent, based on the total weight of resin solids present in the composition.

In one embodiment, the present invention is directed to film-forming compositions as previously described, wherein the at least one reactant (b) comprises as a curing agent both an aminoplast resin and a polyisocyanate.

Anhydrides as curing agents for hydroxyl functional group-containing materials also are well known in the art and can be used in the present invention. Nonlimiting examples of anhydrides suitable for use as curing agents in the compositions of the invention include those having at least two carboxylic acid anhydride groups per molecule which are derived from a mixture of monomers comprising an ethylenically unsaturated carboxylic acid anhydride and at least one vinyl co-monomer, for example, styrene, alphamethyl styrene, vinyl toluene, and the like. Nonlimiting examples of suitable ethylenically unsaturated carboxylic acid an hydrides include maleic anhydride, citraconic anhydride, and itaconic anhydride. Alternatively, the anhydride can be an anhydride adduct of a diene polymer such as maleinized polybutadiene or a maleinized copolymer of butadiene, for example, a butadiene/styrene copolymer. These and other suitable anhydride curing agents are described in U.S. Pat. No. 4,798,746 at column 10, lines 16–50; and in U.S. Pat. No. 4,732,790 at column 3, lines 41–57, both of which are incorporated herein by reference.

Polyepoxides as curing agents for carboxylic acid functional group-containing materials are well known in the art. Nonlimiting examples of polyepoxides suitable for use in the compositions of the present invention comprise polyglycidyl esters (such as acrylics from glycidyl methacrylate), polyglycidyl ethers of polyhydric phenols and of aliphatic alcohols, which can be prepared by etherification of the polyhydric phenol, or aliphatic alcohol with an epihalohydrin such as epichlorohydrin in the presence of alkali. These and other suitable polyepoxides are described in U.S. Pat. No. 4,681,811 at column 5, lines 33 to 58, which is incorporated herein by reference.

Suitable curing agents for epoxy functional group-containing materials comprise polyacid curing agents, such as the acid group-containing acrylic polymers prepared from an ethylenically unsaturated monomer containing at least one carboxylic acid group and at least one ethylenically unsaturated monomer which is free from carboxylic acid groups. Such acid functional acrylic polymers can have an acid number ranging from 30 to 150. Acid functional group-containing polyesters can be used as well. The above-described polyacid curing agents are described in further detail in U.S. Pat. No. 4,681,811 at column 6, line 45 to column 9, line 54, which is incorporated herein by reference.

Also well known in the art as curing agents for isocyanate functional group-containing materials are polyols, that is, materials having two or more hydroxyl groups per molecule, different from component (b) when component (b) is a polyol. Nonlimiting examples of such materials suitable for use in the compositions of the invention include polyalkylene ether polyols, including thio ethers; polyester polyols, including polyhydroxy polyesteramides; and hydroxyl-containing polycaprolactones and hydroxy-containing acrylic copolymers. Also useful are polyether polyols formed from the oxyalkylation of various polyols, for example, glycols such as ethylene glycol, 1,6-hexanediol, Bisphenol A and the like, or higher polyols such as trimethylolpropane, pentaerythritol, and the like. Polyester polyols also can be used. These and other suitable polyol curing agents are described in U.S. Pat. No. 4,046,729 at column 7, line 52 to column 8, line 9; column 8, line 29 to column 9, line 66; and U.S. Pat. No. 3,919,315 at column 2, line 64 to column 3, line 33, both of which are incorporated herein by reference.

Polyamines also can be used as curing agents for isocyanate functional group-containing materials. Nonlimiting examples of suitable polyamine curing agents include primary or secondary diamines or polyamines in which the radicals attached to the nitrogen atoms can be saturated or unsaturated, aliphatic, alicyclic, aromatic, aromatic-substituted-aliphatic, aliphatic-substituted-aromatic, and heterocyclic. Nonlimiting examples of suitable aliphatic and alicyclic diamines include 1,2-ethylene diamine, 1,2-porphylene diamine, 1,8-octane diamine, isophorone diamine, propane-2,2-cyclohexyl amine, and the like. Nonlimiting examples of suitable aromatic diamines include phenylene diamines and the toluene diamines, for example, o-phenylene diamine and p-tolylene diamine. These and other suitable polyamines described in detail in U.S. Pat. No. 4,046,729 at column 6, line 61 to column 7, line 26, which is incorporated herein by reference.

When desired, appropriate mixtures of curing agents may be used. It should be mentioned that compositions can be formulated as a one-component composition where a curing agent such as an aminoplast resin and/or a blocked isocyanate compound such as those described above is admixed with other composition components. The one-component composition can be storage stable as formulated. Alternatively, compositions can be formulated as a two-component composition where a polyisocyanate curing agent such as those described above can be added to a pre-formed admixture of the other composition components just prior to application. The pre-formed admixture can comprise curing agents such as aminoplast resins and/or blocked isocyanate compounds such as those described above.

In another embodiment in which the coating is cured by actinic radiation or the combination of actinic radiation and thermal energy, the components from which the coating composition are formed further can comprise at least one photoinitiator or photosensitizer which provides free radicals or cations to initiate the polymerization process. Useful photoinitiators have an adsorption in the range of 150 to 2,000 nm. Non-limiting examples of useful photoinitiators include benzoin, benzophenone, hydroxy benzophenone, anthraquinone, thioxanthone, substituted benzoins such as butyl isomers of benzoin ethers, α,α-diethoxyacetophenone, α,α-dimethoxy-α-phenylacetophenone, 2-hydroxy-2-methyl-1-phenyl propane 1-one and 2,4,6-trimethyl benzoyl diphenyl phosphine oxide.

In a further embodiment, the present invention is directed to coating compositions as previously described which further comprise at least one reactive functional group-containing, film forming polymer. This film forming polymer can be different from and in addition to the at least one polysiloxane (a), the at least one reactant (b), and the boron-containing compound (c). This film-forming polymer can have at least one functional group reactive with at least one functional group selected from the at least one reactive functional group of the at least one polysiloxane (a), the at least one functional group of the reactant (b), and, if desired, the boron-containing compound (c). In one embodiment, this at least one additional polymer can be selected from at least one of polyether polymers, polyester polymers, acrylic polymers, silicon-based polymers, and polyurethane polymers.

In a particular embodiment of the present invention, the film-forming polymer can comprise at least one reactive functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

In another embodiment of the present invention, the film-forming polymer comprises at least one reactive functional group selected from a hydroxyl group, a carbamate group, an epoxy group, an isocyanate group, and a carboxyl group. In another embodiment, the polymer comprises at least one reactive functional group selected from a hydroxyl group, and a carbamate group.

The film-forming polymer can comprise a mixture of any of the foregoing reactive functional groups.

Suitable film-forming polymers suitable for use as the at least one reactive functional group-containing film-forming polymer can include any of a variety of functional polymers known in the art. For example, suitable hydroxyl group-containing polymers can include acrylic polyols, polyester polyols, polyurethane polyols, polyether polyols, and mixtures thereof. In a particular embodiment of the present invention, the film-forming polymer is an acrylic polyol having a hydroxyl equivalent weight ranging from 1000 to 100 grams per solid equivalent, preferably 500 to 150 grams per solid equivalent.

Suitable hydroxyl group and/or carboxyl group-containing acrylic polymers can be prepared from polymerizable ethylenically unsaturated monomers and are typically copolymers of (meth)acrylic acid and/or hydroxylalkyl esters of (meth)acrylic acid with one or more other polymerizable ethylenically unsaturated monomers such as alkyl esters of (meth)acrylic acid including methyl (meth)acrylate, ethyl (meth)acrylate, butyl (meth)acrylate and 2-ethyl hexylacrylate, and vinyl aromatic compounds such as styrene, alpha-methyl styrene, and vinyl toluene. As used herein, "(meth)acrylate" and like terms is intended to include both acrylates and methacrylates.

In a one embodiment of the present invention the acrylic polymer can be prepared from ethylenically unsaturated, beta-hydroxy ester functional monomers. Such monomers can be derived from the reaction of an ethylenically unsaturated acid functional monomer, such as monocarboxylic acids, for example, acrylic acid, and an epoxy compound which does not participate in the free radical initiated polymerization with the unsaturated acid monomer. Examples of such epoxy compounds include glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those which are commercially available from Shell Chemical Company under the tradename CARDURA E; and from Exxon Chemical Company under the tradename GLYDEXX-10. Alternatively, the beta-hydroxy ester functional monomers can be prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Epoxy functional groups can be incorporated into the polymer prepared from polymerizable ethylenically unsaturated monomers by copolymerizing oxirane group-containing monomers, for example glycidyl (meth)acrylate and allyl glycidyl ether, with other polymerizable ethylenically unsaturated monomers, such as those discussed above. Preparation of such epoxy functional acrylic polymers is described in detail in U.S. Pat. No. 4,001,156 at columns 3 to 6, incorporated herein by reference.

Carbamate functional groups can be incorporated into the polymer prepared from polymerizable ethylenically unsaturated monomers by copolymerizing, for example, the above-described ethylenically unsaturated monomers with a carbamate functional vinyl monomer such as a carbamate functional alkyl ester of methacrylic acid. Useful carbamate functional alkyl esters can be prepared by reacting, for example, a hydroxyalkyl carbamate, such as the reaction product of ammonia and ethylene carbonate or propylene carbonate, with methacrylic anhydride. Other useful carbamate functional vinyl monomers include, for instance, the reaction product of hydroxyethyl methacrylate, isophorone diisocyanate, and hydroxypropyl carbamate; or the reaction product of hydroxypropyl methacrylate, isophorone diisocyanate, and methanol. Still other carbamate functional vinyl monomers may be used, such as the reaction product of isocyanic acid (HNCO) with a hydroxyl functional acrylic or methacrylic monomer such as hydroxyethyl acrylate, and those described in U.S. Pat. No. 3,479,328, incorporated herein by reference. Carbamate functional groups can also be incorporated into the acrylic polymer by reacting a hydroxyl functional acrylic polymer with a low molecular weight alkyl carbamate such as methyl carbamate. Pendant carbamate groups can also be incorporated into the acrylic polymer by a "transcarbamoylation" reaction in which a hydroxyl functional acrylic polymer is reacted with a low molecular weight carbamate derived from an alcohol or a glycol ether. The carbamate groups exchange with the hydroxyl groups yielding the carbamate functional acrylic polymer and the original alcohol or glycol ether. Also, hydroxyl functional acrylic polymers can be reacted with isocyanic acid to provide pendent carbamate groups. Likewise, hydroxyl functional acrylic polymers can be reacted with urea to provide pendent carbamate groups.

The polymers prepared from polymerizable ethylenically unsaturated monomers can be prepared by solution polymerization techniques, which are well-known to those skilled in the art, in the presence of suitable catalysts such as organic peroxides or azo compounds, for example, benzoyl peroxide or N,N-azobis(isobutylronitrile). The polymerization can be carried out in an organic solution in which the monomers are soluble by techniques conventional in the art. Alternatively, these polymers can be prepared by aqueous emulsion or dispersion polymerization techniques which are well-known in the art. The ratio of reactants and reaction conditions are selected to result in an acrylic polymer with the desired pendent functionality.

Polyester polymers are also useful in the coating compositions of the invention as the film-forming polymer. Useful polyester polymers typically include the condensation products of polyhydric alcohols and polycarboxylic acids. Suitable polyhydric alcohols can include ethylene glycol, neopentyl glycol, trimethylol propane, and pentaerythritol. Suitable polycarboxylic acids can include adipic acid, 1,4-cyclohexyl dicarboxylic acid, and hexahydrophthalic acid. Besides the polycarboxylic acids mentioned above, functional equivalents of the acids such as anhydrides where they exist or lower alkyl esters of the acids such as the methyl esters can be used. Also, small amounts of monocarboxylic acids such as stearic acid can be used. The ratio of reactants and reaction conditions are selected to result in a polyester polymer with the desired pendent functionality, i.e., carboxyl or hydroxyl functionality.

For example, hydroxyl group-containing polyesters can be prepared by reacting an anhydride of a dicarboxylic acid such as hexahydrophthalic anhydride with a diol such as neopentyl glycol in a 1:2 molar ratio. Where it is desired to enhance air-drying, suitable drying oil fatty acids may be used and include those derived from linseed oil, soya bean oil, tall oil, dehydrated castor oil, or tung oil.

Carbamate functional polyesters can be prepared by first forming a hydroxyalkyl carbamate that can be reacted with the polyacids and polyols used in forming the polyester. Alternatively, terminal carbamate functional groups can be incorporated into the polyester by reacting isocyanic acid with a hydroxy functional polyester. Also, carbamate functionality can be incorporated into the polyester by reacting a hydroxyl polyester with a urea. Additionally, carbamate groups can be incorporated into the polyester by a transcarbamoylation reaction. Preparation of suitable carbamate functional group-containing polyesters are those described in U.S. Pat. No. 5,593,733 at column 2, line 40 to column 4, line 9, incorporated herein by reference.

Polyurethane polymers containing terminal isocyanate or hydroxyl groups also can be used as the polymer (d) in the coating compositions of the invention. The polyurethane polyols or NCO-terminated polyurethanes which can be used are those prepared by reacting polyols including polymeric polyols with polyisocyanates. Polyureas containing terminal isocyanate or primary and/or secondary amine groups which also can be used are those prepared by reacting polyamines including polymeric polyamines with polyisocyanates. The hydroxyl/isocyanate or amine/isocyanate equivalent ratio is adjusted and reaction conditions are selected to obtain the desired terminal groups. Examples of suitable polyisocyanates include those described in U.S. Pat. No. 4,046,729 at column 5, line 26 to column 6, line 28, incorporated herein by reference. Examples of suitable polyols include those described in U.S. Pat. No. 4,046,729 at column 7, line 52 to column 10, line 35, incorporated herein by reference. Examples of suitable polyamines include those described in U.S. Pat. No. 4,046,729 at column 6, line 61 to column 7, line 32 and in U.S. Pat. No. 3,799,854 at column 3, lines 13 to 50, both incorporated herein by reference.

Carbamate functional groups can be introduced into the polyurethane polymers by reacting a polyisocyanate with a polyester having hydroxyl functionality and containing pendent carbamate groups. Alternatively, the polyurethane can be prepared by reacting a polyisocyanate with a polyester polyol and a hydroxyalkyl carbamate or isocyanic acid as separate reactants. Examples of suitable polyisocyanates are aromatic isocyanates, such as 4,4'-diphenylmethane diisocyanate, 1,3-phenylene diisocyanate and toluene diisocyanate, and aliphatic polyisocyanates, such as 1,4-tetramethylene diisocyanate and 1,6-hexamethylene diisocyanate. Cycloaliphatic diisocyanates, such as 1,4-cyclohexyl diisocyanate and isophorone diisocyanate also can be employed.

Examples of suitable polyether polyols include polyalkylene ether polyols such as those having the following structural formulas (VII) or (VIII):

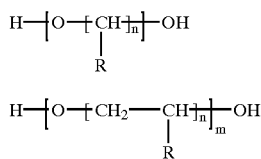

wherein the substituent R is hydrogen or a lower alkyl group containing from 1 to 5 carbon atoms including mixed substituents, and n has a value typically ranging from 2 to 6 and m has a value ranging from 8 to 100 or higher. Exemplary polyalkylene ether polyols include poly(oxytetramethylene) glycols, poly(oxytetraethylene) glycols, poly(oxy-1,2-propylene) glycols, and poly(oxy-1, 2-butylene) glycols.

Also useful are polyether polyols formed from oxyalkylation of various polyols, for example, glycols such as ethylene glycol, 1,6-hexanediol, Bisphenol A, and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Specific examples of polyethers include those sold under the names TERATHANE and TERACOL, available from E. I. Du Pont de Nemours and Company, Inc.

Generally, the polymers having reactive functional groups which are useful in the coating compositions of the invention have a weight average molecular weight (Mw) typically ranging from 1000 to 20,000 preferably 1500 to 15,000 and more preferably 2000 to 12,000 as determined by gel permeation chromatography using a polystyrene standard.

It should be mentioned that when both (a) and (d) are present, the reactive functional groups of (a) and (d) can be the same or different, but both must be reactive with the functional groups of the curing agent (b). Examples of such reactive functional groups include hydroxyl, carboxylic acid, isocyanate, carboxylate, primary amine, secondary amine, amide, carbamate, and epoxy functional groups. Hydroxyl and/or carbamate functional group-containing polymers are preferred.

The polymer having reactive functional groups, if employed, can be present in the coating compositions of the invention in an amount of at least 2 percent by weight, usually at least 5 percent by weight, and typically at least 10 percent by weight based on weight of total resin solids in the coating composition. Also, the polymer having reactive functional groups can be present in the coating compositions of the invention in an amount less than 80 percent by weight, usually less than 60 percent by weight, and typically less than 50 percent by weight based on weight of total resin solids in the coating composition. The amount of the polymer having reactive functional groups present in the coating compositions of the present invention can range between any combination of these values inclusive of the recited values.

The coating compositions of the present invention can be solvent-based compositions, water-based compositions, in solid particulate form, that is, a powder composition, in the form of a powder slurry or an aqueous dispersion. The components of the present invention used to form the compositions of the present invention can be dissolved or dispersed in an organic solvent. Nonlimiting examples of suitable organic solvents include alcohols, such as butanol; ketones, such as methyl amyl ketone; aromatic hydrocarbons, such as xylene; and glycol ethers, such as, ethylene glycol monobutyl ether; esters; other solvents; and mixtures of any of the foregoing.

In solvent based compositions, the organic solvent is generally present in amounts ranging from 5 to 80 percent by weight based on total weight of the resin solids of the components which form the composition, and can be present in an amount ranging from 30 to 50 percent by weight. The compositions as described above can have a total solids content ranging from 40 to 75 percent by weight based on total weight of the resin solids of the components which form the composition, and can have a total solids content ranging from 50 to 70 percent by weight. Alternatively, the inventive compositions can be in solid particulate form suitable for use as a powder coating, or suitable for dispersion in a liquid medium such as water for use as a powder slurry.

In a further embodiment, the film-forming compositions as previously described further comprise a catalyst which is present during the composition's formation. In one embodiment, the catalyst is present in an amount sufficient to accelerate the reaction between at least one reactive functional group of the at least one reactant (b) and/or at least one reactive functional group of the at least one polysiloxane (a) and/or the boron-containing compound (c), if appropriate, and/or the functional group-containing film-forming polymer, if used.

Nonlimiting examples of suitable catalysts include acidic materials, for example, acid phosphates, such as phenyl acid phosphate, and substituted or unsubstituted sulfonic acids such as dodecylbenzene sulfonic acid or paratoluene sulfonic acid. Non-limiting examples of suitable catalysts for reactions between isocyanate groups and active hydrogen-containing materials, for example, those comprising hydroxyl groups, include tin catalysts such as dibutyl tin dilaurate and dibutyl tin oxide. Non-limiting examples of epoxy acid base catalysts include tertiary amines such as N,N'-dimethyldodecyl amine catalysts. In another embodiment, the catalyst can be a phosphatized polyester or a phosphatized epoxy. In this embodiment, the catalyst can be, for example, the reaction product of phosphoric acid and a bisphenol A diglycidyl ether having two hydrogenated phenolic rings, such as DRH-151, which is commercially available from Shell Chemical Co. The catalyst can be present, when added to the other components that form the composition, in an amount ranging from 0.1 to 5.0 percent by weight, and is typically present in an amount ranging from 0.5 to 1.5 percent by weight based on the total weight of resin solids present in the composition.

In another embodiment, additional components can be present during the formation of the compositions as previously described. These additional components include, but are not limited to, particles different from components (a), (b) and (c), flexibilizers, plasticizers, surface active agents, thixotropic agents, rheology control modifiers, anti-gassing agents, organic cosolvents, flow controllers, hindered amine light stabilizers, anti-oxidants, UV light absorbers, coloring agents or tints, and similar additives conventional in the art, as well as mixtures of any of the foregoing can be included in the composition. These additional ingredients can be present, when added to the other components that form the composition, in an amount up to 40 percent by weight based on the total weight of resin solids present in the composition.

In one embodiment, the present invention is directed to compositions as previously described wherein the composition further comprises a plurality of particles. In another embodiment, the present invention is directed to any composition as previously described wherein the particles have an average particle size of less than 100 microns prior to incorporation into the composition. In another embodiment, the present invention is directed to any composition as previously described wherein the particles have an average particle size ranging from 1 to less than 1000 nanometers prior to incorporation into the composition. In yet another embodiment, the present invention is directed to any composition as previously described wherein the particles have an average particle size ranging from 1 to 100 nanometers prior to incorporation into the composition.

In another embodiment, the present invention is directed to any composition as previously described wherein the particles have an average particle size ranging from 5 to 50 nanometers prior to incorporation into the composition. In another embodiment, the present invention is directed to any composition as previously described wherein the particles have an average particle size ranging from 5 to 25 nanometers prior to incorporation into the composition.

In an embodiment where the average particle size of the particles is greater than one micron, the average particle size can be measured according to known laser scattering techniques. For example, the average particle size of such particles is measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

In an embodiment of the present invention wherein the size of the particles is less than or equal to one micron, the average particle size can be determined by visually examining an electron micrograph of a transmission electron microscopy ("TEM") image, measuring the diameter of the particles in the image, and calculating the average particle size based on the magnification of the TEM image. One of ordinary skill in the art will understand how to prepare such a TEM image, and a description of one such method is disclosed in the examples set forth below. In one nonlimiting embodiment of the present invention, a TEM image with 105,000× magnification is produced, and a conversion factor is obtained by dividing the magnification by 1000. Upon visual inspection, the diameter of the particles is measured in millimeters, and the measurement is converted to nanometers using the conversion factor. The diameter of the particle refers to the smallest diameter sphere that will completely enclose the particle.

The shape (or morphology) of the particles can vary depending upon the specific embodiment of the present invention and its intended application. For example generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), *Handbook of Fillers and Plastics* (1987) at pages 9–10, which are specifically incorporated by reference herein.

It will be recognized by one skilled in the art that mixtures of one or more particles having different average particle sizes can be incorporated into the compositions in accordance with the present invention to impart the desired properties and characteristics to the compositions. For example, particles of varying particle sizes can be used in the compositions according to the present invention.

The particles can be formed from materials selected from polymeric and nonpolymeric inorganic materials, polymeric and nonpolymeric organic materials, composite materials, and mixtures of any of the foregoing. As used herein, the term "polymeric inorganic material" means a polymeric material having a backbone repeat unit based on an element or elements other than carbon. For more information see James Mark et al., Inorganic Polymers, Prentice Hall Polymer Science and Engineering Series, (1992) at page 5, which is specifically incorporated by reference herein. As used herein, the term "polymeric organic materials" means synthetic polymeric materials, semisynthetic polymeric materials and natural polymeric materials, all of which have a backbone repeat unit based on carbon.

An "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example, calcium carbonate and sodium carbonate. See R. Lewis, Sr., *Hawley's Condensed Chemical Dictionary*, (12th Ed. 1993) at pages 761–762, and M. Silberberg, Chemistry *The Molecular Nature of Matter and Change* (1996) at page 586, which are specifically incorporated by reference herein.

As used herein, the term "inorganic material" means any material that is not an organic material.

As used herein, the term "composite material" means a combination of two or more differing materials. The particles formed from composite materials generally have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In yet another alternative embodiment, particles formed from composite materials can be formed from a primary material that is coated, clad or encapsulated with a different form of the primary material. For more information on particles useful in the present invention, see G. Wypych, *Handbook of Fillers,* 2nd Ed. (1999) at pages 15–202, which are specifically incorporated by reference herein.

The particles suitable for use in the compositions of the invention can comprise inorganic elements or compounds known in the art. Suitable particles can be formed from ceramic materials, metallic materials, and mixtures of any of the foregoing. Suitable ceramic materials comprise metal oxides, metal nitrides, metal carbides, metal sulfides, metal silicates, metal borides, metal carbonates, and mixtures of any of the foregoing. Specific, nonlimiting examples of metal nitrides are, for example, boron nitride; specific, nonlimiting examples of metal oxides are, for example, zinc oxide; nonlimiting examples of suitable metal sulfides are, for example, molybdenum disulfide, tantalum disulfide, tungsten disulfide, and zinc sulfide; nonlimiting suitable examples of metal silicates are, for example, aluminum silicates and magnesium silicates such as vermiculite.

The particles can comprise, for example, a core of essentially a single inorganic oxide such as silica in colloidal, fumed, or amorphous form, alumina or colloidal alumina, titanium dioxide, cesium oxide, yttrium oxide, colloidal yttria, zirconia, e.g., colloidal or amorphous zirconia, and mixtures of any of the foregoing; or an inorganic oxide of one type upon which is deposited an organic oxide of another type. It should be understood that when the composition of the invention is employed as a transparent topcoat, for example, as a clearcoat in a multi-component composite coating composition, particles should not seriously interfere with the optical properties of the composition. As used herein, "transparent" means that the cured coating has a BYK Haze index of less than 50 as measured using a BYK/Haze Gloss instrument.

Nonpolymeric, inorganic materials useful in forming the particles of the present invention comprise inorganic materials selected from graphite, metals, oxides, carbides, nitrides, borides, sulfides, silicates, carbonates, sulfates, and hydroxides. A nonlimiting example of a useful inorganic oxide is zinc oxide. Nonlimiting examples of suitable inorganic sulfides include molybdenum disulfide, tantalum disulfide, tungsten disulfide, and zinc sulfide. Nonlimiting examples of useful inorganic silicates include aluminum silicates and magnesium silicates, such as vermiculite. Nonlimiting examples of suitable metals include molybdenum, platinum, palladium, nickel, aluminum, copper, gold, iron, silver, alloys, and mixtures of any of the foregoing.

In one embodiment, the present invention is directed to any composition as previously described wherein the particles are selected from fumed silica, amorphous silica, colloidal silica, alumina, colloidal alumina, titanium dioxide, cesium oxide, yttrium oxide, colloidal yttria, zirconia, colloidal zirconia, and mixtures of any of the foregoing. In another embodiment, the present invention is directed to any composition as previously described wherein the particles include colloidal silica. As disclosed above, these materials can be surface treated or untreated.

The composition can comprise precursors suitable for forming silica particles in situ by a sol-gel process. The composition according to the present invention can comprise alkoxy silanes which can be hydrolyzed to form silica particles in situ. For example, tetraethylortho silicate can be hydrolyzed with an acid such as hydrochloric acid and condensed to form silica particles. Other useful particles include surface-modified silicas such as are described in U.S. Pat. No. 5,853,809 at column 6, line 51 to column 8, line 43, which is incorporated herein by reference.

In one embodiment of the present invention, the particles have a hardness value greater than the hardness value of materials that can abrade a polymeric coating or a polymeric substrate. Examples of materials that can abrade the polymeric coating or polymeric substrate include, but are not limited to, dirt, sand, rocks, glass, carwash brushes, and the like. The hardness values of the particles and the materials that can abrade the polymeric coating or polymeric substrate can be determined by any conventional hardness measurement method, such as Vickers or Brinell hardness, but is preferably determined according to the original Mohs' hardness scale which indicates the relative scratch resistance of the surface of a material on a scale of one to ten. The Mohs' hardness values of several nonlimiting examples of particles formed from inorganic materials suitable for use in the present invention are given in Table A below.

TABLE A

| Particle material | Mohs' hardness (original scale) |
|---|---|
| Boron nitride | $2^1$ |
| Graphite | $0.5-1^2$ |
| Molybdenum disulfide | $1^3$ |
| Talc | $1-1.5^4$ |
| Mica | $2.8-3.2^5$ |
| Kaolinite | $2.0-2.56$ |
| Gypsum | $1.6-2^7$ |
| Calcite (calcium carbonate) | $3^8$ |
| Calcium fluoride | $4^9$ |
| zinc oxide | $4.5^{10}$ |
| Aluminum | $2.5^{11}$ |
| Copper | $2.5-3^{12}$ |
| Iron | $4-5^{13}$ |
| Gold | $2.5-3^{14}$ |
| Nickel | $5^{15}$ |
| Palladium | $4.8^{16}$ |
| Platinum | $4.3^{17}$ |
| Silver | $2.5-4^{18}$ |
| Zinc sulfide | $3.5-4^{19}$ |

[1] K. Ludema, Friction, Wear, Lubrication, (1996) at page 27, which is hereby incorporated by reference.
[2] R. Weast (Ed.), Handbook of Chemistry and Physics, CRC Press (1975) at page F-22.
[3] R. Lewis, Sr., Hawley's Condensed Chemical Dictionary, (12th Ed. 1993) at page 793, which is hereby incorporated by reference.
[4] Hawley's Condensed Chemical Dictionary, (12th Ed. 1993) at page 1113, which is hereby incorporated by reference.
[5] Hawley's Condensed Chemical Dictionary, (12th Ed. 1993) at page 784, which is hereby incorporated by reference.
[6] Handbook of Chemistry and Physics at page F-22.
[7] Handbook of Chemistry and Physics at page F-22.
[8] Friction Wear, Lubrication at page 27.
[9] Friction, Wear, Lubrication at page 27.
[10] Friction, Wear, Lubrication at page 27.
[11] Friction, Wear, Lubrication at page 27.
[12] Handbook of Chemistry and Physics at page F-22.
[13] Handbook of Chemistry and Physics at page F-22.
[14] Handbook of Chemistry and Physics at page F-22.
[15] Handbook of Chemistry and Physics at page F-22.
[16] Handbook of Chemistry and Physics at page F-22.
[17] Handbook of Chemistry and Physics at page F-22.
[18] Handbook of Chemistry and Physics at page F-22.
[19] R. Weast (Ed.), Handbook of Chemistry and Physics, CRC Press (71st Ed. 1990) at page 4–158.

In one embodiment, the Mohs' hardness value of the particles is greater than 5. In certain embodiments, the Mohs' hardness value of the particles, such as silica, is greater than 6.

As mentioned above, the Mohs' hardness scale relates to the resistance of a material to scratching. The present invention therefore further contemplates particles that have a hardness at their surface that is different from the hardness of the internal portions of the particle beneath its surface. More specifically, and as discussed above, the surface of the particle can be modified in any manner well known in the art, including, but not limited to, chemically changing the particle's surface characteristics using techniques known in the art such that the surface hardness of the particle is greater the hardness of the materials that can abrade the polymeric coating or polymeric substrate while the hardness of the particle beneath the surface is less than the hardness of the materials that can abrade the polymeric coating or polymeric substrate.

As another alternative, a particle can be formed from a primary material that is coated, clad or encapsulated with one or more secondary materials to form a composite material that has a harder surface. Alternatively, a particle can be formed from a primary material that is coated, clad or encapsulated with a differing form of the primary material to form a composite material that has a harder surface.

In one example, and without limiting the present invention, an inorganic particle formed from an inorganic material such as silicon carbide or aluminum nitride can be provided with a silica, carbonate or nanoclay coating to form a useful composite particle. In another nonlimiting example, a silane coupling agent with alkyl side chains can interact with the surface of an inorganic particle formed from an inorganic oxide to provide a useful composite particle having a "softer" surface. Other examples include cladding, encapsulating or coating particles formed from nonpolymeric or polymeric materials with differing nonpolymeric or polymeric materials. A specific nonlimiting example of such composite particles is DUALITE™, which is a synthetic polymeric particle coated with calcium carbonate that is commercially available from Pierce and Stevens Corporation of Buffalo, N.Y.

In one nonlimiting embodiment of the invention, the particles are formed from solid lubricant materials. As used herein, the term "solid lubricant" means any solid used between two surfaces to provide protection from damage during relative movement or to reduce friction and wear. In one embodiment, the solid lubricants are inorganic solid lubricants. As used herein, "inorganic solid lubricant" means that the solid lubricants have a characteristic crystalline habit which causes them to shear into thin, flat plates which readily slide over one another and thus produce an antifriction lubricating effect. See R. Lewis, Sr., *Hawley's Condensed Chemical Dictionary*, (12th Ed. 1993) at page 712, which is specifically incorporated by reference herein. Friction is the resistance to sliding one solid over another. F. Clauss, *Solid Lubricants and Self-Lubricating Solids* (1972) at page 1, which is specifically incorporated by reference herein.

In one nonlimiting embodiment of the invention, the particles have a lamellar structure. Particles having a lamellar structure are composed of sheets or plates of atoms in hexagonal array, with strong bonding within the sheet and weak van der Waals bonding between sheets, providing low shear strength between sheets. A nonlimiting example of a lamellar structure is a hexagonal crystal structure. Inorganic solid particles having a lamellar fullerene (i.e., buckyball) structure also are useful in the present invention.

Nonlimiting examples of suitable materials having a lamellar structure that are useful in forming the particles of the present invention include boron nitride, graphite, metal dichalcogenides, mica, talc, gypsum, kaolinite, calcite, cadmium iodide, silver sulfide, and mixtures of any of the foregoing. Suitable metal dichalcogenides include molybdenum disulfide, molybdenum diselenide, tantalum disulfide, tantalum diselenide, tungsten disulfide, tungsten diselenide, and mixtures of any of the foregoing.

The particles can be formed from nonpolymeric, organic materials. Nonlimiting examples of nonpolymeric, organic materials useful in the present invention include, but are not limited to, stearates (such as zinc stearate and aluminum stearate), diamond, carbon black, and stearamide.

The particles can be formed from inorganic polymeric materials. Nonlimiting examples of useful inorganic polymeric materials include polyphosphazenes, polysilanes, polysiloxane, polygeremanes, polymeric sulfur, polymeric selenium, silicones, and mixtures of any of the foregoing. A specific, nonlimiting example of a particle formed from an inorganic polymeric material suitable for use in the present invention is TOSPEARL[20], which is a particle formed from cross-linked siloxanes and is commercially available from Toshiba Silicones Company, Ltd. of Japan.

The particles can be formed from synthetic, organic polymeric materials. Nonlimiting examples of suitable organic polymeric materials include, but are not limited to, thermoset materials and thermoplastic materials. As used herein, a "thermoplastic" material is a material that softens when exposed to heat and returns to its original condition when cooled to room temperature. Nonlimiting examples of suitable thermoplastic materials include thermoplastic polyesters such as polyethylene terephthalate, polybutylene terephthalate, and polyethylene naphthalate, polycarbonates, polyolefins such as polyethylene, polypropylene, and polyisobutene, acrylic polymers such as copolymers of styrene and an acrylic acid monomer, and polymers containing methacrylate, polyamides, thermoplastic polyurethanes, vinyl polymers, and mixtures of any of the foregoing.

Nonlimiting examples of suitable thermoset materials include thermoset polyesters, vinyl esters, epoxy materials, phenolics, aminoplasts, thermoset polyurethanes, and mixtures of any of the foregoing. A specific, nonlimiting example of a synthetic polymeric particle formed from an epoxy material is an epoxy microgel particle. As used herein, a "thermoset" material is a material that material solidifies or "sets" irreversibly when heated. A thermoset material has formed a crosslinked network. As used herein, a See R. J. Perry "Applications for Cross-Linked Siloxane Particles" Chemtech, February 1999 at pages 39–44. polymeric material is "crosslinked" if it at least partially forms a polymeric network. One skilled in the art will understand that the presence and degree of crosslinking (crosslink density) can be determined by a variety of methods, such as dynamic mechanical thermal analysis (DMTA) using a TA Instruments DMA 2980 analyzer conducted under nitrogen such as is described above. This method determines the glass transition temperature and crosslink density of free films of coatings or polymers. These physical properties of a cured material are related to the structure of the crosslinked network.

The particles also can be hollow particles formed from materials selected from polymeric and nonpolymeric inorganic materials, polymeric and nonpolymeric organic materials, composite materials, and mixtures of any of the foregoing. Nonlimiting examples of suitable materials from which the hollow particles can be formed are described above.

In an embodiment of the present invention, the at least one polysiloxane (a) is nonreactive with the particles.

In one embodiment, the present invention is directed to any composition as previously described wherein the particles, when added to the other components that form the composition, are present in the composition in an amount ranging from 0.01 to 75 weight percent based on the total weight of the resin solids of the components which form the composition. In another embodiment, the present invention is directed to any composition as previously described wherein the particles, when added to the other components that form the composition, are present in the composition in an amount of at least 0.1 weight percent, can be present in the composition in an amount greater than 0.5 weight percent, and are typically present in the composition in an amount greater than 5 weight percent based on the total weight of the resin solids of the components which form the composition.

In yet another embodiment, the present invention is directed to any composition as previously described wherein, the particles, when added to the other components of the composition, are present in the composition in an amount less than 75 weight percent, can be present in the composition in an amount less than 50 weight percent, can be present in the composition in an amount less than 20 weight percent, and are typically present in the composition in an amount less than 10 weight percent based on the total weight of the resin solids of the components which form the composition. The amount of the particles present in the compositions may range between any combination of these values inclusive of the recited values.

Prior to incorporation, one class of particles which can be used according to the present invention includes sols, such as an organosol, of the particles. These sols can be of a wide variety of small-particle, colloidal silicas having an average particle size in ranges such as identified above.

The colloidal silicas can be surface modified during or after the particles are initially formed. These surface modified silicas may contain on their surface chemically bonded carbon-containing moieties, as well as such groups as anhydrous $SiO_2$ groups and SiOH groups, various ionic groups physically associated or chemically bonded within the surface of the silica, adsorbed organic groups, or combinations of any of the foregoing, depending on the characteristics of the particular silica desired. Such surface modified silicas are described in detail in U.S. Pat. No. 4,680,204, which is incorporated herein by reference.

Such materials can be prepared by a variety of techniques in various forms, nonlimiting examples comprise organosols and mixed sols. As used herein the term "mixed sols" is intended to include those dispersions of colloidal silica in which the dispersing medium comprises both an organic liquid and water. Such small particle colloidal silicas are readily available, are essentially colorless and have refractive indices which permit their inclusion in compositions that, without additional pigments or components known in the art to color or decrease the transparency of such compositions, result in colorless, transparent coatings.

Suitable nonlimiting examples of particles include colloidal silicas, such as those commercially available from Nissan Chemical Company under the trademark ORGANO-SILICASOLS™ such as ORGANOSILICASOL™ MT-ST, and from Clariant Corporation as HIGHLINK™; colloidal aluminas, such as those commercially available from Nalco Chemical under the trademark NALCO 8676®; and colloidal zirconias, such as those commercially available from Nissan Chemical Company under the trademark HIT-32M®.

The particles can be incorporated into the compositions of the invention in the form of a stable dispersion. When the particles are in a colloidal form, the dispersions can be prepared by dispersing the particles in a carrier under agitation and solvent that is present can be removed under vacuum at ambient temperatures. In certain embodiments, the carrier can be other than a solvent, such as the surface active agents described in detail below, including, but not limited to a polysiloxane containing reactive functional groups, including, but not limited to, the at least one polysiloxane Alternatively, the dispersions can be prepared as described in U.S. Pat. Nos. 4,522,958 or 4,526,910, which are incorporated by reference herein. The particles can be "cold-blended" with the at least one polysiloxane (a) prior to incorporation into the inventive compositions. Alternatively, the particles can be post-added to an admixture of any remaining composition components (including, but not limited to, the at least one polysiloxane (a)) and dispersed therein using dispersing techniques well-known in the art.

When the particles are in other than colloidal form, for example, but not limited to, agglomerate form, the dispersions can be prepared by dispersing the agglomerate in the carrier, for example, but not limited to, the at least one polysiloxane (a), to stably disperse the particles therein. Dispersion techniques such as grinding, milling, microfluidizing, ultrasounding, or any other pigment dispersing techniques well known in the art of coatings formulation can be used. Alternatively, the particles can be dispersed by any other dispersion techniques known in the art. If desired, the particles in other than colloidal form can be post-added to an admixture of other composition components and dispersed therein using any dispersing techniques known in the art.

The particles can be present in a dispersion, suspension or emulsion in a carrier. Nonlimiting examples of suitable carriers include, but are not limited to, water, solvents, surfactants, or a mixture of any of the foregoing.

In yet another embodiment of the present invention, at least one adjuvant surface active agent can be present during the formation of the compositions as previously described. Further, as used herein, by "surface active agent" is meant any material which tends to lower the solid surface tension or surface energy of the "cured" composition or coating. That is, the cured composition or coating formed from a composition comprising a surface active agent has a lower solid surface tension or surface energy than a cured coating formed from the analogous composition which does not contain the surface active agent.

For purposes of the present invention, solid surface tension can be measured according to the Owens-Wendt method using a Rame'-Hart Contact Angle Goniometer with distilled water and methylene iodide as reagents. Generally, a 0.02 cc drop of one reagent is placed upon the cured coating surface and the contact angle and its complement are measured using a standard microscope equipped with the goniometer. The contact angle and its complement are measured for each of three drops. The process is then repeated using the other reagent. An average value is calculated for the six measurements for each of the reagents. The solid surface tension is then calculated using the Owens-Wendt equation:

$$\{\gamma l(1+\cos\Phi)\}/2=(\gamma l^d \gamma_s^d)^{1/2}+(\gamma l^p \gamma_s^p)^{1/2}$$

where $\gamma l$ is the surface tension of the liquid (methylene iodide=50.8, distilled water=72.8) and $\gamma^d$ and $\gamma^p$ are the dispersion and polar components (methylene iodide $\gamma^d$=49.5, $\gamma^p$=1.3; distilled water $\gamma^d$=21.8, $\gamma^p$=51.0); the values for $\Phi$ measured and the cos $\Phi$ determined. Two equations are then setup, one for methylene iodide and one for water. The only unknowns are $\gamma_s^d$ and $\gamma_s^p$. The two equations are then solved for the two unknowns. The two components combined represent the total solid surface tension.

The at least one adjuvant surface active agent can be selected from amphiphilic, reactive functional group-containing polysiloxanes such as are described above, amphiphilic fluoropolymers, and mixtures of any of the foregoing. With reference to water-soluble or water-dispersible amphiphilic materials, the term "amphiphilic" means a polymer having a generally hydrophilic polar end and a water-insoluble generally hydrophobic end. Nonlimiting examples of suitable functional group-containing polysiloxanes for use as surface active agents include those polysiloxanes described above. Nonlimiting examples of suitable amphiphilic fluoropolymers include fluoroethylene-alkyl vinyl ether alternating copolymers (such as those described in U.S. Pat. No. 4,345,057) available from Asahi Glass Company under the tradename LUMIFLON; fluorosurfactants, such as the fluoroaliphatic polymeric esters commercially available from 3M of St. Paul, Minn. under the tradename FLUORAD; functionalized perfluorinated materials, such as 1H,1H-perfluoro-nonanol commercially available from FluoroChem USA; and perfluorinated (meth)acrylate resins.

Nonlimiting examples of other adjuvant surface active agents suitable for use in the composition or coating of the present invention can include anionic, nonionic and cationic surface active agents.

Nonlimiting examples of suitable anionic surface active agents include sulfates or sulfonates. Specific nonlimiting examples include higher alkyl mononuclear aromatic sulfonates such as the higher alkyl benzene sulfonates containing from 10 to 16 carbon atoms in the alkyl group and a straight- or branched-chain, e.g., the sodium salts of decyl, undecyl, dodecyl, tridecyl, tetradecyl, pentadecyl or hexadecyl benzene sulfonate and the higher alkyl toluene, xylene and phenol sulfonates; alkyl naphthalene sulfonate, and sodium dinonyl naphthalene sulfonate. Other nonlimiting examples of suitable anionic surface active agents include olefin sulfonates, including long chain alkenylene sulfonates, long chain hydroxyalkane sulfonates, and mixtures of any of the foregoing. Nonlimiting examples of other sulfate or sulfonate detergents are paraffin sulfonates such as the reaction products of alpha olefins and bisulfites (e.g., sodium bisulfite). Also comprised are sulfates of higher alcohols, such as sodium lauryl sulfate, sodium tallow alcohol sulfate, or sulfates of mono-or di-glycerides of fatty acids (e.g., stearic monoglyceride monosulfate), alkyl poly (ethoxy)ether sulfates including, but not limited to, the sulfates of the condensation products of ethylene oxide and lauryl alcohol (usually having 1–5 ethenoxy groups per molecule); lauryl or other higher alkyl glyceryl ether sulfonates; aromatic poly(ethenoxy)ether sulfates including, but not limited to, the sulfates of the condensation products of ethylene oxide and nonyl phenol (usually having 1–20 oxyethylene groups ° per molecule). Further nonlimiting examples include salts of sulfated aliphatic alcohol, alkyl ether sulfate or alkyl aryl ethoxy sulfate available from Rhone-Poulenc under the general tradename ABEX. Phosphate mono-or di-ester type anionic surface active agents also can be used. These anionic surface active agents are well known in the art and are commercially available under the general trade designation GAFAC from GAF Corporation and under the general trade designation TRITON from Rohm & Haas Company.

Nonlimiting examples of nonionic surface active agents suitable for use in the cured composition or coating of the present invention include those containing ether linkages and which are represented by the following general formula: RO(R'O)$_n$H; wherein the substituent group R represents a hydrocarbon group containing 6 to 60 carbon atoms, the substituent group R' represents an alkylene group containing 2 or 3 carbon atoms, and mixtures of any of the foregoing, and n is an integer ranging from 2 to 100. Such nonionic surface active agents can be prepared by treating fatty alcohols or alkyl-substituted phenols with an excess of ethylene or propylene oxide. The alkyl carbon chain may contain from 14 to 40 carbon atoms and may be derived from a long chain fatty alcohol such as oleyl alcohol or stearyl alcohol. Nonionic polyoxyethylene surface active agents of the type represented by the formula above are commercially available under the general trade designation SURFYNOL® from Air Products Chemicals, Inc.; PLURONIC® or TETRONIC® from BASF Corporation; TERGITOL® from Union Carbide; and SURFONIC® from Huntsman Corporation. Other nonlimiting examples of suitable nonionic surface active agents include block copolymers of ethylene oxide and propylene oxide based on a glycol such as ethylene glycol or propylene glycol including, but not limited to, those available from BASF Corporation under the general trade designation PLURONIC®.

As indicated above, cationic surface active agents also can be used. Nonlimiting examples of cationic surface active agents suitable for use in the compositions of the present invention include acid salts of alkyl amines such as ARMAC® HT, an acetic acid salt of n-alkyl amine available from Akzo Nobel Chemicals; imidazoline derivatives such as CALGENE® C-100 available from Calgene Chemicals Inc.; ethoxylated amines or amides such as DETHOX® Amine C-5, a cocoamine ethoxylate available from Deforest Enterprises; ethoxylated fatty amines such as ETHOX® TAM available from Ethox Chemicals, Inc.; and glyceryl esters such as LEXEMUL® AR, a glyceryl stearate/stearaidoethyl diethylamine available from Inolex Chemical Co.

Other examples of suitable surface active agents can include polyacrylates. Nonlimiting examples of suitable polyacrylates include homopolymers and copolymers of acrylate monomers, for example polybutylacrylate and copolymers derived from acrylate monomers (such as ethyl (meth)acrylate, 2-ethylhexylacrylate, butyl (meth)acrylate and isobutyl acrylate), and hydroxy ethyl(meth)acrylate and (meth)acrylic acid monomers. In one embodiment, the polyacrylate can have amino and hydroxy functionality. Suitable amino and hydroxyl functional acrylates are disclosed in Example 26 below and in U.S. Pat. No. 6,013,733, which is incorporated herein by reference. Another example of a useful amino and hydroxyl functional copolymer is a copolymer of hydroxy ethyl acrylate, 2-ethylhexylacrylate, isobutyl acrylate and dimethylamino ethylmethacrylate. In another embodiment, the polyacrylate can have acid functionality, which can be provided, for example, by including acid functional monomers such as (meth)acrylic acid in the components used to prepare the polyacrylate. In another embodiment, the polyacrylate can have acid functionality and hydroxyl functionality, which can be provided, for example, by including acid functional monomers such as (meth)acrylic acid and hydroxyl functional monomers such as hydroxy ethyl (meth)acrylate in the components used to prepare the polyacrylate.

Suitable flow additives include silicones such as BYK 310 or BYK 307, which are commercially available from Byk-Chemie. Suitable rheology control agents include cellulose acetate butyrate and fumed silicas such as R812 which is commercially available from Degussa Chemical.

In yet another embodiment, the present invention is directed to a coated substrate comprising a substrate and a composition coated over at least a portion of the substrate, wherein the composition is selected from any of the foregoing compositions. In still another embodiment, the present invention is directed to a method of coating a substrate which comprises applying a composition over at least a portion of the substrate, wherein the composition is selected from any of the foregoing compositions. In another embodiment, the present invention is directed to a method of coating a substrate further comprising a step of curing the composition after application to the substrate. The components used to form the compositions in these embodiments can be selected from the components discussed above, and additional components also can be selected from those recited above.

As used herein, a composition "over" at least a portion of a substrate refers to a composition directly applied to at least a portion of the substrate, as well as a composition applied to any coating or adhesion promoter material which was previously applied to at least a portion of the substrate.

The coating compositions of the present invention can be applied over virtually any flexible substrate including plastic, and polymeric substrates such as elastomeric substrates. In one embodiment, the present invention is directed to a coated substrate as previously described wherein the coated substrate is a flexible elastomeric substrate. In still another embodiment, the present invention is directed to coated substrates as previously described wherein the coated substrate is a polymeric substrate. The components used to form the compositions in these embodiments can be selected from the components discussed above, and additional components also can be selected from those recited above.

A further embodiment of the present invention is directed to a coated automobile substrate comprising an automobile substrate and a composition coated over at least a portion of the automobile substrate, wherein the composition is selected from any of the foregoing compositions. In yet another embodiment, the present invention is directed to a method of making a coated automobile substrate comprising providing an automobile substrate and applying over at least a portion of the automotive substrate a composition selected from any of the foregoing compositions. Again, the components used to form the compositions in these embodiments can be selected from the components discussed above, and additional components also can be selected from those recited above.

Suitable polymeric or flexible elastomeric substrates can include any of the thermoplastic or thermoset synthetic materials well known in the art. Nonlimiting examples of suitable flexible elastomeric substrate materials include polyethylene, polypropylene, thermoplastic polyolefin ("TPO"), reaction injected molded polyurethane ("RIM") and thermoplastic polyurethane ("TPU").

Nonlimiting examples of thermoset materials useful as substrates in connection with the present invention include polyesters, epoxides, phenolics, polyurethanes such as "RIM" thermoset materials, and mixtures of any of the foregoing. Nonlimiting examples of suitable thermoplastic materials include thermoplastic polyolefins such as polyethylene, polypropylene, polyamides such as nylon, thermoplastic polyurethanes, thermoplastic polyesters, acrylic polymers, vinyl polymers, polycarbonates, acrylonitrile-butadiene-styrene ("ABS") copolymers, ethylene propylene diene terpolymer ("EPDM") rubber, copolymers, and mixtures of any of the foregoing.

If desired, the polymeric substrates described above can have an adhesion promoter present on the surface of the substrate over which the coating compositions of the present invention are applied. To facilitate adhesion of organic coatings to polymeric substrates, the substrate can be pretreated using an adhesion promoter layer or tie coat, e.g., a thin layer 0.25 mils (6.35 microns) thick, or by flame or corona pretreatment.

Suitable adhesion promoters include chlorinated polyolefin adhesion promoters such as are described in U.S. Pat. Nos. 4,997,882; 5,319,032; and 5,397,602, incorporated by reference herein. Other useful adhesion promoting coatings are disclosed in U.S. Pat. No. 6,001,469 (a coating composition containing a saturated polyhydroxylated polydiene polymer having terminal hydroxyl groups), U.S. Pat. No. 5,863,646 (a coating composition having a blend of a saturated polyhydroxylated polydiene polymer and a chlorinated polyolefin) and U.S. Pat. No. 5,135,984 (a coating composition having an adhesion promoting material obtained by reacting a chlorinated polyolefin, maleic acid anhydride, acryl or methacryl modified hydrogenated polybutadiene containing at least one acryloyl group or methacryloyl group per unit molecule, and organic peroxide), which are incorporated herein by reference.

When the substrates are used as components to fabricate automotive vehicles (including, but not limited to, automobiles, trucks and tractors) they can have any shape, and can be selected from the flexible substrates described above. Typical shapes of automotive body components can include body side moldings, fenders, bumpers, and trim for automotive vehicles.

In a further embodiment, the present invention is directed to coated automotive substrates as previously described wherein the coated automotive substrate is a body side molding. In another embodiment, the present invention is directed to coated automotive substrates as previously described wherein the coated automotive substrate is a fender. In another embodiment, the present invention is directed to coated automotive substrates as previously described wherein the coated automotive substrate is a bumper. In another embodiment, the present invention is directed to coated automotive substrates as previously described wherein the coated automotive substrate is trim. The components used to form the compositions used to coat the automotive substrates in these embodiments can be selected from the components discussed above, and additional components also can be selected from those recited above.

In another embodiment, the present invention is directed to multi-component composite coating compositions comprising a basecoat deposited from a base coating composition, which, typically is pigmented, and a topcoat deposited from any of the coating compositions of the present invention previously described above. In one embodiment, the present invention is directed to a multi-component composite coating composition as previously described, wherein the topcoating composition is transparent after curing and is selected from any of the compositions previously described. The components used to form the topcoating composition in these embodiments can be selected from the coating components discussed above, and additional components also can be selected from those recited above.

The basecoat and transparent topcoat (i.e., clearcoat) compositions used in the multi-component composite coating compositions of the present invention in certain instances can be formulated into liquid high solids coating compositions, that is, compositions containing 40 percent, or greater than 50 percent by weight resin solids. The solids content can be determined by heating a sample of the composition to 105° C. to 110° C. for 1–2 hours to drive off the volatile material, and subsequently measuring relative weight loss. As aforementioned, although the compositions can be liquid coating compositions, they also can be formulated as powder coating compositions.

The coating composition of the basecoat in the color-plus-clear system can be any of the compositions useful in coatings applications, particularly automotive applications. The coating composition of the basecoat can comprise a resinous binder and a pigment to act as the colorant. Nonlimiting examples of resinous binders are acrylic polymers, polyesters, alkyds, and polyurethanes.

The resinous binders for the basecoat can be organic solvent-based materials such as those described in U.S. Pat. No. 4,220,679, note column 2, line 24 continuing through column 4, line 40, which portions are incorporated by reference. Also, water-based coating compositions such as those described in U.S. Pat. Nos. 4,403,003, 4,147,679 and 5,071,904 can be used as the binder in the basecoat composition. These U.S. patents are incorporated herein by reference.

The basecoat composition can comprise one or more pigments as colorants. Nonlimiting examples of suitable metallic pigments include aluminum flake, copper bronze flake, and metal oxide coated mica.

Besides the metallic pigments, the basecoat compositions can contain nonmetallic color pigments conventionally used in surface coatings such as, for example, inorganic pigments such as titanium dioxide, iron oxide, chromium oxide, lead chromate, and carbon black; and organic pigments such as phthalocyanine blue and phthalocyanine green.

Optional ingredients in the basecoat composition can comprise those which are well known in the art of formulating surface coatings and can comprise surface active agents, flow control agents, thixotropic agents, fillers, anti-gassing agents, organic co-solvents, catalysts, and other customary auxiliaries. Nonlimiting examples of these materials and suitable amounts are described in U.S. Pat. Nos. 4,220,679; 4,403,003; 4,147,769; and 5,071,904, which patents are incorporated herein by reference.

The basecoat compositions can be applied to the substrate by any conventional coating technique such as brushing, spraying, dipping, or flowing. Spray techniques and equipment for air spraying, airless spray, and electrostatic spraying in either manual or automatic methods, known in the art can be used.

During application of the basecoat to the substrate, the film thickness of the basecoat formed on the substrate can range from 0.1 to 5 mils. In another embodiment, the film thickness of the basecoat formed on the substrate can range 0.1 to 1 mils, and can be 0.4 mils.

After forming a film of the basecoat on the substrate, the basecoat can be cured or alternatively given a drying step in which solvent is driven out of the basecoat film by heating or an air drying period before application of the clearcoat. Suitable drying conditions may depend on the particular basecoat composition, and on the ambient humidity if the composition is water-borne, but a drying time from 1 to 15 minutes at a temperature of 75° to 200° F. (21° to 93° C.) can be adequate.

The transparent or clear topcoat composition can be applied to the basecoat by any conventional coating technique, including, but not limited to, compressed air spraying, electrostatic spraying, and either manual or automatic methods. The transparent topcoat can be applied to a cured or to a dried basecoat before the basecoat has been cured. In the latter instance, the two coatings can then be heated to cure both coating layers simultaneously. Typical curing conditions can range from 50° F. to 475° F. (10° C. to 246° F.) for 1 to 30 minutes. The clearcoating thickness (dry film thickness) can be 1 to 6 mils.

A second topcoat coating composition can be applied to the first topcoat to form a "clear-on-clear" topcoat. The first topcoat coating composition can be applied over the basecoat as described above. The second topcoat coating composition can be applied to a cured or to a dried first topcoat before the basecoat and first topcoat have been cured. The basecoat, the first topcoat and the second topcoat can then be heated to cure the three coatings simultaneously.

It should be understood that the second transparent topcoat and the first transparent topcoat coating compositions can be the same or different provided that, when applied wet-on-wet, one topcoat does not substantially interfere with the curing of the other for example by inhibiting solvent/water evaporation from a lower layer. Moreover, the first topcoat, the second topcoat or both can be the film-forming composition of the present invention. The first transparent topcoat coating composition can be virtually any transparent topcoating composition known to those skilled in the art. The first transparent topcoat composition can be water-borne or solventborne, or, alternatively, in solid particulate form, i.e., a powder coating.

Nonlimiting examples of suitable first topcoating compositions include crosslinkable coating compositions comprising at least one thermosettable coating material and at least one curing agent. Suitable waterborne clearcoats are disclosed in U.S. Pat. No. 5,098,947 (incorporated by reference herein) and are based on water-soluble acrylic resins. Useful solvent borne clearcoats are disclosed in U.S. Pat. Nos. 5,196,485 and 5,814,410 (incorporated by reference herein) and include polyepoxides and polyacid curing agents. Suitable powder clearcoats are described in U.S. Pat. No. 5,663,240 (incorporated by reference herein) and include epoxy functional acrylic copolymers and polycarboxylic acid curing agents.

Typically, after forming the first topcoat over the basecoat, the first topcoat is given a drying step in which solvent is driven out of the film by heating or, alternatively, an air drying period or curing step before application of the second topcoat. Suitable drying conditions will depend on the particular first topcoat composition, and on the ambient humidity if the composition is water-borne, but, in general, a drying time from 1 to 15 minutes at a temperature of 75° F. to 200° F. (21° C. to 93° C.) will be adequate.

The film-forming composition of the present invention when employed as a second topcoat coating composition can be applied as described above for the first topcoat by any conventional coating application technique. Curing conditions can be those described above for the topcoat. The second topcoating dry film thickness can range from 0.1 to 3 mils (7.5 micrometers to 75 micrometers).

It should be mentioned that the coating compositions of the present invention can be advantageously formulated as a "monocoat", that is a coating which forms essentially one coating layer when applied to a substrate. The monocoat coating composition can be pigmented. Nonlimiting examples of suitable pigments include those mentioned above. When employed as a monocoat, the coating compositions of the present invention can be applied (by any of the conventional application techniques discussed above) in two or more successive coats, and, in certain instances can be applied with only an ambient flash period between coats. The multi-coats when cured can form essentially one coating layer.

In another embodiment, the coating compositions of the present invention also can be useful as decorative or protective coatings for pigmented plastic (elastomeric) substrates, such as those described above, or mold-in-color ("MIC") plastic substrates. In these applications, the compositions can be applied directly to the plastic substrate or included in the molding matrix. Optionally, an adhesion promoter can first be applied directly to the plastic or elastomeric substrate and the composition applied as a topcoat thereover, as discussed above. The compositions of the present invention also can be advantageously formulated as pigmented coating compositions for use as primer coatings, as basecoats in multi-component composite coatings, and as monocoat topcoats including pigments or colorants. The components used to form the compositions in these embodiments can be selected from the coating components discussed above, and additional components also can be selected from those recited above.

In embodiments of the present invention directed to automotive applications, the cured compositions can be, for example, the electrodeposition coating, the primer coating, the basecoat, and/or the topcoat. Suitable topcoats include monocoats and basecoat/clearcoat composites. Monocoats are formed from one or more layers of a colored coating composition. Basecoat/clearcoat composites comprise one or more layers of a colored basecoat composition, and one or more layers of a clearcoating composition, wherein the basecoat composition has at least one component which is different from the clearcoat composition. In the embodiments of the present invention directed to automotive applications, the clearcoat can be transparent after application.

In another embodiment, the present invention is directed to a method for making a multi-component composite comprising (a) applying a pigmented composition to a substrate to form a basecoat; and (b) applying a topcoating composition over at least a portion of the basecoat to form a topcoat thereon, wherein the topcoating composition is selected from any of the compositions described above. The components used to form the topcoating composition in this embodiment can be selected from the coating components discussed above, and additional components also can be selected from those recited above.

In one embodiment, the present invention is directed to a method of repairing a multi-layer composite coating comprising a base coat formed on a substrate from a film-forming base coating composition and a first top coat deposited over at least a portion of the base coat, the first top coat formed from a first film-forming top coating composition comprising any of the foregoing coating compositions, the method comprising locating an area of the composite coating which is flawed, and applying a repair top coat film-forming composition to the flawed area after the flawed area has been prepared for repairing. The repair top coat film-forming composition can comprise a film-forming composition which is the same or different from the first top coat film-forming composition. The flawed area can be any coating blemish that cannot be polished out, for example dirt particles in the coating surface. The flawed area typically can be abraded or sanded to remove such coating blemishes. In a repair carried out in accordance with the method of the present invention, the first top coating can provide excellent intercoat adhesion with the subsequently applied repair top coating.

The coatings formed from the compositions according to the present invention can have outstanding appearance properties and initial scratch (mar) resistance properties, as well as post-weathering or "retained" scratch (mar) resistance, which can be evaluated by measuring the gloss of coated substrates before and after abrading of the coated substrates. Moreover, the coatings formed from the compositions according to the present invention can have excellent intercoat adhesion, both to previously applied coatings as well as to subsequently applied coatings.

In one embodiment, the present invention is directed to methods of improving the scratch resistance of a polymeric substrate or polymer coated substrate comprising applying to at least a portion of the substrate any of the previously described inventive compositions, and curing the composition to form a cured coating on the substrate.

In another embodiment, the present invention is directed to a method for retaining the gloss of a polymeric substrate or polymer coated substrate after a predetermined period of time comprising applying to the substrate comprising any of the inventive compositions described for the substrate. This predetermined period of time can generally be at least 6 months and can be at least one year. In another embodiment, the present invention is directed to a method for revitalizing the gloss of a polymeric substrate or polymer coated substrate comprising applying to the substrate any of the inventive compositions described above.

The initial 20° gloss of a cured coated substrate according to the present invention can be measured with a 20° NOVO-GLOSS 20 statistical glossmeter, available from Gardner Instrument Company, Inc. The coated substrate can be subjected to scratch testing by linearly scratching the coating or substrate with a weighted abrasive paper for ten double rubs using an Atlas AATCC Scratch Tester, Model CM-5, available from Atlas Electrical Devices Company of Chicago, Ill. The abrasive paper is 3M 281 Q WETORDRY™ PRODUCTION™ 9 micron polishing paper sheets, which are commercially available from 3M Company of St. Paul, Minn. Panels are then rinsed with tap water and carefully patted dry with a paper towel. The 20 gloss is measured on the scratched area of each test panel. The number reported is the percent of the initial gloss retained after scratch testing, i.e., 100%×scratched gloss/initial gloss. This test method is fully disclosed in the examples that follow.

In certain embodiments, the cured composition or coating of the present invention has an initial 200 gloss (as measured using a 200 NOVO-GLOSS 20 statistical glossmeter, available from Gardner Instrument Company) of greater than 40, can be greater than 50, and is often greater than 70. This high gloss composition can be curable under ambient or thermal conditions or by radiation curing techniques, for example, by actinic radiation. In one embodiment, the high gloss composition is curable by ambient or thermal conditions.

Moreover, the cured topcoat formed from the compositions of the present invention can exhibit excellent initial scratch (mar) resistance, as well as post-weathering scratch (mar) resistance properties. The cured topcoat can have an initial scratch (mar) resistance value (as measured by first determining the initial 20° gloss as described above, linearly abrading the cured coating surface with a weighted abrasive paper for ten double rubs using an Atlas AATCC Scratch Tester, Model CM-5, available from Atlas Electrical Devices Company, and measuring the 20° gloss as described above for the abraded surface) such that after scratch (mar) testing greater than 30 percent of initial 20° gloss is retained, in certain instances greater than 40 percent of initial 20° gloss is retained, and in other instances greater than 60 percent of initial 20° gloss is retained after abrading the coating surface (that is, 100%×scratched gloss/initial gloss).

Also, the cured topcoat formed from the compositions of the present invention can have a post-weathering scratch (mar) resistance (as measured using the scratch test method described above after the unscratched test panels were subjected to simulated weathering by QUV exposure to UVA-340 bulbs in a weathering cabinet available from Q Panel Company) such that greater than 30 percent of initial 20° gloss is retained is retained after weathering for 250 hours. In another embodiment, greater than 50 percent of initial 20° gloss is retained, an often greater than 70 percent of initial 20° gloss is retained after weathering for 250 hours.

The compositions of the present invention can advantageously be used to form the transparent topcoat (i.e., clearcoat) in a cured multi-component composite coating comprising a basecoat deposited from a pigmented coating composition and the topcoat deposited from a topcoat coating composition. As used herein, "transparent" means that the cured coating has a BYK Haze index of less than 50 as measured using a BYK Haze/Gloss Instrument. When so employed, the cured topcoat can be deposited from any of the previously described compositions of the present invention.

The coating compositions of the present invention can provide flexible cured coatings. Flexibility testing can be conducted according to the following "Flexibility Test Method." The coating is applied to a flexible polymeric test panel and cured. For flex testing, a 1-inch by 4-inch piece is cut from the coated test panel. At a temperature of 70° F. (21° C.)±5° F., the piece is subjected to a mandrel bend using a ½ inch diameter steel mandrel, such that the two ends of the 4-inch long test piece contacted one another. The test panel is then rated for flexibility by visual inspection for coating cracking on a scale of 0 to 10. A "10" rating is recorded where there is no visible paint cracking; a "9" rating has less than five interrupted short line cracks; an "8" has interrupted line cracks with a maximum of four uninterrupted line cracks; a "6" has five to ten uninterrupted line cracks; a "4" has more than 15 uninterrupted line cracks; and a "0" represents fracture of the substrate. In one embodiment, the coating compositions when cured have a flexibility rating of at least 6 at 70° F. In another embodiment, the coating compositions when cured have a flexibility rating of at least 8 at 70° F, while in yet another embodiment, the coating compositions when cured have a flexibility rating of at least 9 at 70° F.

Moreover, the coating compositions of the present invention can provide cured coatings having excellent intercoat or interlayer adhesion to subsequently applied coating layers. For example, any of the aforementioned coating compositions can be applied as a transparent clearcoat in a color-plus-clear coating system as discussed above. In the event of damage to the cured coating system causing a surface defect, it may be necessary to prepare the damaged area for repair with a subsequently applied clear coat composition. The coating compositions of the present invention can provide excellent intercoat adhesion between the first clear coat layer and the subsequently applied repair clear coat layer. Likewise, when used as a top coat composition, the coating compositions of the present invention also provide excellent interlayer adhesion between the cured top coat and a subsequently applied windshield adhesive without the intervening step of applying an adhesion promoting primer.

Illustrating the invention are the following examples which, however, are not to be considered as limiting the invention to their details. Unless otherwise indicated, all parts and percentages in the following examples, as well as throughout the specification, are by weight.

EXAMPLES

Resin Compositions

Polysiloxane Polyol

Example AA

This example describes the preparation of a polysiloxane polyol which was subsequently used to form respective silica dispersions of Examples A and B, and the polysiloxane borates used in the thermosetting compositions of the present invention. The polysiloxane polyol was a product of the hydrosilylation of a reactive silicone fluid having an approximate degree of polymerization of 3 to 7, i.e., (Si—O)$_3$ to (Si—O)$_7$. The polysiloxane polyol was prepared from a proportionately scaled-up batch of the following mixture of ingredients in the ratios indicated:

| Ingredients | Equivalent Weight | Equivalents | Parts by Weight (kilograms) |
|---|---|---|---|
| Charge I: | | | |
| Trimethylolpropane monoallyl ether | 174.0 | 756.0 | 131.54 |
| Charge II: | | | |
| MASILWAX BASE[1] | 156.7[2] | 594.8 | 93.21 |
| Charge III: | | 10 ppm | |
| Chloroplatinic acid | | | 0.23 |
| Toluene | | | 0.07 |
| Isopropanol | | | |

[1]Polysiloxane-containing silicon hydride, commercially available from BASF Corporation.
[2]Equivalent weight based on mercuric bichloride determination.

To a suitable reaction vessel equipped with a means for maintaining a nitrogen blanket, Charge I and an amount of sodium acetate equivalent to 20 to 25 ppm of total monomer solids was added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Silica Dispersions

Example A

This example describes the preparation of a colloidal silica dispersion used as a component in the thermosetting compositions of the present invention. The colloidal silica dispersion was prepared as follows. A suitable reaction vessel was equipped for vacuum distillation and flushed with N$_2$. To the reaction flask was added 3150 g of the polysiloxane polyol of Example M described above, 4500 g of ORGANOSILICASOL™ MT-ST colloidal silica (which is commercially available from Nissan Chemicals) and 1440 g of methyl amyl ketone. The mean particle size of the silica particles was about 10–20 nanometers, as disclosed at http://www.snowtex.com/organo_types.html (Jun. 2, 2000), which is incorporated by reference herein. The resulting mixture was vacuum distilled at 25° C. for a period of 8 hours.

Example B

This example describes the preparation of a colloidal silica dispersion used as a component in the thermosetting compositions of the present invention. The colloidal silica dispersion was prepared as follows. A 4-neck reaction flask equipped for vacuum distillation was flushed with $N_2$. To the reaction flask was added 1501.4 g of the polysiloxane tetrol described above, 3752.9 g of ORGANOSILICASOL™ MT-ST colloidal silica (which is commercially available from Nissan Chemicals) and 900.6 g of methyl amyl ketone. The resulting mixture was vacuum distilled at 70 mm Hg and 31° C.

Adhesion Promoter Compositions

The following Examples C through H describe the preparation of various adhesion promoting compositions used in the coating compositions of the present invention. Each adhesion promoting composition was prepared as described below.

Example C

A four-neck reaction flask equipped with stirrer, temperature probe, Dean Stark trap and reflux condenser was flushed with N2. The following materials were charged to the flask and blended under agitation: 180.4 g of the polysilxoane polyol of Example AA, 300.9 g of isopropyl alcohol and 25.8 g of boric acid. The mixture was heated to reflux at a temperature of 79° C., and 200 ml of solvent was removed over 0.25 hours. The resulting material was cooled and measured to have 49.8% solids and contained 3.0% water.

Example D

A four-neck reaction flask equipped with stirrer, temperature probe, Dean Stark trap and reflux condenser was flushed with $N_2$. The following materials were charged to the flask and blended under agitation: 3241.4 g of the polysiloxane polyol of Example AA, 5415.3 g of isopropyl alcohol and 463.9 g of boric acid. The mixture was heated to reflux at a temperature of 73° C., and 3607.7 g of solvent was removed over a period of 1.5 hours. The resulting material was cooled and measured to have 56.0% solids and contained 2.5% water.

Example E

A four-neck reaction flask equipped with stirrer, temperature probe, Dean Stark trap and reflux condenser was flushed with $N_2$. The following materials were charged to the flask and blended under agitation: 180.3 g of polysiloxane polyol of Example AA, 300.7 g of isopropyl alcohol and 25.8 g of boric acid. The mixture was heated to reflux at a temperature 79° C., and 200 ml of solvent was removed over a period of 0.25 hours. The resulting material was cooled and measured to have 49.5% solids and contained 3.0% water.

Example F

A four-neck reaction flask equipped with stirrer, temperature probe, Dean Stark trap and reflux condenser was flushed with $N_2$. The following materials were charged to the flask and blended under agitation: 1575.5 g Dowanol PM, and 144.8 g of Boric acid[2]. The mixture was heated to reflux at a temperature of 110° C., and held for a period 2 hours. Thereafter, 632.3 g of solvent was removed over a period of 0.5 hours. The resulting material was cooled and measured to have 11.2% solids and contained 5.0% water.

Example G

A four-neck reaction flask equipped with stirrer, temperature probe, Dean Stark trap and reflux condenser was flushed with $N_2$. The following ingredients were charged to the flask and blended under agitation: 454.7 g of acrylic polyol (prepared from 14.5% butyl acrylate, 14.5% butyl methacrylate, 27.6% isobornyl methacrylate, 22.6% hydroxypropyl methacrylate, 20.4% hydroxyethyl methacrylate, and 0.4% acrylic acid, having a resin solids of 69.7%, Mw 3227 and hydroxyl value of 101), 97.2 g of isopropyl alcohol and 2.06 g of boric acid. The mixture was heated to reflux at a temperature of 93° C., and held for a period of 1 hour. Thereafter, 62 g of solvent was removed over a period of 0.25 hours. The resulting material was cooled and measured 69.3% solids and contained 0.1% water.

Example H

A four-neck reaction flask equipped with stirrer, temperature probe, Dean Stark trap and reflux condenser was flushed with $N_2$. The following materials were charged to the flask and blended under agitation: 360.5 g of the polysiloxane polyol of Example AA, 601.7 g of isopropyl alcohol and 13.6 g of aluminum isopropoxide (available from Aldrich Chemical Co.). The mixture was heated to reflux at a temperature of 81° C., and, thereafter, 401.8 g of solvent was removed over a period of 1 hour. The resulting material was cooled and measured to have 53.32% solids

Thermosetting Coating Compositions

One Component Compositions

Example 1

This example describes the preparation of a resinous binder pre-mix used in the one-package thermosetting coating compositions of Examples 4–6 below. Each of the ingredients was added sequentially and mixed under mild agitation.

| Ingredient | Parts by weight (grams) | Solid weight (grams) |
|---|---|---|
| Methyl n-amyl ketone | 18.0 | — |
| Butyl Cellosolve ® acetate[1] | 18.0 | — |
| Butyl Carbitol ® acetate[2] | 4.0 | — |
| TINUVIN ® 384[3] | 1.58 | 1.50 |
| TINUVIN ® 400[4] | 1.76 | 1.50 |
| TINUVIN ® 292[5] | 0.40 | 0.40 |
| TINUVIN ® 123[6] | 0.40 | 0.40 |
| Silica dispersion of Example A | 13.2 | 10.0 |

-continued

| Ingredient | Parts by weight (grams) | Solid weight (grams) |
|---|---|---|
| LUWIPAL 018[7] | 41.1 | 30.0 |
| TACT[8] | 9.4 | 5.0 |
| Polybutyl acrylate[9] | 0.50 | 0.30 |
| Blocked acid catalyst[10] | 2.50 | 1.00 |

[1]2-Butoxyethyl acetate solventcommercially available from Union Carbide Corp.
[2]2-(2-Butoxyethoxy) ethyl acetate commercially available from Union Carbide Corp.
[3]Substituted benzotriazole UV light stabilizer commercially available from Ciba Specialty Chemicals Corp.
[4]Substituted triazine UV light stabilizer commercially available from Ciba Specialty Chemicals Corp.
[5]Sterically hindered amine light stabilizer commercially available from Ciba Specialty Chemicals Corp.
[6]Bis-(1-octyloxy-2,2,6,6-tetramethyl-4-piperidinyl) sebacate hindered aminoether light stabilizer available from Ciba Specialty Chemicals Corp.
[7]High imino, butylated melamine formaldehyde resin commercially available from BASF Corp.
[8]Tris (alkyl carbamoyl) triazine available from Cytec Industries, Inc. The alkyl substituent was mixed methyl and butyl.
[9]A flow control agent having a Mw of about 6700 and a Mn of about 2600 made in xylene at 62.5% solids available from E. I. duPont de Nemours and Company.
[10]Dodecyl benzene sulfonic acid solution, blocked with diisopropanol amine to 91% total neutralization, 40 percent in ethanol.

Example 2

This example describes the preparation of a resinous binder pre-mix used in the one-package thermosetting coating composition of Examples 7–9 described below. Each of the ingredients was added sequentally and mixed under mild agitation.

| Ingredient | Parts by weight (grams) | Solid weight (grams) |
|---|---|---|
| Methyl n-amyl ketone | 16.0 | — |
| Butyl Cellosolve ® acetate | 16.0 | — |
| Butyl Carbitol ® acetate | 3.50 | — |
| TINUVIN ® 928[1] | 3.00 | 3.00 |
| TINUVIN ® 292 | 0.40 | 0.40 |
| Silica Dispersion of Example B | 10.3 | 7.0 |
| RESIMENE ® 757[2] | 41.2 | 40.0 |
| Polybutyl acrylate | 0.50 | 0.30 |
| Blocked acid catalyst | 2.50 | 1.00 |

[1]2-(2H-Benzotriazol-2yl)-6-(1-methyl-1-phenylethyl)-4-(1,1,3,3-tetramethylbutyl)phenol UV absorber available from Ciba Specialty Chemicals Corp.
[2]Methylated and butylated melamine-formaldehyde resin available from Cytec Industries, Inc.

Example 3

This example describes the preparation of a resinous binder pre-mix used in the preparation of thermosetting coating compositions of Examples 7–9 described below. The resins were admixed and blended under mild agitation.

| Ingredient | Parts by weight (grams) | Solid weight (grams) |
|---|---|---|
| Carbamoylated acrylic[1] | 44.4 | 28.0 |
| Carbamoylated polyester[2] | 38.9 | 28.0 |

[1](58% butyl methacrylate/40% hydroxypropyl acrylate/2% methyl styrene dimer) 64% solids in a solvent blend of (50% DOWANOL PM/50% propanoic acid, 3-ethoxy ethyl ester), 75% carbamoylated with methyl carbamate.
[2](10.6% trimethylol propane/22.7% 2,2,4-trimethyl-1,3-pentanediol/17.5% neopentyl glycol/49.2% hexahydrophthalic anhydride) 69% solids in a solvent blend of (44% Dowanol PM/56% Dowanol PM Acetate) 75% carbamoylated with methyl carbamate.

The preparation of various one-package thermosetting coating compositions are described below in the following Tables 1 and 2. The amounts listed are the total parts by weight in grams and the amount within parenthesis are percentages by weight based on weight of solids. Each component was mixed sequentially with agitation. Comparative coating compositions which do not contain a boron-containing compound are indicated using an "*".

TABLE 1

| Ingredient | Example 4* | Example 5 | Example 6 |
|---|---|---|---|
| Example 1 pre-mix | 110.8 (50.1) | 110.8 (50.1) | 110.8 (50.1) |
| Acrylic resin[1] | 89.9 (58.0) | 88.4 (57.0) | 83.7 (54.0) |
| Siloxane Borate of Example C | — | 2.01 (1.00) | 8.0 (4.00) |
| Reduction: | | | |
| Methyl n-amyl ketone | 5.4 | 4.79 | 3.07 |
| Butyl Cellosolve ® acetate | 5.4 | 4.79 | 3.07 |
| Butyl Carbitol ® acetate | 1.2 | 1.06 | 0.68 |
| Spray viscosity[2] (sec) | 28.4 | 28.2 | 28.1 |
| Paint temperature (° F.) | 73.3 | 73.5 | 73.1 |
| Theory % Solids[3] | 50.8 | 51.0 | 51.6 |

[1]Acrylic resin (30% styrene, 19.9% hydroxyethyl methacrylate, 28.7% CarduraE (available from Shell Chemical Co.), 9.5% acrylic acid, and 12% ethylhexyl acrylate) at 65% solids in SOLVESSO 100 (available from Exxon Chemicals America), prepared in Example A of U.S Pat. No. 5,965,670.
[2]Viscosity measured in seconds with a #4 FORD efflux cup at ambient temperature.
[3]Theory % Solids of a coating is determined by taking the solid weight of the coating formulation divided by the sum of the parts by weight of the coating formulation and the reducing solvent weight

TABLE 2

| Ingredient | Example 7* | Example 8 | Example 9 |
|---|---|---|---|
| Example 2 pre-mix | 93.4 (51.7) | 93.4 (51.7) | 93.4 (51.7) |
| Example 3 pre-mix | 83.3 (56.0) | 81.8 (55.0) | 77.4 (52.0) |
| Siloxane Borate of Example D | — | 1.79 (1.00) | 7.1 (4.00) |
| Methyl n-amyl ketone | 2.00 | — | — |
| Butyl Cellosolve ® acetate | 2.00 | — | — |
| Butyl Carbitol ® acetate | 0.50 | — | — |
| Reduction Information: | | | |
| Methyl n-amyl ketone | 3.03 | 4.7 | 3.83 |
| Butyl Cellosolve ® acetate | 3.03 | 4.7 | 3.83 |
| Butyl Carbitol ® acetate | 0.67 | 1.04 | 0.85 |
| Spray viscosity[1] (sec) | 28.4 | 28.7 | 28.1 |

TABLE 2-continued

| Ingredient | Example 7* | Example 8 | Example 9 |
|---|---|---|---|
| Paint temperature (° F.) | 72.4 | 72.3 | 72.0 |
| Theory % Solids[2] | 57.3 | 57.5 | 57.8 |

[1]Viscosity measured in seconds with a #4 FORD efflux cup at ambient temperature.
[2]Theory % Solids of a coating is determined by taking the solid weight of the coating formulation divided by the sum of the parts by weight of the coating formulation and the reducing solvent weight.

Testing

The film forming compositions of Examples 4–9 were spray applied to a pigmented basecoat to form color-plus-clear composite coatings over primed electrocoated steel panels. The panels used were cold rolled steel panels (size 4 inches×12 inches (10.16 cm by 30.48 cm)). The steel panels for Examples 4–6 were coated with ED5000 electrocoat, available from PPG Industries, Inc, and SUPERMAR primer, available from Herberts/DuPont. The ED5000 electrocoat test panels are available as APR22986 from ACT Laboratories, Inc. of Hillsdale, Mich. Examples 7–9 utilized steel panels that were coated with ED5240 electrocoat and FCP6579 primer, both available from PPG Industries, Inc. The test panels are available as APR40017 from ACT Laboratories Inc. of Hillsdale, Mich.

The basecoat used for Examples 4–6 was Nero Vulcano UR806/A, black pigmented solvent-based acrylic/melamine basecoat, available from PPG Industries, Inc. Examples 7–9 used ODCT6373 Ebony Black, a black pigmented solvent-based acrylic/melamine basecoat, available from PPG Industries, Inc.

The Nero Vulcano UR806/A basecoat was automated spray applied in one coat to the electrocoated and primed steel panels at ambient temperature (about 70° F. (21° C.)). A dry film thickness of about 0.5 to 0.7 mils (about 13 to 18 micrometers) was targeted. After the basecoat application, a ninety second air flash at ambient temperature was given before applying the clearcoat. The ODCT6373 Ebony Black basecoat was automated spray applied in two coats to the electrocoated and primed steel panels at ambient temperature (about 70° F. (21° C.)). A ninety second air flash at ambient temperature was given between the two basecoat applications. A dry film thickness of about 0.6 to 0.8 mils (about 15 to 20 micrometers) was targeted. After the second basecoat application, a ninety second air flash at ambient temperature was given before applying the clearcoat.

The clear coating compositions of Examples 4–9 were each automated spray applied to a basecoated panel at ambient temperature in two coats with a ninety second ambient flash between applications. Examples 4–6 were targeted for a 1.5 to 1.7 mils (about 38 to 43 micrometers) dry film thickness, and Examples 7–9 were targeted for a 1.7 to 1.9 mils (about 43 to 48 micrometers) dry film thickness. All coatings were allowed to air flash at ambient temperature for ten minutes. Panels prepared from each coating were baked for thirty minutes at 285° F. (141° C.) to fully cure the coating(s). The panels were baked in a horizontal position.

To test for recoat adhesion, an original basecoated and clearcoated panel, as described above, was given another layer of basecoat and clearcoat or clearcoat only. Examples 4–6 were recoated with Nero Vulcano UR806/A and Examples 4–6, depending on the respective original panel. Examples 7–9 were recoated with ODCT6373 Ebony Black and Examples 7–9, depending on the respective original panel. For example, an Example 4 clearcoat over Nero Vulcano UR806/A original (prepared above) was recoated with Nero Vulcano UR806/A and Example 4 clearcoat. Half of an original panel from each clear coating was basecoated and clearcoated and the other half of the panel was clearcoated only. To recoat the panels half and half, the bottom halves of the original panels were covered with aluminum foil and then the respective basecoats were automated spray applied as described above. The foil was removed, resulting in an original panel with the upper half coated in basecoat and the bottom half still with only the original coating layers. The respective clearcoat was then automated spray applied to the entire panel as described above. The resulting panels were half coated in basecoat/clearcoat from the original spray application and another layer of basecoat/clearcoat from the recoat spray application (B/C//B/C). The other half of the resulting panel was coated in basecoat/clearcoat from the original spray application and another layer of clearcoat from the recoat spray application (B/C//C). Test results for the coatings are reported below in Table 3. As mentioned above the coating compositions of Examples 4–6 were applied over Nero Vulcano UR806/A basecoat and Examples 7–9 were applied over ODCT6373 Ebony Black basecoat.

TABLE 3

| Example # | Adhesion Promoter (B) Elemental Weight % on Resin Solids | Recoat Adhesion[2] | | | Windshield Adhesion[3] (% cohesive failure) |
|---|---|---|---|---|---|
| | | 20° Gloss[1] | B/C//B/C | B/C//C | |
| 4* | 0 | 91 | 0 td | 0 td | — |
| 5 | 0.02 | 91 | 2/3 | 0 | — |
| 6 | 0.08 | 91 | 4+ | 4 | — |
| 7* | 0 | 86 | 2+ | 0 | 0 |
| 8 | 0.02 | 86 | 5– | 3+ | 100 |
| 9 | 0.08 | 84 | 5 | 5 | 100 |

[1]20° gloss was measured with a Statistical Novo-Gloss 20° gloss meter, available from Paul N. Gardner Company, Inc.
[2]Recoat adhesion tests the adhesion of the recoat layer (either basecoat/clearcoat or clearcoat only) to the original layers (steel/electrodeposition/primer/basecoat/clearcoat). A multi-blade claw with 2.0 mm spaced teeth (blade and handle/blade holder are available from Paul N. Gardner Company, Inc.) was used to scribe the cured coating. Two sets of scribes were made by scribing the second set on top of and perpendicular to the first set. Detached flakes and ribbons of coating were wiped off the panel and strapping tape (3M #898 available from Minnesota, Mining and Manufacturing Co. - 3M) was smoothed firmly over the crosshatch marking. Within 90 seconds of application, the tape was removed in one continuous motion directed toward the tester and as parallel to the panel as possible. The scribed area was inspected and rated for removal of the recoat layer to the substrate according to the following scale:
  5 = The edges of the cuts are completely smooth and none of the lattice squares is detached.
  4 = Small flakes of coating are detached at intersections. Less than five percent of the area is affected.
  3 = Small flakes of the coating are detached along edges and at intersections of cuts. The area affected is five to fifteen percent of the lattice.
  2 = The coating has flaked along the edges and on parts of the squares. The area affected is fifteen to thirty-five percent of the lattice.
  1 = The coating has flaked along the edges of cuts in large ribbons and whole squares have detached. The area affected is thirty-five to sixty-five percent of the lattice.
  0 = Flaking and detachment worse than rating 1. Over sixty-five percent of the lattice is affected.
  Td = Total delamination,
[3]The adhesion between a coating and a windshield adhesive

TABLE 3-continued used in the automotive industry was determined using the Quick Knife test. Within 1 to 4 hours of the final thirty minute bake cycle, a bead of the BETASEAL 15625 urethane adhesive (Supplied by Essex Specialty Products Inc.) was applied to the surface of the clearcoat of a basecoated and clearcoated panel, prepared as described above. The plastic nozzle (supplied with adhesive) was prepared for the urethane by cutting the tip at ~80° angle. The opening measured approximately 5 mm in diameter. On the long end of the cut edge, a notch approximately 5 mm wide by 2 mm high was cut. The tube of urethane was placed in a battery powered caulking gun and a small amount was squeezed from the tube into a paper cup for disposal. The caulking gun was set at ~90% speed for a steady flow of adhesive. The plastic tip was placed on the panel with the notch facing away from the person applying the bead. With the tip held firmly on the panel at the same angle (80°) as the cut nozzle, a steady bead was applied down the length of the panel. The bead was flat where it contacted the panel. After the bead was laid, the panel was placed in a ventilated hood where it remained undisturbed for at least 72 hours @20–50% relative humidity in order to cure. After the bead cured, the adhesive bead was cut with a razor blade knife. A small section was cut at the beginning of the bead to make it easier to grasp. To cut the bead, the small beginning section was pulled back at approximately a 180° angle and slices were made in the adhesive at a 60° to 80° angle in a quick motion. The blade was kept in contact with the clearcoat at all times during. The adhesive bead continued to be pulled while the adhesive was being cut at ~½" intervals. A minimum of 10 cuts was made. After making slices to the adhesive bead, the panel was rated for % Cohesive Failure (% C.F.) of the bead to the panel. (Cohesive Failure occurs when the integrity of the adhesive bead is lost as a result of cutting and pulling rather than the bond between the adhesive bead and the clearcoat surface.) Failures were reported as a total % along the bead. For example, if there was 20% of the urethane remaining on the panel, then it was reported as 20% C.F. and if the entire bead can be pulled off, it was considered to be 0% C.F. The desired result was a minimum of 90% or higher cohesion.

The data presented above in Table 3 illustrate that recoat adhesion for the one-package coating compositions of the present invention improves as the amount of polysiloxane borate increases in the composition, while similar comparative compositions which do not contain the polysiloxane borate have poor or no recoat adhesion. Further, the data illustrate that while the comparative composition of Example 7 exhibits very poor (0%) windshield adhesion, the compositions of the present invention (Examples 8 and 9) exhibit excellent (100%) windshield adhesion.

Examples 10 Through 13

The following Examples 10 through 13 presented in Table 4 below describe the preparation of thermosetting coating compositions based on epoxy containing acrylic resins cured with acid functional curing agents in combination with aminoplast resins. The compositions were prepared by admixing the following ingredients under mild agitation. Note, those comparative compositions which do not contain a boron-containing compound (i.e., Comparative Examples 10 and 13) are designated with an "*".

TABLE 4

| Materials | Example 10* Solids Resin + Additive | Soln. Wt. | Example 11 Solids Resin + Additive | Soln. Wt. | Example 12 Solids Resin + Additive | Soln. Wt. | Example 13* Solids Resin + Additive | Soln. Wt. |
|---|---|---|---|---|---|---|---|---|
| n-pentyl propionate[1] | — | 25 | — | 25 | — | 25 | — | 15 |
| DOWANOL PM[2] | — | — | — | — | — | — | — | 11.2 |
| TINUVIN ® -328[3] | 3 | 3 | 3 | 3 | 3 | 3 | 2.7 | 2.7 |
| Colloidal silica dispersion of Example A | — | 10.5 | — | 10.5 | — | 10.5 | — | — |
| 60% GMA resin[4] | 42.9 | 67 | 39.05 | 61 | 37.05 | 58 | — | — |
| 50% GMA resin[5] | — | — | — | — | — | — | 56.25 | 87.9 |
| Primary amyl alcohol[6] | — | — | — | — | — | — | — | 4.1 |
| CYMEL 202[7] | 3 | 3.8 | 3 | 3.8 | 3 | 3.8 | 2.05 | 2.6 |
| CYLINK ® 2000[8] | 10 | 20 | 10 | 20 | 10 | 20 | — | — |
| fumed silica dispersion[9] | — | — | — | — | — | — | — | 12.9 |
| Isostearic Acid[10] | 4 | 4 | 4 | 4 | 4 | 4 | 4.1 | 4.1 |
| PENTEK[11] | 34.25 | 50.4 | 34.1 | 50 | 32.1 | 47.2 | 34.2 | 50.3 |
| Siloxane Borate of Example A | — | — | 4 | 8.1 | 8 | 16.2 | — | — |
| TINUVIN ® 123 | 0.4 | 0.4 | 0.4 | 0.4 | 0.4 | 0.4 | 0.35 | 0.35 |
| Polybutyl acrylate | — | — | — | — | — | — | 0.51 | 0.85 |
| OX-60[12] | — | — | — | — | — | — | 0.04 | 0.08 |

TABLE 4-continued

| Materials | Example 10* Solids Resin + Additive | Soln. Wt. | Example 11 Solids Resin + Additive | Soln. Wt. | Example 12 Solids Resin + Additive | Soln. Wt. | Example 13* Solids Resin + Additive | Soln. Wt. |
|---|---|---|---|---|---|---|---|---|
| Multiflow (50% soln. of MODAFLOW)[1] | 0.025 | 0.05 | 0.025 | 0.05 | 0.025 | 0.05 | 0.09 | 0.18 |
| Di-methyl cocoamine[14] | 0.3 | 0.3 | 0.3 | 0.3 | 0.3 | 0.3 | 0.32 | 0.32 |

[1]Available from Dow Chemical Co.
[2]Dipropylene glycol monomethyl ether, available from Dow Chemical Co.
[3]2-(2'-Hydroxy-3',5'-dtert-amylphenyl) benzotriazole UV light stabilizer available from Ciba Specialty Chemicals Corp.
[4]Acrylic resin comprising 60% glycidyl methacrylate, 31% n-butyl methacrylate, 0.2% methyl methacrylate, 7% styrene, 2% diphenyl-2,4-methyl-4 pentene-1, 66% solids in dipropylene glycol monomethyl ether and n-amyl propionate.
[5]Acrylic resin comprising 50% glycidyl methacrylate, 41% n-butyl methacrylate, 0.2% methyl methacrylate, 7% styrene, 2% diphenyl-2,4-methyl-4 pentene-1, 64% solids in dipropylene glycol monomethyl ether and n-amyl propionate.
[6]Available from Dow Chemical Co.
[7]Melamine available from Cytec Industries, Inc.
[8]Available from Cytec Industries, Inc.
[9]R-812 silica from Degussa dispersed in n-amyl alcohol and a trimethylol propane/methylhexahydrophthalic anhydride half ester of Example G in U.S. Pat. No. 5,256,452.
[10]Available from Uniqema.
[11]Polyester prepared from 83% 4-methyl hexahydrophthalic anhydride and 17% pentaerythritol, 67% solids in n-propyl alcohol and n-amyl propionate.
[12]Available from Kusumoto, a King Industries distributor.
[13]Available from Solutia.
[14]Available from Albemarle Corp.

The clearcoats prepared as described above were reduced with DOWANOL® DPM to a spray viscosity of 26 seconds at ambient temperature (approximately 76° F. (26° C.)), with a Ford #4 cup.

Testing

The film forming compositions of Examples 10–13 were spray applied to a pigmented basecoat to form color-plus-clear composite coatings over electrocoated steel panels. The panels used were cold rolled steel panels (size 4 inches×12 inches (10.16 cm by 30.48 cm)). The steel panels for Examples 10–13 were coated with ED5000 electrocoat, available from PPG Industries, Inc. These prepared test panels are available as APR23884 from ACT Laboratories, Inc. of Hillsdale, Mich.

The basecoat used for Examples 10–13 was HWB-9517, black pigmented waterborne basecoat, available from PPG Industries, Inc. The HWB-9517 basecoat was automated spray applied in one coat to the electrocoated steel panels at ambient temperature (i.e., at approximately 76° F. (25° C.) and 30% relative humidity). A dry film thickness of about 0.5 to 0.7 mils (about 13 to 18 micrometers) was targeted. The basecoat was allowed to flash ambiently for about 5 minutes and then prebaked for five minutes at 200° F. (93° C.).

The clear coating compositions of Examples 10–13 were each automated spray applied to a basecoated panel at ambient temperature in two coats with a 60 second ambient flash between applications. Coatings of Examples 10–13 were targeted for a 1.8 to 2 mils (about 46 to 51 micrometers) dry film thickness. All coatings were allowed to air flash at ambient temperature for ten minutes. Panels prepared from each coating were baked for thirty minutes at 285° F. (141° C.) to fully cure the coating(s). The panels were baked in a horizontal position.

To test for recoat adhesion, an original basecoated and clearcoated panel, as described above, was given another layer of basecoat and clearcoat or clearcoat only. Examples 10–13 were recoated with HWB-9517 basecoat. To recoat the panels half and half, the right halves of the original panels were covered with masking tape and then the respective basecoats were automated spray applied as described above. The tape was removed, resulting in an original panel with the right half coated in basecoat and the left half still with only the original coating layers. The respective clearcoat was then automated spray applied to the entire panel as described above. The resulting panels were half coated in basecoat/clearcoat from the original spray application and another layer of basecoat/clearcoat from the recoat spray application (B/C//B/C). The other half of the resulting panel was coated in basecoat/clearcoat from the original spray application and another layer of clearcoat from the recoat spray application (B/C//C). Test data is presented below in the following Table 5.

TABLE 5

| Clearcoat composition | 20° Gloss | Elemental weight % on resin solids | MVSS primerless adhesion % pass | Recoat Adhesion % pass B/C//B/C | Recoat Adhesion % pass B/C//C |
|---|---|---|---|---|---|
| Example 11 | 72 | 0.08 | data unavailable | 30 | 50 |
| Example 12 | 72 | 0.16 | 88 | 100 | 100 |
| Example 10* | 83 | 0 | 100 | 0 | 0 |
| Example 13* | 83 | 0 | 100 | 100 | 100 |

*Comparative examples

The data presented in Table 5 above illustrate that the epoxy-acid clear coat controls of Comparative Examples 10 and 13 pass MVSS primeness adhesion. However, these same the clearcoating of Example 10 exhibits very poor recoat adhesion when recoated either with a subsequently applied repair basecoat/clearcoat system or a repair clearcoat. By contrast, the coating compositions of the present invention which contain the polysiloxane borate, exhibit improved recoat adhesion and 100% recoat adhesion (see Examples 11 and 12, respectively).

Two-component Coating Compositions
Comparative Example 14

This comparative example describes the preparation of a two-component clearcoat composition which does not contain an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin[1] | 58.2 | 42.2 |
| CYMEL ® 202 | 18.8 | 15.0 |
| Polysiloxane polyol of Example AA | 11.0 | 11.0 |
| Phenyl Acid Phosphate Catalyst[2] | 0.7 | 0.5 |
| Desmodur N3300[4] | 27.1 | 27.1 |

[1]Acrylic polyol prepared from 14.5% butyl acrylate, 14.5% butyl methacrylate, 27.6% isobornyl methacrylate, 22.6% hydroxypropyl methacrylate, 20.4% hydroxyethyl methacrylate, and 0.4% acrylic acid, having resin solids of 69.7%, Mw 3227 and a hydroxyl value of 101.
[2]Phenyl acid phosphate solution, 75 percent in isopropanol.
[3]Isocyanurate of hexamethylene diisocyanate available from Bayer Corp.

Example 15

This example describes the preparation of a two-component clearcoat composition of the present invention which contains a siloxane borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 10.0 | 10.0 |
| Siloxane Borate of Example E | 2.4 | 1.0 |
| Phenyl Acid Phosphate Catalyst | 0.7 | 0.5 |
| Desmodur N3300 | 27.1 | 27.1 |

Example 16

This example describes the preparation of a two-component clearcoat composition of the present invention which contains a siloxane borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dipersion of Example A | 8.8 | 6.7 |
| Acrylic Resin of Example 14 | 58.2 | 42.2 |
| Cymel 202 | 18.8 | 15.0 |
| Polysiloxane polyol of Example AA | 9.0 | 9.0 |
| Siloxane Borate of Example E | 4.9 | 2.0 |
| Phenyl Acid Phosphate Catalyst | 0.7 | 0.5 |
| Desmodur N3300 | 27.1 | 27.1 |

Example 17

This example describes the preparation of a two-component clearcoat composition of the present invention which contains a siloxane borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 7.0 | 7.0 |
| Siloxane Borate of Example E | 9.8 | 4.0 |
| Phenyl Acid Phosphate Catalyst | 0.7 | 0.5 |
| DesmodurN3300 | 27.1 | 27.1 |

Example 18

This example describes the preparation of a two-component clearcoat composition of the present invention which contains a boric acid as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 11.0 | 11.0 |
| Boric acid (20% solution in methanol) | 1.3 | 0.3 |
| Phenyl Acid Phosphate Catalyst | 0.7 | 0.5 |
| DesmodurN3300 | 27.1 | 27.1 |

Example 19

This example describes the preparation of a two-component clearcoat composition of the present invention which contains a boric acid as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 11.0 | 11.0 |
| Boric acid (20% solution in methanol) | 5.0 | 1.0 |
| Phenyl Acid Phosphate Catalyst | 0.7 | 0.5 |
| DesmodurN3300 | 27.1 | 27.1 |

Example 20

This example describes the preparation of a two-component clearcoat composition of the present invention which contains triisopropyl borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | 11.0 | 11.0 |
| Triisopropyl Borate[1] | 0.9 | 0.9 |
| Phenyl Acid Phosphate Catalyst | 0.7 | 0.5 |
| DesmodurN3300 | 27.1 | 27.1 |

[1]Available from Aldrich Chemical Co.

Example 21

This example describes the preparation of a two-component clearcoat composition of the present invention which contains DOWANOL PM borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |

-continued

| Ingredient | Parts by Weight (grams) | Solid Weight (grams) |
|---|---|---|
| Polysiloxane polyol of Example AA | 11.0 | 11.0 |
| Dowanol PM borate of Example F | 2.2 | 0.3 |
| Phenyl Acid Phosphate Catalyst | 0.7 | 0.5 |
| DesmodurN3300 | 27.1 | 27.1 |

Example 22

This example describes the preparation of a two-component clearcoat composition of the present invention which contains an acrylic borate as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Borate of Example G | 60.9 | 42.2 |
| Cymel 202 | 18.8 | 15.0 |
| Polysiloxane polyol of Example AA | 11.0 | 11.0 |
| Phenyl Acid Phosphate Catalyst | 0.7 | 0.5 |
| DesmodurN3300 | 27.1 | 27.1 |

Example 23

This example describes the preparation of a two-component clearcoat composition of the present invention which contains a siloxane aluminum isopropoxide as an adhesion promoting compound. The coating composition was prepared by admixing the following ingredients sequentially under mild agitation.

| Ingredient | Parts by Weight (grams) | Solid Weight (grams) |
|---|---|---|
| Methyl n-amyl ketone | 30.0 | — |
| Butyl Cellosolve ® acetate | 10.0 | — |
| Butyl Carbitol ® acetate | 5.0 | — |
| Tinuvin 928 | 3.0 | 3.0 |
| Tinuvin 292 | 0.5 | 0.5 |
| Silica dispersion of Example A | 8.8 | 6.7 |
| Acrylic Resin of Example 14 | 58.2 | 42.2 |
| Cymel 202 | 18.8 | 15.0 |
| Polysiloxane polyol of Example AA | — | — |
| Siloxane Aluminum isopropoxide of Example H | 42.9 | 22.9 |
| Phenyl Acid Phosphate Catalyst | 0.7 | 0.5 |
| DesmodurN3300 | 27.1 | 27.1 |

The clearcoats Examples 14 through 23 described above were reduced in viscosity to about 25 seconds on a #4 Ford efflux cup at ambient temperature using methyl n-amyl ketone.

Testing

The film forming compositions of Examples 14–23 were spray applied to a pigmented basecoat to form color-plus-clear composite coatings over primed electrocoated steel panels. The panels used were cold rolled steel panels (size 4 inches×12 inches (10.16 cm by 30.48 cm)). The steel panels for Examples 14–23 were coated with ED5050B electrocoat, available from PPG Industries, Inc, and 1177225A primer surfacer, also available from PPG Industries, Inc or coated with ED5000 electrocoat, available from PPG Industries, Inc, and GPXH5379 primer surfacer, also available from PPG Industries, Inc. The test panels are available as APR39754 or APR39375 from ACT Laboratories, Inc. of Hillsdale, Mich.

The basecoat used for Examples 14–23 was Obsidian Schwarz, black pigmented waterborne basecoat, available from BASF Corporation. The Obsidian Schwarz basecoat was automated spray applied in two coats with approximately 30 second flash between coats to the electrocoated and primed steel panels at about 70° F. (21° C.) temperature and about 60% relative humidity. A dry film thickness of about 0.5 to 0.6 mils (about 12 to 16 micrometers) was targeted. The basecoat was allowed to flash ambiently for about five minutes and then prebaked for five minutes at 176° F. (80° C.).

The clear coating compositions of Examples 14–23 were each automated spray applied to a basecoated panel at ambient temperature in two coats with about a 30 second ambient flash between coats. Examples 1–10 were targeted for a 1.5 to 2.0 mils (about 38 to 51 micrometers) dry film thickness. All coatings were allowed to air flash at ambient temperature for ten minutes. Panels prepared from each coating were baked for 30 minutes at 285° F. (141° C.) to fully cure the coating(s). The panels were baked in a horizontal position.

To test for recoat adhesion, an original basecoated and clearcoated panel, as described above, was given another layer of basecoat and clearcoat or clearcoat only. With the condition of sanding, the right half of the panel was sanded with 1200 grit sand paper and the left half was not sanded thus giving sanded and non-sanded areas. Half of an original panel from each clear coating was basecoated and clearcoated and the other half of the panel was clearcoated only. To recoat the panels half and half, the bottom halves of the original panels were covered with aluminum foil and then the top halves were recoated with Obsidian Schwarz basecoat using the same conditions as above. The foil was removed, resulting in an original panel with the upper half coated in basecoat and the bottom half still with only the original coating layers. The respective clearcoat was then automated spray applied to the entire panel as described above. The resulting panels were half coated in basecoat/clearcoat from the original spray application and another layer of basecoat/clearcoat from the recoat spray application (B/C//B/C). The other half of the resulting panel was coated in basecoat clearcoat from the original spray application and another layer of clearcoat from the recoat spray application (B/C//C). Test data is reported below in the following Table 6.

TABLE 6

| Example # | Adhesion promoter Elemental Weight % on resin solids | 20° Gloss | Recoat Adhesion - Cross Hatch 30/285° F. // 30/285° F. | | | |
|---|---|---|---|---|---|---|
| | | | Sanded | | Non-Sanded | |
| | | | B/C// B/C | B/C// C | B/C// B/C | B/C// C |
| 14* | 0 | 84 | 5 | 5 | 0 | 0 |
| 15 | 0.02 | 84 | 5 | 5 | 5 | 0 |
| 16 | 0.04 | 85 | 5 | 5 | 5 | 0 |
| 17 | 0.08 | 84 | 5 | 5 | 5 | 5− |
| 18 | 0.04 | 84 | 5 | 5 | 5 | 0 |
| 19 | 0.16 | 85 | 5 | 5 | 5 | 5− |
| 20 | 0.04 | 85 | — | — | 5 | 0 |
| 21 | 0.04 | 85 | — | — | 5 | 0 |
| 22 | 0.03 | 85 | — | — | 5 | 0 |
| 23 | 0.10 | 82 | 5 | 5 | 5 | 0 |

*Designates a comparative example.

The data presented above in Table 6 illustrate that the inclusion in a two-component clearcoating composition of the adhesion promoting composition of Examples C through H above provide excellent adhesion where a basecoat/clearcoat system is recoated with a repair basecoat/clearcoat system. Further, the data for Examples 14–22 illustrate that the inclusion of the polysiloxane borate and boric acid (where the composition also comprises a polysiloxane) at levels of elemental boron of 0.08 or greater, show excellent adhesion where a basecoat/clearcoat system is repaired with a clearcoat.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

Therefore we claim:

1. A coating composition formed from components comprising:
    (a) at least one polysiloxane comprising at least one reactive functional group, the polysiloxane comprising at least one of the following structural units (I):

$$R^1{}_n R^2{}_m SiO_{(4-n-m)/2} \quad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein at least one group represents a group comprising at least two reactive functional groups, wherein m and n fulfill the requirements of $0<n<4$, $0<m<4$ and $2 \leq (m+n) < 4$;
    (b) at least one reactant comprising at least one functional group that is reactive with the reactive functional group of the polysiloxane (a); and
    (c) at least one boron-containing compound selected from boric acid, boric acid equivalents, and mixtures thereof, wherein each component is different.

2. A coating composition according to claim 1, further comprising at least one functional group-containing film-forming polymer.

3. A coating composition according to claim 1, wherein at least one $R^2$ group represents a group comprising at least two reactive functional groups selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

4. A coating composition according to claim 1, wherein at least one $R^2$ group represents a group comprising at least two reactive functional groups selected from a hydroxyl group and a carbamate group.

5. A coating composition according to claim 1, wherein at least one $R^2$ group represents a group comprising an oxyalkylene group and at least two hydroxyl groups.

6. A coating composition according to claim 1, wherein the polysiloxane has the following structure (II) or (III):

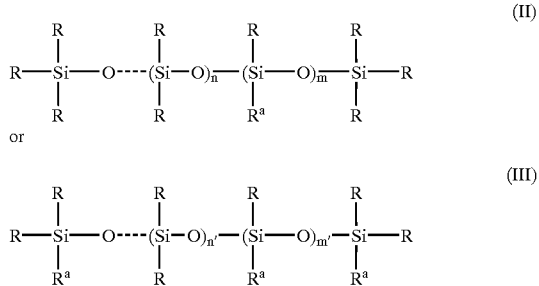

wherein:
m has a value of at least 1;
m' ranges from 0 to 75;
n ranges from 0 to 75;
n' ranges from 0 to 75;
each R, which may be identical or different, is selected from H, OH, monovalent hydrocarbon groups, monovalent siloxane groups, and mixtures of any of the foregoing; and
$R^a$ comprises the following structure (IV):

wherein $R^3$ is selected from an alkylene group, an oxyalkylene group, an alkylene aryl group, an alkenylene group, an oxyalkenylene group, and an alkenylene aryl group;
X represents a group which comprises at least one reactive functional group, and wherein at least one X comprises at least two reactive functional groups.

7. A coating composition according to claim 6, wherein (n+m) ranges from 2 to 9.

8. A coating composition according to claim 7, wherein (n+m) ranges from 2 to 3.

9. A coating composition according to claim 6, wherein (n'+m') ranges from 2 to 9.

10. A coating composition according to claim 9, wherein (n'+m') ranges from 2 to 3.

11. A coating composition according to claim 6, wherein at least one X represents a group which comprises at least two reactive functional group selected from at least one of a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

12. A coating composition according to claim 11, wherein X represents a group comprising at least two reactive functional groups selected from a hydroxyl group and a carbamate group.

13. A coating composition according to claim 11, wherein X represents a group comprising at least two hydroxyl groups.

14. A coating composition according to claim 1, wherein the at least one polysiloxane (a), when added to the other components that form the composition, is present in the composition in an amount ranging from 0.01 to 90 weight percent based on total weight of resin solids of the components from which the composition is formed.

15. A coating composition according to claim 14, wherein the at least one polysiloxane (a) is present in an amount of at least 2 weight percent.

16. A coating composition according to claim 14, wherein the at least one polysiloxane (a) is present in an amount of at least 5 weight percent.

17. A coating composition according to claim 14, wherein the at least one polysiloxane (a) is present in an amount of at least 10 weight percent.

18. A coating composition according to claim 14, wherein the at least one polysiloxane (a) is present in an amount of at least 20 weight percent.

19. A coating composition according to claim 2, wherein the at least one reactive functional group-containing film-forming polymer is selected from at least one of polyether polymers, polyester polymers, acrylic polymers, silicon-based polymers, and polyurethane polymers.

20. A coating composition according to claim 2, wherein the film-forming polymer comprises at least one reactive functional group selected from a hydroxyl group, a carboxyl group, an isocyanate group, a blocked isocyanate group, a primary amine group, a secondary amine group, an amide group, a carbamate group, a urea group, a urethane group, a vinyl group, an unsaturated ester group, a maleimide group, a fumarate group, an anhydride group, a hydroxy alkylamide group, and an epoxy group.

21. A coating composition according to claim 2, wherein the film-forming polymer comprises at least one reactive functional group selected from a hydroxyl group, a carboxyl group, an isocyanate group, a carbamate group, and an epoxy group.

22. A coating composition according to claim 21, wherein the film-forming polymer comprises an acrylic polymer having reactive functional groups selected from a hydroxyl group and a carbamate group.

23. A coating composition according to claim 2, wherein the at least one reactive functional group-containing film-forming polymer when added to the other components that form the composition, is present in the composition in an amount ranging from 2 to 80 weight percent based on total weight of resin solids of the components from which the composition is formed.

24. A coating composition according to claim 1, wherein the at least one reactant (b) is selected from at least one curing agent.

25. A coating composition according to claim 24, wherein the at least one curing agent is selected from at least one of an aminoplast resin, a polyisocyanate, a blocked isocyanate, a polyepoxide, a polyacid, and a polyol.

26. A coating composition according to claim 25, wherein the at least one curing agent comprises a polyisocyanate or a blocked isocyanate compound.

27. A coating composition according to claim 25, wherein the at least one curing agent comprises a mixture of a polyisocyanate and an aminoplast resin.

28. A coating composition according to claim 24, wherein the curing agent, when added to the other components that form the composition, is present in an amount ranging from 2 to 65 weight percent based on total weight of resin solids of the components from which the composition is formed.

29. A coating composition according to claim 1, wherein the boron-containing compound (c) is selected from at least one of boric acid, a boric acid ester, and mixtures thereof.

30. A coating composition according to claim 29, wherein the boron-containing compound comprises boric acid.

31. A coating composition according to claim 29, wherein said boron-containing compound comprises a boric acid ester selected from at least one of triisopropyl borate, trimethyl borate, triphenyl borate trimethoxyboroxine, polysiloxane borate, acrylic borate, and mixtures thereof.

32. A coating composition according to claim 29, wherein said boron-containing compound comprises a boric acid ester derivative selected from at least one of triethanolamine borate, mannitol borate, n-propanol amine borate, trimetholpropane borate, glycerol borate, and mixtures thereof.

33. A coating composition according to claim 29, wherein the boron-containing compound comprises a reaction product formed from the following reactants:

(a) at least one polysiloxane comprising at least one of the following structural units (I):

wherein each $R^1$, which may be identical or different, represents H, OH, a monovalent hydrocarbon group or a monovalent siloxane group; each $R^2$, which may be identical or different, represents a group comprising at least one reactive functional group, wherein at least one $R^2$ represents a group comprising at least two reactive functional groups, wherein m and n fulfill the requirements of $0<n<4$, $0<m<4$ and $2\leq(m+n)<4$; and (b) at least one boron-containing compound selected from at least one of boric acid, boric acid equivalents, and mixtures thereof.

34. A coating composition according to claim 33, wherein at least one $R^2$ group represents a group comprising at least two hydroxyl groups.

35. A coating composition according to claim 34, wherein at least one $R^2$ group represents a group comprising an oxyalkylene group and at least two hydroxyl groups.

36. A coating composition according to claim 33, wherein the polysiloxane (a) has the following structure (II) or (III):

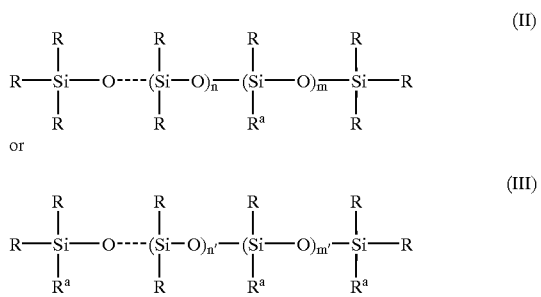

wherein:

m has a value of at least 1;

m' ranges from 0 to 75;

n ranges from 0 to 75;

n' ranges from 0 to 75;

each R, which may be identical or different, is selected from H, OH, monovalent hydrocarbon groups, monovalent siloxane groups, and mixtures of any of the foregoing; and $R^a$ comprises the following structure (IV):

wherein $R^3$ is selected from an alkylene group, an oxyalkylene group, an alkylene aryl group, an alkenylene group, an oxyalkenylene group, and an alkenylene aryl group; and X represents a group which comprises at least one reactive functional group, and wherein at least one X comprises at least two reactive functional groups.

37. A coating composition according to claim 36, wherein (n+m) ranges from 2 to 9.

38. A coating composition according to claim 37, wherein (n+m) ranges from 2 to 3.

39. A coating composition according to claim 36, wherein (n'+m') ranges from 2 to 9.

40. A coating composition according to claim 39, wherein (n'+m') ranges from 2 to 3.

41. A coating composition according to claim 36, wherein at least one X represents a group which comprises at least two reactive functional group selected from a hydroxyl group, a carboxyl group, a primary amine group, a secondary amine group, an amide group, a carbamate group, a urea group, an anhydride group, a hydroxy alkylamide group, and an epoxy group.

42. A coating composition according to claim 36, wherein at least one X represents a group comprising at least two hydroxyl groups.

43. A coating composition according to claim 1, wherein the at least one boron-containing compound (c), when added to the other components that form the composition, is present in the composition in an amount sufficient to provide an amount of boron ranging from 0.001 to 5 weight percent based on total weight of resin solids of the components from which the composition is formed.

44. A coating composition according to claim 1, wherein the components from which the coating composition is formed further comprise a plurality of particles which are selected from fumed silica, amorphous silica, colloidal silica, alumina, colloidal alumina, titanium dioxide, cesium oxide, yttrium oxide, colloidal yttria, zirconia, colloidal zirconia, and mixtures thereof.

45. A coating composition according to claim 44, wherein the particles comprise colloidal silica.

46. A coating composition according to claim 44, wherein the particles are surface treated.

47. A coating composition according to claim 44, wherein the particles have an average particle size of less than 100 microns prior to incorporation into the composition.

48. A coating composition according to claim 44, wherein the particles have an average particle size ranging from 1 to less than 1000 nanometers prior to incorporation into the composition.

49. A coating composition according to claim 48, wherein the particles have an average particle size ranging from 1 to 100 nanometers prior to incorporation into the composition.

50. A coating composition according to claim 49, wherein the particles have an average particle size ranging from 5 to 50 nanometers prior to incorporation into the composition.

51. A coating composition according to claim 44, wherein the particles, when added to the other components that form the composition, are present in the composition in an amount ranging from 0.01 to 75 weight percent based on total weight of the resin solids of the components from which the composition is formed.

52. A coating composition according to claim 51, wherein the particles are present in an amount of at least 0.1 weight percent.

53. A coating composition according to claim 52, wherein the particles are present in an amount of at least 0.5 weight percent.

54. A coating composition according to claim 52, wherein the particles are present in an amount of less than 20 weight percent.

55. A coating composition according to claim 53, wherein the particles are present in an amount of less than 10 weight percent.

56. A coating composition formed from components comprising:
(a) at least one polysiloxane comprising at least one reactive functional group, the polysiloxane comprising at least one of the following structural units (I):

wherein each $R^1$, which may be identical or different, represents H, OH, a monovalent hydrocarbon group or a monovalent siloxane group; each $R^2$, which may be identical or different, represents a group comprising at least one reactive functional group, wherein at least one $R^2$ group represents at least two functional groups selected from a hydroxyl group and a carbamate group, wherein m and n fulfill the requirements of $0<n<4$, $0<m<4$ and $2\leq(m+n)<4$;
(b) at least one reactant comprising at least one curing agent having at least one functional group reactive with the functional group of the polysiloxane (a), the curing agent selected from at least one of a polyisocyanate, a blocked isocyanate, and an aminoplast resin;
(c) at least one boron-containing compound selected from boric acid and;
(d) a plurality of inorganic particles selected from fumed silica, amorphous silica, colloidal silica, alumina, colloidal alumina, titanium dioxide, cesium oxide, yttrium oxide, colloidal yttria, zirconia, colloidal zirconia, and mixtures thereof, wherein each component is different.

57. A coating composition formed from components comprising:
(a) at least one polysiloxane comprising at least one reactive functional group, the polysiloxane comprising at least one of the following structural units (I):

wherein each $R^1$, which may be identical or different, represents H, OH, a monovalent hydrocarbon group or a monovalent siloxane group; each $R^2$, which may be identical or different, represents a group comprising at least one reactive functional group, wherein at least one $R^2$ group represents at least two functional groups selected from a hydroxyl group and a carbamate group, wherein m and n fulfill the requirements of $0<n<4$, $0<m<4$ and $2\leq(m+n)<4$;
(b) at least one reactant comprising at least one curing agent having at least one functional group reactive with the functional group of the polysiloxane (a), the curing agent selected from at least one of a polyisocyanate, a blocked isocyanate, and an aminoplast resin;
(c) at least one boron-containing compound selected from boric acid, boric acid equivalents, and mixtures thereof;
(d) a plurality of inorganic particles selected from fumed silica, amorphous silica, colloidal silica, alumina, colloidal alumina, titanium dioxide, cesium oxide, yttrium oxide, colloidal yttria, zirconia, colloidal zirconia, and mixtures thereof; and
(e) at least one film-forming polymer selected from polyether polymers, polyester polymers, acrylic polymers and polyurethane polymers, said film-forming polymer having functional groups reactive with the functional groups of (a) and/or (b), wherein each component is different.

58. A coating composition formed from components comprising:
(a) at least one polysiloxane having the following structure (II) or (III):

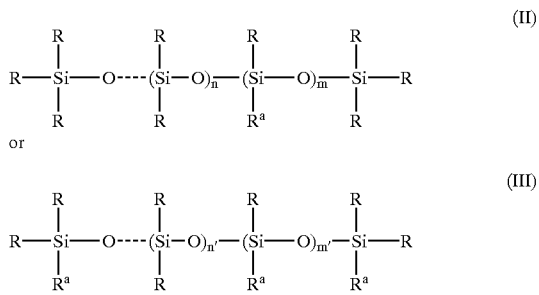

wherein:
m has a value of at least 1;
m' ranges from 0 to 75;
n ranges from 0 to 75;
n' ranges from 0 to 75;
each R, which may be identical or different, is selected from H, OH, monovalent hydrocarbon groups, monovalent siloxane groups, and mixtures of any of the foregoing; and
$R^a$ comprises the following structure (IV):

wherein $R^3$ is selected from an alkylene group, an oxyalkylene group, an alkylene aryl group, an alkenylene group, an oxyalkenylene group, and an alkenylene aryl group; and
X represents a group which comprises at least one reactive functional group, wherein at least one X comprises at least two reactive functional groups selected from a hydroxyl group and a carbamate group;
(b) at least one reactant comprising at least one curing agent having at least one functional group reactive with the at least one functional group of the polysiloxane (a), the curing agent selected from at least one of a polyisocyanate, a blocked isocyanate, and an aminoplast resin;
(c) at least one boron-containing compound selected from boric acid, boric acid equivalents, and mixtures thereof;
(d) a plurality of inorganic particles selected from fumed silica, amorphous silica, colloidal silica, alumina, colloidal alumina, titanium dioxide, cesium oxide, yttrium oxide, colloidal yttria, zirconia, colloidal zirconia, and mixtures thereof; and
(e) at least one film-forming acrylic polymer having reactive functional groups selected from hydroyxl groups and carbamate groups, wherein each component is different.

59. A method of repairing a multi-layer composite coating comprising a base coat formed on a substrate from a film-forming base coating composition and a first top coat deposited over at least a portion of the base coat, said first top coat formed from a first film-forming top coating composition formed from components comprising:
(a) at least one polysiloxane comprising at least one reactive functional group, the polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein at least one $R^2$ group represents a group comprising at least two reactive functional groups, wherein m and n fulfill the requirements of 0<n<4, 0<m<4 and 2≦(m+n)<4;
(b) at least one reactant comprising at least one functional group that is reactive with the reactive functional group of the polysiloxane (a); and
(c) at least one boron-containing compound selected from boric acid, boric acid equivalents, and mixtures thereof,
wherein each component is different, the method comprising:
locating an area of the composite coating which is flawed,
applying a repair top coat film-forming composition to the flawed area after the flawed area has been prepared for repairing,
wherein the repair top coat film-forming composition comprises a film-forming composition which is the same or different from the first top coat film-forming composition.

60. A method according to claim 59, wherein the boron-contaiining compound (c) comprises a reaction product formed from the following reactants:
(a) at least one polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein m and n fulfill the requirements of 0<n<4, 0<m<4 and 2≦(m+n)<4; and
(b) at least one boron-containing compound selected from at least one of boric acid, boric acid equivalents, and mixtures thereof.

61. A method according to claim 59, wherein the first film-forming top coating composition further comprises inorganic particles selected from fumed silica, amorphous silica, colloidal silica, alumina, colloidal alumina, titanium dioxide, cesium oxide, yttrium oxide, colloidal yttria, zirconia, colloidal zirconia and mixtures thereof.

62. A coating composition formed from components comprising:
(a) at least one polysiloxane comprising at least one reactive functional group, the polysiloxane comprising at least one of the following structural units (I):

$$R^1{}_n R^2{}_m SiO_{(4-n-m)/2} \qquad (I)$$

wherein each $R^1$, which may be identical or different, represents H, OH, a monovalent hydrocarbon group or a monovalent siloxane group; each $R^2$, which may be identical or different, represents a group comprising at least one reactive functional group, wherein at least one $R^2$ group represents a group comprising at least two reactive functional groups, wherein m and n fulfill the requirements of 0<n<4, 0<m<4 and 2≦(m+n)<4;
(b) at least one reactant comprising at least one functional group that is reactive with the reactive functional group of the polysiloxane (a); and
(c) at least one compound selected from borates, aluminates, titanates, zirconates, silicates, siloxanes, silanes, and mixtures thereof,
wherein each component is different.

63. A coating composition according to claim 62, wherein the compound (c) comprises at least one of a borate and an aluminate.

64. A coating composition according to claim 63, wherein the compound (c) comprises aluminum alkoxide.

* * * * *